(12) United States Patent
Marquis-Martin

(10) Patent No.: US 8,757,667 B2
(45) Date of Patent: Jun. 24, 2014

(54) ADAPTERS AND CONNECTOR ASSEMBLIES FOR FLOW MANAGING APPARATUSES

(75) Inventor: Guillaume Hugo Marquis-Martin, Montreal (CA)

(73) Assignee: IPEX Technologies Inc., Mississauga (CA)

( * ) Notice: Subject to any disclaimer, the term of this patent is extended or adjusted under 35 U.S.C. 154(b) by 336 days.

(21) Appl. No.: 13/309,058

(22) Filed: Dec. 1, 2011

(65) Prior Publication Data

US 2012/0098254 A1 Apr. 26, 2012

Related U.S. Application Data

(63) Continuation-in-part of application No. 13/035,486, filed on Feb. 25, 2011, now Pat. No. 8,511,714.

(60) Provisional application No. 61/399,726, filed on Jul. 16, 2010.

(51) Int. Cl.
*F16L 3/00* (2006.01)

(52) U.S. Cl.
USPC ............... 285/139.1; 285/139.2; 285/137.11; 285/305; 285/319; 285/921; 137/808; 137/812; 137/813; 137/577.5; 251/148; 251/151

(58) Field of Classification Search
USPC ................. 137/808, 812, 813; 251/148, 151; 285/139.1, 139.2, 137.11, 306, 319, 285/921, 363, 405, 208
See application file for complete search history.

(56) References Cited

U.S. PATENT DOCUMENTS

| 792,074 | A | 6/1905 | Rathburn |
| 823,346 | A | 6/1906 | Maxwell |
| 837,561 | A | 12/1906 | Hacker |
| 959,854 | A | 5/1910 | Grierson |

(Continued)

FOREIGN PATENT DOCUMENTS

| GB | 2334791 B | 7/2002 |
| GB | 2405157 A | 2/2005 |

(Continued)

OTHER PUBLICATIONS

Non-final Office Action mailed Apr. 26, 2013 for U.S. Appl. No. 13/035,486.

(Continued)

*Primary Examiner* — Elizabeth Houston
*Assistant Examiner* — Minh Le
(74) *Attorney, Agent, or Firm* — K&L Gates LLP

(57) ABSTRACT

A connector for a flow managing device in fluid communication with an outlet conduit is disclosed. The connector can comprise a receiving member, an engaging member, and an adapter. The receiving member can be secured to the adapter, which can be secured to a side wall of a basin near an outlet coupled to the outlet conduit. The adapter can comprise a curvature plate having a curvature that complements a curvature of the side wall. The adapter can further comprise an adapter bore through the curvature plate and an adapter conduit extending from the curvature plate and at least partially overlapping the adapter bore. The flow managing apparatus can be secured to the engaging member, which can be engaged with the receiving member. Fluid from the basin can flow through the flow managing device, the engaging member, the receiving member, and the adapter and into the outlet conduit.

17 Claims, 60 Drawing Sheets

(56) References Cited

U.S. PATENT DOCUMENTS

| | | | |
|---|---|---|---|
| 979,481 A | 12/1910 | Hannold | |
| 1,317,870 A * | 10/1919 | Fanselow | 285/208 |
| 1,808,128 A | 6/1931 | Brocato | |
| 1,838,574 A | 12/1931 | Ross | |
| 1,963,421 A * | 6/1934 | Robinson et al. | 285/289.1 |
| 2,265,268 A | 12/1941 | Culligan | |
| 2,396,295 A | 3/1946 | Spraragen | |
| 2,535,933 A | 12/1950 | Kubatzky | |
| 2,575,499 A | 11/1951 | Manow | |
| 2,644,390 A | 7/1953 | Delf et al. | |
| 3,195,303 A | 7/1965 | Widell | |
| 3,197,242 A * | 7/1965 | Milette | 277/623 |
| 3,207,168 A | 9/1965 | Warren | |
| 3,215,165 A | 11/1965 | Boadway | |
| 3,219,048 A | 11/1965 | Palmisano | |
| 3,481,310 A * | 12/1969 | Alburger | 119/72.5 |
| 3,490,791 A * | 1/1970 | Mitchell | 285/5 |
| 3,513,865 A | 5/1970 | Van Der Heyden | |
| 3,694,009 A * | 9/1972 | Phillips | 285/197 |
| 3,789,589 A | 2/1974 | Delany et al. | |
| 4,168,232 A | 9/1979 | Allen et al. | |
| 4,206,783 A | 6/1980 | Brombach | |
| 4,365,980 A | 12/1982 | Culbert et al. | |
| 4,376,053 A | 3/1983 | Bullock et al. | |
| 4,483,774 A | 11/1984 | Brill et al. | |
| 4,512,492 A | 4/1985 | Graybeal | |
| 4,632,107 A | 12/1986 | Butler | |
| 4,654,942 A * | 4/1987 | Rush et al. | 29/890.144 |
| 4,701,196 A | 10/1987 | Delany | |
| 4,726,742 A | 2/1988 | Harbison et al. | |
| 4,743,280 A | 5/1988 | Pappas | |
| 4,834,142 A | 5/1989 | Johannessen | |
| 4,846,224 A | 7/1989 | Collins, Jr. et al. | |
| 4,889,166 A | 12/1989 | Lakatos | |
| 5,044,394 A | 9/1991 | Brombach | |
| 5,052,442 A | 10/1991 | Johannessen | |
| 5,080,137 A | 1/1992 | Adams | |
| 5,170,813 A * | 12/1992 | Francis | 137/15.13 |
| 5,199,145 A * | 4/1993 | McMillan et al. | 29/237 |
| 5,203,595 A | 4/1993 | Borzone et al. | |
| 5,280,971 A * | 1/1994 | Tokutake et al. | 285/189 |
| 5,303,782 A | 4/1994 | Johannessen | |
| 5,337,789 A | 8/1994 | Cook | |
| 5,399,180 A | 3/1995 | Kopp | |
| 5,597,492 A | 1/1997 | Felder | |
| 5,640,988 A | 6/1997 | Brereton | |
| 5,788,291 A | 8/1998 | Williams et al. | |
| 6,126,817 A | 10/2000 | Duran et al. | |
| 6,374,858 B1 | 4/2002 | Hides et al. | |
| 7,052,048 B2 * | 5/2006 | Murphy | 285/139.1 |
| 7,530,370 B2 | 5/2009 | Gross | |
| 7,604,262 B2 | 10/2009 | Elflein et al. | |
| 7,814,935 B2 * | 10/2010 | Andoh et al. | 137/813 |
| D660,405 S | 5/2012 | Marquis-Martin | |
| 2012/0098254 A1 | 4/2012 | Marquis-Martin | |

FOREIGN PATENT DOCUMENTS

| | | |
|---|---|---|
| GB | 2451285 A | 1/2009 |
| JP | 2004-238833 A | 8/2004 |
| JP | 2008-214948 A | 9/2008 |
| WO | WO 86/07417 A1 | 12/1986 |
| WO | WO 87/07048 A1 | 11/1987 |
| WO | WO 89/08750 A1 | 9/1989 |
| WO | WO 89/08751 A1 | 9/1989 |
| WO | WO 91/00388 A1 | 1/1991 |
| WO | WO 92/04667 A1 | 3/1992 |
| WO | WO 92/08059 A1 | 5/1992 |
| WO | WO 94/05867 | 3/1994 |
| WO | WO 94/08146 A1 | 4/1994 |
| WO | WO 99/35451 A1 | 7/1999 |
| WO | WO 99/43899 A2 | 9/1999 |
| WO | WO 2009/013509 A2 | 1/2009 |

OTHER PUBLICATIONS

U.S. Appl. No. 13/035,486, filed Feb. 25, 2011.
U.S. Appl. No. 29/404,569, filed Oct. 21, 2011.
U.S. Appl. No. 29/404,573, filed Oct. 21, 2011.
U.S. Appl. No. 29/404,575, filed Oct. 21, 2011.
U.S. Appl. No. 29/404,568, filed Oct. 21, 2011.
U.S. Appl. No. 29/404,570, filed Oct. 21, 2011.
U.S. Appl. No. 29/404,572, filed Oct. 21, 2011.

* cited by examiner

ADAPTERS AND CONNECTOR ASSEMBLIES FOR FLOW MANAGING APPARATUSES

PRIORITY CLAIM

The present application is a continuation-in-part application of U.S. non-provisional application Ser. No. 13/035,486, filed Feb. 25, 2011, entitled "CONNECTOR ASSEMBLIES FOR FLOW RESTRICTING APPARATUSES" by Guillaume Hugo Marquis-Martin, which claims priority to both: (1) U.S. provisional application Ser. No. 61/399,726, filed Jul. 16, 2010, entitled "CONNECTOR ASSEMBLIES FOR FLOW RESTRICTING APPARATUSES" by Hugo Marquis-Martin; and (2) Canadian Application No. 2,714,675, filed Sep. 10, 2010, entitled "CONNECTOR ASSEMBLIES FOR FLOW RESTRICTING APPARATUSES" by G. H. Marquis-Martin, which claims priority to U.S. provisional application Ser. No. 61/399,726 referenced above.

The present application is also a continuation-in-part application of U.S. design application Ser. No. 29/404,569, filed Oct. 21, 2011, entitled "FLOW CONTROL ADAPTER ASSEMBLY" by G. H. Marquis-Martin.

FIELD

The present disclosure generally relates to flow managing apparatuses and, more particularly, relates to connector assemblies and basin adapters for flow managing apparatuses.

SUMMARY

In a general aspect, the present disclosure relates to a connector for a flow managing device, such as a vortex valve, in fluid communication with an outlet conduit. The connector can comprise a receiving member, an engaging member, and an adapter. The receiving member can be secured to the adapter, which can be secured to a side wall of a basin near an outlet coupled to the outlet conduit. The adapter can comprise a curvature plate having a curvature that complements a curvature of the side wall. The adapter can further comprise an adapter bore through the curvature plate and an adapter conduit extending from the curvature plate and at least partially overlapping the adapter bore. The flow managing apparatus can be secured to the engaging member, which can be engaged with the receiving member. Fluid from the basin can flow through the flow managing device, the engaging member, the receiving member, and the adapter and into the outlet conduit.

In one general aspect, the present disclosure relates to a connector in fluid communication with an outlet in a basin. The connector can comprise an adapter, a receiving member, and an engaging member. The adapter can comprise a curvature plate securable to the basin, an adapter bore through the curvature plate that at least partially overlaps the outlet when the curvature plate is secured to the basin, and an adapter conduit that at least partially overlaps the adapter bore and extends from the curvature plate. The receiving member can comprise a connector plate comprising at least one receiving portion, a receiving bore through the connector plate, and a receiving conduit that at least partially overlaps the receiving bore and extends from the connector plate. The receiving conduit can be securable to the adapter conduit to form a first fluid-tight connection. The engaging member can comprise an engaging bore through the engaging member and an outer edge comprising at least one engaging portion. The at least one engaging portion can be engageable with the at least one receiving portion such that the engaging bore at least partially overlaps the receiving bore when the at least one engaging portion engages the at least one receiving portion.

In another general aspect, the present disclosure relates to a connector in fluid communication with an outlet in a basin. The basin can have a first curvature and the connector can comprise an adapter and a receiving member. The adapter can comprise a curvature plate securable to the basin and comprising a second curvature that substantially complements the first curvature, an adapter bore through the curvature plate that at least partially overlaps the outlet when the adapter is secured to the basin, and an adapter conduit that at least partially overlaps the adapter bore and extends from the curvature plate. The receiving member can comprise a connector plate comprising a means for attaching a flow managing device, a receiving bore through the connector plate, and a receiving conduit that at least partially overlaps the receiving bore and extends from the connector plate. The receiving conduit can be securable to the adapter conduit to form a first fluid-tight connection.

In another general aspect, the present disclosure relates to a method comprising the steps of securing a receiving conduit of a receiving member to an adapter conduit of an adapter to form a first fluid-tight connection. The receiving member can comprise a plurality of receiving portions. The method can also comprise the step of securing the adapter to a basin. The basin can have a first curvature and the adapter can comprise a curvature plate having a second curvature that substantially complements the first curvature. The adapter can be secured to the basin such that the adapter conduit at least partially overlaps an outlet of the basin. The method can further comprise the step of securing a flow managing device to an engaging member such that a passage in the flow managing device at least partially overlaps an engaging bore in the engaging member. The engaging member can comprise a plurality of engaging portions. The method can also comprise the step of securing the engaging member to the receiving member such that each receiving portion of the plurality of receiving portions receives one engaging portion of the plurality of engaging portions.

BRIEF DESCRIPTION OF THE DRAWINGS

The embodiments described herein will become more apparent and will be better understood by reference to the following description of non-limiting embodiments of the disclosure taken in conjunction with the accompanying drawings.

FIG. 40 is a cut-away perspective view of an engaging member attached to a flow restricting assembly in accordance with one non-limiting embodiment; and.

DETAILED DESCRIPTION

Various non-limiting embodiments of the present disclosure will now be described to provide an overall understanding of the principles of the structure, function, manufacture, and use of the flow managing apparatuses and connector assemblies for the same disclosed herein. One or more examples of these non-limiting embodiments are illustrated in the accompanying drawings. It will be appreciated that the flow restricting managing and the connector assemblies for the same specifically described herein and illustrated in the accompanying drawings are non-limiting example embodiments and that the scope of the various non-limiting embodiments of the present disclosure are defined solely by the claims. The features illustrated or described in connection with one non-limiting embodiment can be combined with the features of other non-limiting embodiments. Such modifications and variations are intended to be included within the scope of the present disclosure.

Figure 1:
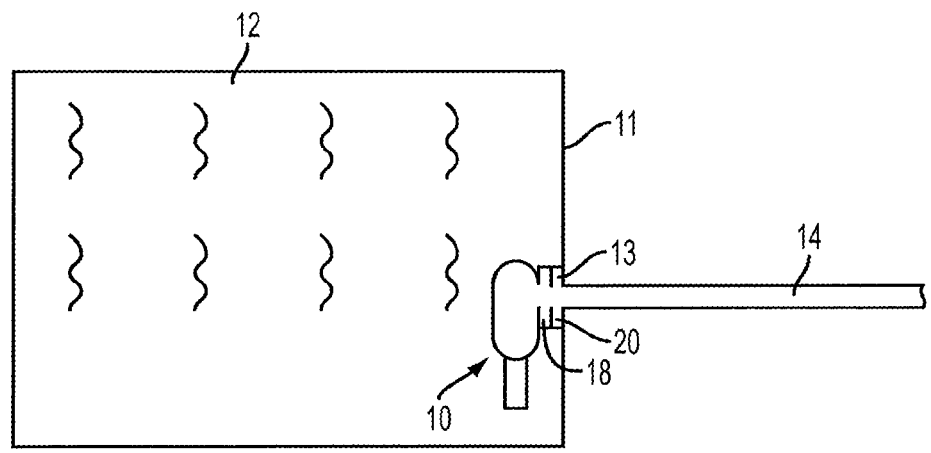
FIG. 1 is a simplified schematic illustration of flow restricting apparatus attached to a connector assembly in accordance with one non-limiting embodiment.
Figure 2:
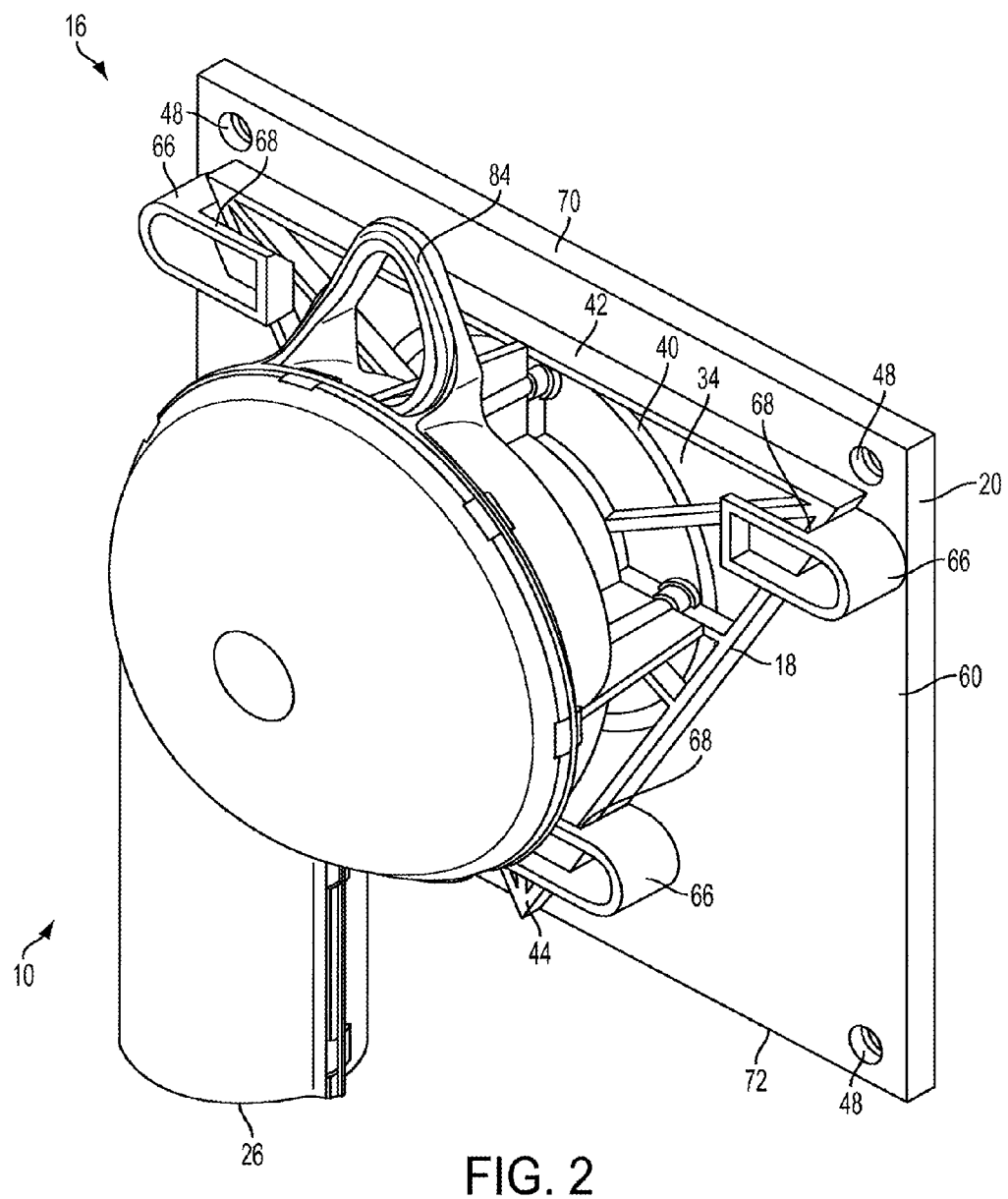
FIG. 2 is a front perspective view of a flow restricting apparatus attached to a connector assembly in accordance with one non-limiting embodiment.
Figure 3:
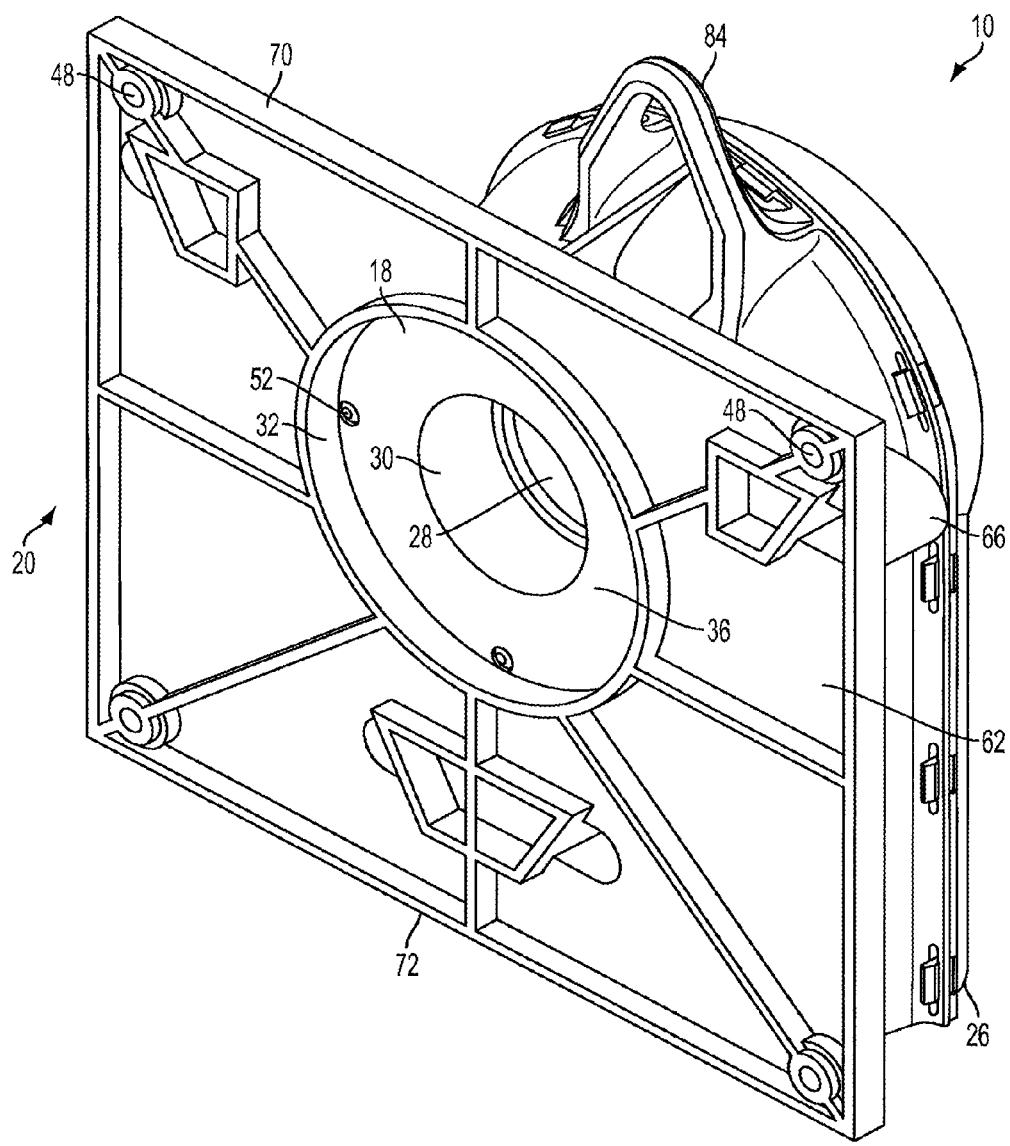
FIG. 3 is a rear perspective view of the flow restricting apparatus attached to the connector assembly of FIG. 2 in accordance with one non-limiting embodiment.

In one embodiment, referring to FIG. 1, a flow restricting apparatus or a fluid flow restricting apparatus, such as vortex valve 10, for example, can be used to restrict or slow fluid flow from a reservoir, basin or a drainage gully 12 to an outlet conduit or pipe 14. Although a "vortex valve" is referred to herein, the present disclosure contemplates multiple flow managing apparatuses or fluid flow managing apparatuses other than vortex valves, as described in greater detail below. The vortex valve 10 can allow flow therethrough under normal conditions and can create an air vortex therein during high flow conditions to slow or restrict the flow of fluid from the basin or the drainage gully 12 into the outlet conduit 14. Such a feature can help protect equipment positioned downstream of the vortex valve 10 from flooding during periods of heavy rainfall or runoff, for example. In one embodiment, the fluid restricted by the vortex valve 10 can be water, such as storm water, for example.

In various embodiments, referring to FIGS. 1-11, the vortex valve 10 can be operatively and/or fluidly associated with the outlet conduit 14 using a connector assembly 16. In one embodiment, the connector assembly 16 can comprise an engaging member 18 and a receiving member 20. The receiving member 20 can receive, be engaged with, and/or be sealably coupled to an end portion of the outlet conduit 14 in side wall 11. In one embodiment, a gasket (not illustrated) or other suitable sealing member can be positioned intermediate the receiving member 20 and the end portion of the outlet conduit 14 to create a fluid-tight, or substantially fluid-tight, connection between the receiving member 20 and side wall 11. The end portion of the outlet conduit 14 in side wall 11 can be engaged with the receiving member 20 using fasteners, such as anchor bolts, for example. In other embodiments, the receiving member 20 can be connected to the side wall 11 near the outlet conduit 14 using other suitable fastening devices or methods known to those of skill in the art.

In one embodiment, the receiving member 20 can be coupled to the side wall 11 of the basin 12 by a basin adapter 400. The basin adapter 400 and receiving member 20 can be secured to form a fluid-tight, or substantially fluid-tight, connection. A basin adapter 400 can be used when the side wall 11 is curved or otherwise not entirely flat near the outlet conduit 14 such that the side wall 11 comprises a curvature. Referring to FIGS. 56-62, a basin adapter 400 can comprise a curvature plate 402, an adapter bore 404 through the curvature plate, and an adapter conduit 406 extending from the curvature plate 402 and at least partially overlapping the adapter bore 404. The curvature plate 402 can comprise a curvature that matches or otherwise complements the curvature of the side wall 11 when the curvature plate is secured to the side wall 11. Referring to FIGS. 49-55, a receiving member 420 can comprise a connector plate 424, receiving bore 432, and a receiving conduit 422 extending from the connector plate 424 and at least partially overlapping the receiving bore 432. Referring to FIGS. 42-48, the adapter conduit 406 can be secured to the receiving conduit to form a fluid-tight or substantially fluid-tight connection. The connection can be permanent or releasable. A gasket 13 or other suitable sealing member or material can be positioned intermediate the curvature plate 402 and side wall 11 near the outlet conduit 14 to create a fluid-tight, or substantially fluid-tight, connection between the receiving member 420 and side wall 11. A basin adapter 400 according to various embodiments is described in greater detail below.

The engaging member 18 can be secured to the vortex valve 10. In such an embodiment, fluid from the basin or drainage gully 12 can flow into an inlet 26 of the vortex valve 10, flow through the vortex valve 10, flow through an outlet 28 of the vortex valve 10, flow through a bore 30 in the engaging member 18, flow through a bore 32 in the receiving member 20, and flow into the outlet conduit 14. Such a flow sequence can occur independent of whether an air vortex is created within the vortex valve 10. In various embodiments, when assembled, the outlet 28, the bore 30, the bore 32, and an opening in the end portion of the outlet conduit 14 can be in fluid communication or sealed fluid communication, such that the fluid in the basin 12 or the drainage gully can flow into the outlet conduit 14. In various embodiments, the vortex valve 10 and the engaging member 18 can be removably attached to the receiving member 20 for cleaning of the vortex valve 10, or maintenance to the vortex valve 10, for example. The bores 30, 32 can be the same size (e.g., same radii if the bores are circular) or they can be different sizes. For example, the bore 30 of the engaging member 18 can be sized smaller (e.g., a lesser radius) than the bore 32 of the receiving member 20. In various embodiments, the size of the bores 30 and 32 can be changed during manufacturing to modify the flow rate of fluid through the connector assembly 16. In one embodiment, if the bores 30 and 32 are larger the flow rate of fluid through the connector assembly 16 can be greater.

In one embodiment, referring to FIG. 1, the basin 12 can comprise a side wall 11 having an aperture therein. The aperture in the side wall 11 can receive a portion of the outlet conduit 14 therethrough. The receiving member 20 can be bolted or otherwise fastened to the side wall 11 over the aperture in the side wall 11. In various embodiments, a gasket 13 can be positioned intermediate the side wall 11 and the receiving member 20 such that a fluid-tight, or substantially fluid-tight, seal can be made between the receiving member 20 and the side wall 11.

In one embodiment, referring to FIGS. 2, 3, and 5-13, the engaging member 18 can comprise a first face 34 and a second face 36. The bore 30 can be defined through the engaging member 18 at least intermediate the first face 34 and the second face 36. An annular flange or projection 38, or an otherwise shaped flange or projection, can extend from the first face 34 and can be configured to be positioned against, in fluid communication with, about, proximate to, and/or adjacent to at least a portion of the outlet 28 of the vortex valve 10. In one embodiment, a portion of the bore 30 can be defined by the annular flange 38. In various embodiments, a groove 40 can be defined in the second face 36 and the groove 40 can at least partially surround the bore 30 or can fully surround the bore 30. In one embodiment, the groove 40 can comprise an arcuate portion and can have a circular-shaped perimeter. In other embodiments, the groove 40 can comprise a square-shaped perimeter, a rectangular-shaped perimeter, a triangular-shaped perimeter, an ovate-shaped perimeter, and/or any other suitably shaped perimeter. In various embodiments, the engaging member 18 can not comprise the groove 40 and can comprise other suitable sealing members or materials, such as a gasket, for example. In one embodiment, the engaging member 18 can comprise a raised lip (not illustrated) extending from the second face 36. The raised lip in the second face 36 of the engaging member 18 can be provided with or without the groove 40. In one embodiment, both the raised lip and the groove 40 can be used to seal the engaging member 18 to the receiving member 20. Other suitable sealing members, such as gaskets or materials, for example, can be used intermediate the various components of the connector assembly 16 as will be recognized by those of skill in the art.

In one embodiment, the engaging member 18 can comprise an outer edge 42 defining the perimeter of the engaging member 18. In various embodiments, the outer edge 42 can have a triangular shape, a circular shape, a semi-circular shape, a trapezoidal shape, a truncated trapezoidal shape, a rectangular shape, a square shape, an ovate shape, and/or any other suitable shape. In any event, the outer edge 42 can have a shape configured to at least partially fit within one or more projections or one or more receiving portions on the receiving member 20. In one embodiment, the engaging member 18 can comprise one or more tapered or angled portions 44 to aid the engagement of the engaging member 18 with the receiving member 20 and/or the engagement of the engaging member 18 with one or more projections or one or more receiving portions on the receiving member 20. In other various embodiments, the entire engaging member 18 can be tapered such that the engaging member 18 can act as a type of wedge when engaged with the one or more projections or the receiving portions on the receiving member 20. In one embodiment, the tapered or angled portion 44 can be situated proximate to a point of a triangular engaging member 18, for example. In such an embodiment, the distance between the first face 34 and the second face 36 at one end of the engaging member 18 can be greater than the distance between the first face 34 and the second face 36 at the other end of the engaging member 18. In one embodiment, the tapered portion 44 can be formed in the first face 34 and/or the second face 36.

In various embodiments, the engaging member 18 can comprise one or more apertures 46 configured to each receive portions of a connection member 52, such as a screw or a bolt, for example, such that the engaging member 18 can be attached to the vortex valve 10. The vortex valve 10 can comprise apertures 80 configured to receive portions of the connection members 52 therein. The apertures 80 can be positioned on the vortex valve 10 proximate to or about the outlet 28, for example. In one embodiment, the connection members 52 can be threaded and side walls of the apertures 46 and the apertures 80 can comprise threads, for example. As a result, the connection members 52 can be threadably engaged with portions of the apertures 46 and portions of the apertures 80 to affix the engaging member 18 to the vortex valve 10. In one embodiment, a sealing member or material can be positioned intermediate the engaging member 18 and the vortex valve 10 to ensure a fluid-tight, or substantially fluid-tight, connection between the engaging member 18 and the vortex valve 10.

In one embodiment, referring to FIGS. 2, 3, 5-11, 14, and 15, the receiving member 20 can comprise a first side 60 and a second side 62. The bore 32 of the receiving member 20 can be defined through the receiving member 20 intermediate the first side 60 and the second side 62. The bore 32 can be configured to at least partially or fully align with the bore 30 of the engaging member 18 when the engaging member 18 is engaged with receiving member 20. Upon engagement of the engaging member 18 with the receiving member 20, the second face 36 of the engaging member 18 can be positioned adjacent to, or in abutting contact with, the first side 60 of the receiving member 20. In one embodiment, a raised lip 64, protrusion, projection, or other structure can extend from the first side 60. In one embodiment, the raised lip 64 can comprise an arcuate portion and can comprise a circular-shaped perimeter. In other embodiments, the raised lip 64 can comprise a perimeter, shape, and/or configuration configured to engage the groove in the engaging member 18. The raised lip 64 can at least partially or fully surround the bore 32. In one embodiment, the raised lip 64 can be configured to sealingly engage the groove 40 when the engaging member 18 is engaged with the receiving member 20. In various embodiments, portions of the raised lip 64 and/or portions of the groove 40 can comprise a sealing substance or member, for example. In other various embodiments, the seal between the raised lip 64 and the groove 40 can be made without a sealing substance or member. In an embodiment in which the second face 36 of the engaging member 18 comprises a raised lip, the first side 60 of the receiving member 20 can comprise a groove configured to receive the raised lip, or sealing engage the raised lip, for example. In various embodiments, the raised lip and the groove can be shaped and situated to compliment and/or engage each other when one of the raised lip and the groove is positioned on the engaging member 18 and one of the raised lip and the groove is positioned on the receiving member 20. In one embodiment, the receiving member 20 can comprise the raised lip 64 and the groove, such that the raised lip 64 can be engaged with the groove 40 and the groove can be engaged with the raised lip on the engaging member 18 when the engaging member 18 is engaged with or positioned adjacent to the receiving member 20. In other various embodiments, a sealing member or material can be positioned intermediate the engaging member 18 and the receiving member 20, for example.

In one embodiment, referring to FIGS. 2, 3, 7, 8, 10, and 11, for example, the receiving member 20 can comprise apertures 48. Suitable fasteners can be passed through the apertures 48 to engage the receiving member 20 with the side wall 11 of the basin 12.

In one embodiment, at least one projection 66 can extend outwardly from the first side 60 of the receiving member 20. The at least one projection 66 can form a receiving portion 68 intermediate a portion of the at least one projection 66 and a portion of the first side 60. When the engaging member 18 is engaged with the receiving member 20, the engaging member 18 can be at least partially guided by the at least one projection 66 during insertion of the engaging member 18 onto the receiving member 20 and can be at least partially positioned within the receiving portion 68 when engaged with the receiving member 20 to form a connection or an engagement between the engaging member 18 and the receiving member 20. In one embodiment, portions of the outer edge 42 of the engaging member 18 can be at least partially engaged with the receiving portion 68 when the engaging member 18 is engaged with the receiving member 20.

In one embodiment, the at least one projection 66 can comprise a first projection, a second projection, and a third projection. The receiving member 20 can comprise a top edge 70 and a bottom edge 72. The first projection and the second projection can be positioned proximate to the top edge 70, and the third projection can be positioned proximate to the bottom edge 72, or proximate to a midpoint of the bottom edge 72. In one embodiment, the number of projections on the receiving member 20 can vary, as will be recognized by those of skill in the art. For example, four or more projections can be used. In an embodiment where only one projection is used, that projection can comprise an arcuately-shaped receiving portion, a truncated oval-shaped receiving portion, a ½ square or rectangular-shaped receiving portion, a truncated trapezoid-shaped receiving portion, a semi-circular-shaped receiving portion, and/or a triangular-shaped receiving portion, for example. Those of ordinary skill in the art will recognize that the perimetrical shape of the engaging member 18 can drive the shape of the receiving portion of the projection. For example, if the engaging member comprises a U-shaped perimeter, the receiving member can comprise a U-shaped receiving portion, such that the engaging member can be engaged with the receiving member.

In one embodiment, referring to FIGS. 16-21, another connector assembly 116 for a vortex valve is illustrated. The connector assembly 116 can be similar to the connector assembly 16 described above (like numerals will describe like elements), but, in this embodiment, an engaging member 118 can comprise tapered or angled portions 144 and at least one projection 166 can comprise tapered or angled portions 145 to facilitate engagement of the engaging member 118 with a receiving member 120. In one embodiment, the engaging member 118 can comprise a triangular-shaped perimeter, for example. In various embodiments, a tapered or angled portion 144 can be positioned proximate to each corner of the triangular-shaped engaging member 118. The tapered or angled portion or portions 144 can be sized and configured to engage the tapered or angled portion or portions 145. The engaging member 118 can comprise a top edge 121 and a point 123. Tapered or angled portions 144 on the engaging member 118 can be positioned proximate to each corner of the first portion 118 near the top edge 121 and another tapered or angled portion 144 can be positioned proximate to the point 123. In one embodiment, the receiving member 120 can comprise a first projection 166, a second projection 166, and a third projection 166. Each of the projections 166 can comprise a receiving portion 168. Each receiving portion 168 can comprise the tapered or angled portion 145. The tapered or angled portions 145 of the receiving member 120 can be configured to mate with the tapered or angled portions 144 of the engaging member 118, such that the engaging member 118 can be essentially wedge-fit or press-fit into the projections 166 of the receiving member 120 while restricting over insertion of the engaging member 118. Although a triangular engaging member 118 and projections 166 on the receiving member 120 for receiving the same are illustrated, those of skill in the art will recognize that the engaging member can comprise a different shape and that the projections on the receiving member can be configured and arranged to receive such a differently shaped first portion.

In various embodiments, still referring to FIGS. 16-21, the tapered or angled portions 144 of the engaging member 118 and the tapered or angled portions 145 of the receiving member 120 can each comprise a feature that allows the engaging member 118 to essentially be removably locked into engagement with the receiving member 120 when the engaging member 118 is fully or at least mostly engaged or slidably engaged with the receiving member 120. Such a feature can also indicate to the installer of the first portion 118 that the engaging member 118 is fully and/or appropriately engaged with the receiving member 120. In various embodiments, the engaging member 118 can be snap-fit with the receiving member 120 and a "clicking" sound can be heard by the installer when the engaging member 118 is fully engaged with the receiving member 120. In one embodiment, one or more of the tapered or angled portions 144 can comprise a recess, for example, and one or more of the tapered or angled portions 145 can comprise a lip. The lip can at least partially engage the recess to removably interlock the engaging member 118 and the receiving member 120. In other various embodiments, one or more of the tapered or angled portions 144 can comprise a lip and one or more of the tapered or angled portions 145 can comprise the recess, for example, to accomplish a similar form of engagement between the first portion 118 and the second portion 120. Other suitable methods of removably interlocking the engaging member 118 and the receiving member 120 are within the scope of the present disclosure. If the recess and lip described above are provided, a user of the connector assembly 116 can slightly pull apart the engaging member 118 and the receiving member 120 to "unlock" the lip from the recess so that the engaging member 118 and the vortex valve can be removed from the receiving member 120 for maintenance, for example.

Figure 22:
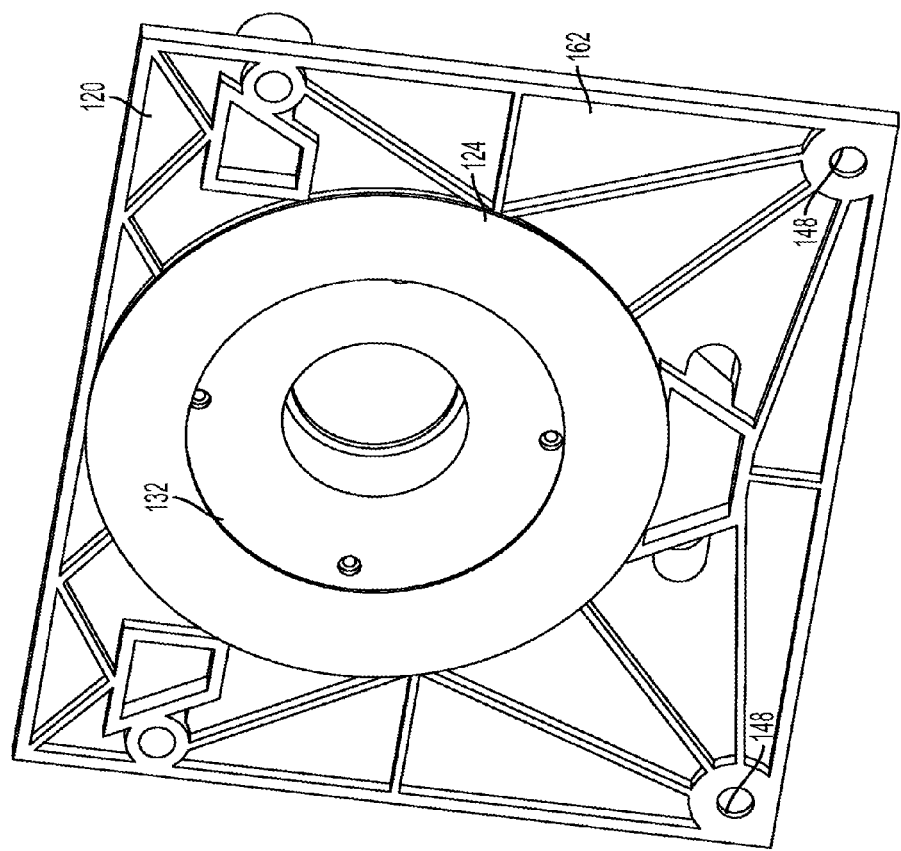
FIGS. 22 and 23 are views of a sealing member positioned on a receiving member of the connector assembly of FIG. 16 in accordance with various non-limiting embodiments.
Figure 23:
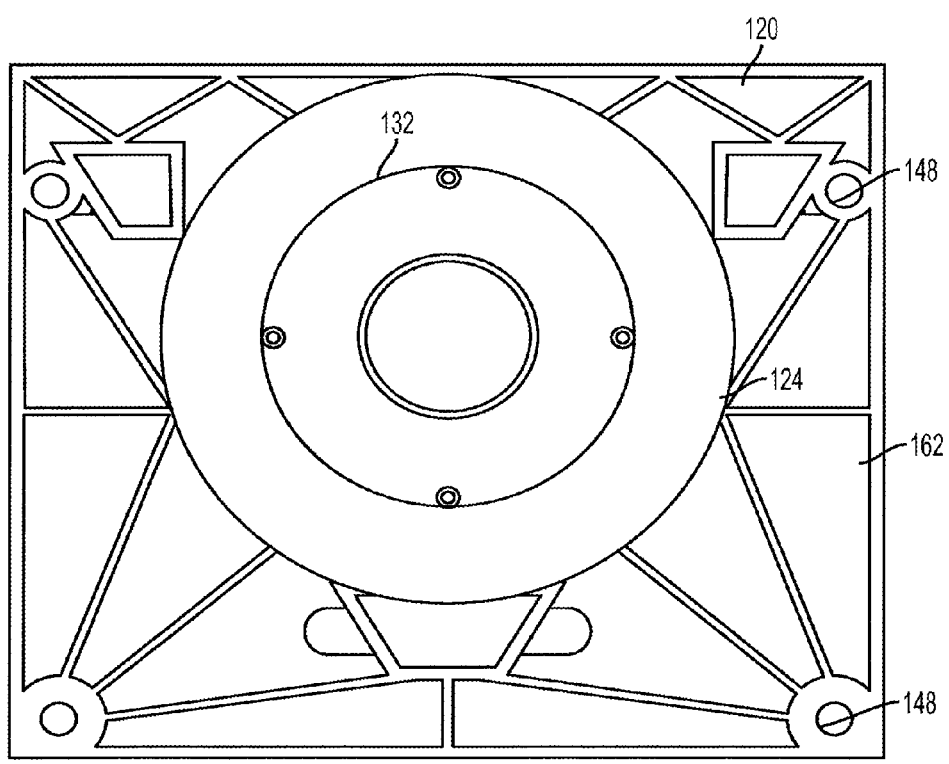
Figure 24:
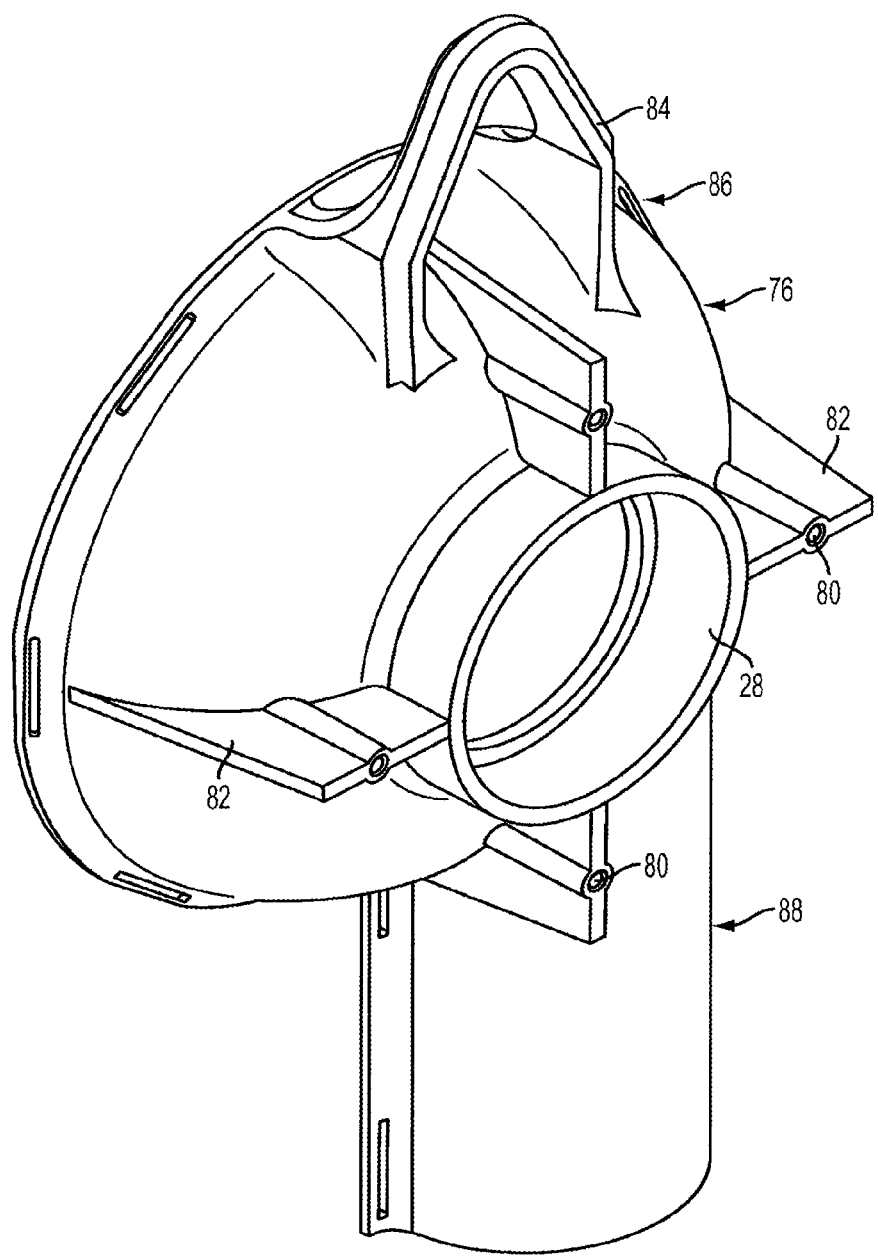
FIG. 24 is a front perspective view of a first portion of a flow restricting apparatus in accordance with one non-limiting embodiment.
Figure 25:
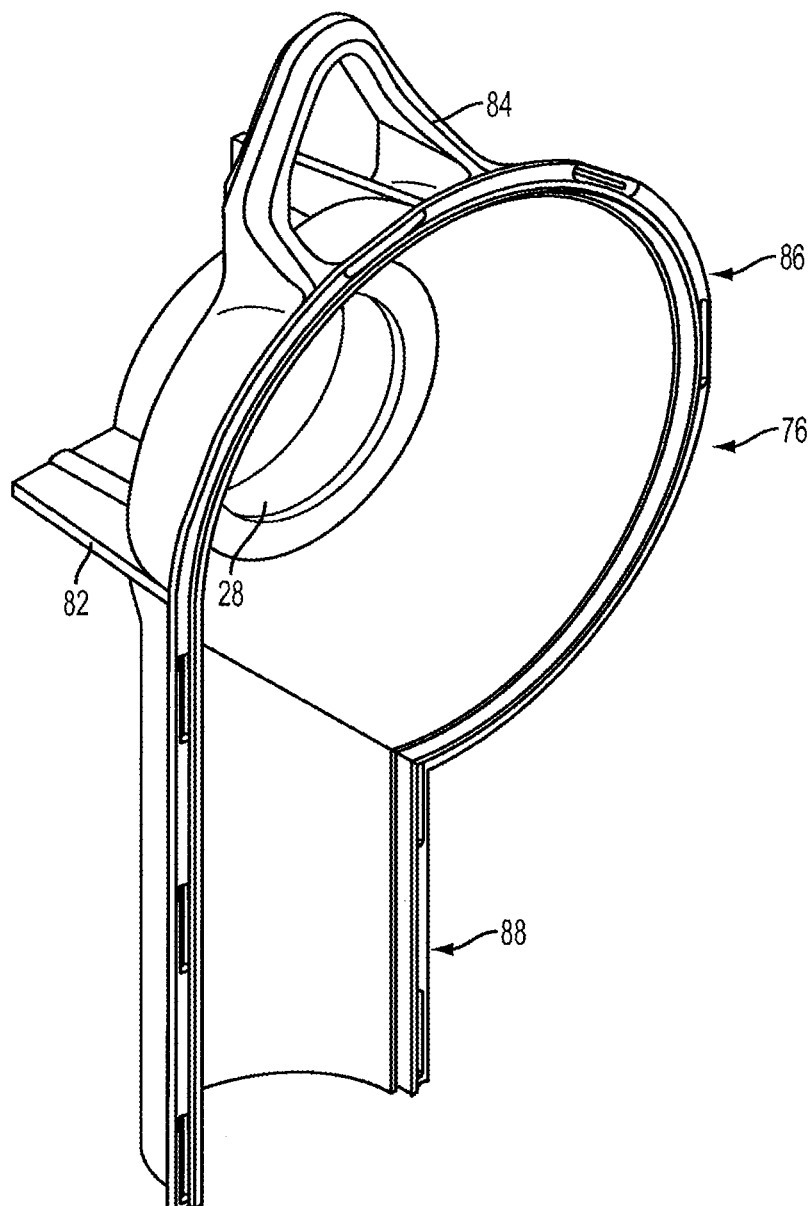
FIG. 25 is a rear perspective view of the first portion of FIG. 24 in accordance with one non-limiting embodiment.

In one embodiment, referring to FIGS. 22 and 23, a gasket 124 is illustrated. In various embodiments, the gasket 124 or another suitable gasket can be used with the connector assembly 16 and/or the connector assembly 116. In one embodiment, the gasket 124 can comprise any suitable sealing member or material, such as a neoprene material, for example. The gasket 124 can be used to create a fluid-tight, or substantially fluid-tight, seal between the second side 162 of the receiving member 120 and the side wall 11 of the basin 12. In one embodiment, the gasket 124 can be positioned around the bore 132, or partially around the bore 132. In other embodiments, the gasket 124 can be positioned around, or partially around, a perimeter of the second side 162 of the receiving member 120. The gasket 124 can be attached to the second side 162 of the receiving member 120 using any suitable technique, such as gluing, for example. In other embodiments, the second side 162 can comprise a recess or groove configured to receive the gasket 124.

In one embodiment, referring to FIGS. 24-29, the vortex valve 10 can comprise a first portion 76 and a second portion 78. The first portion 76 can be configured to be attached to the engaging member 18 using the connection members 52. The first portion 76 can comprise the apertures 80 configured to receive the connection members 52. The first portion 76 can also define the outlet 28 of the vortex valve 10. In one embodiment, the apertures 80 can be positioned around, about, and/or proximate to the outlet 28 such that the annular flange 38 can be placed into fluid communication with the outlet 28 when the engaging member 18 is engaged with the first portion 76. In various embodiments, the first portion 76 can comprise fins 82 extending therefrom which can form the apertures 80, for example. In one embodiment, the first portion 76 can comprise a handle 84 or grip configured to be used to raise and lower the vortex valve 10 and the engaging member 18 attached thereon into a position of engagement with the receiving member 20 within a basin, a drainage gully, or other suitable location. In one embodiment, the handle 84 can be positioned on the engaging member 18 instead of on the first portion 76. The first portion 76 can comprise a dome-shaped portion 86 and an elongate portion 88.

Figure 26:
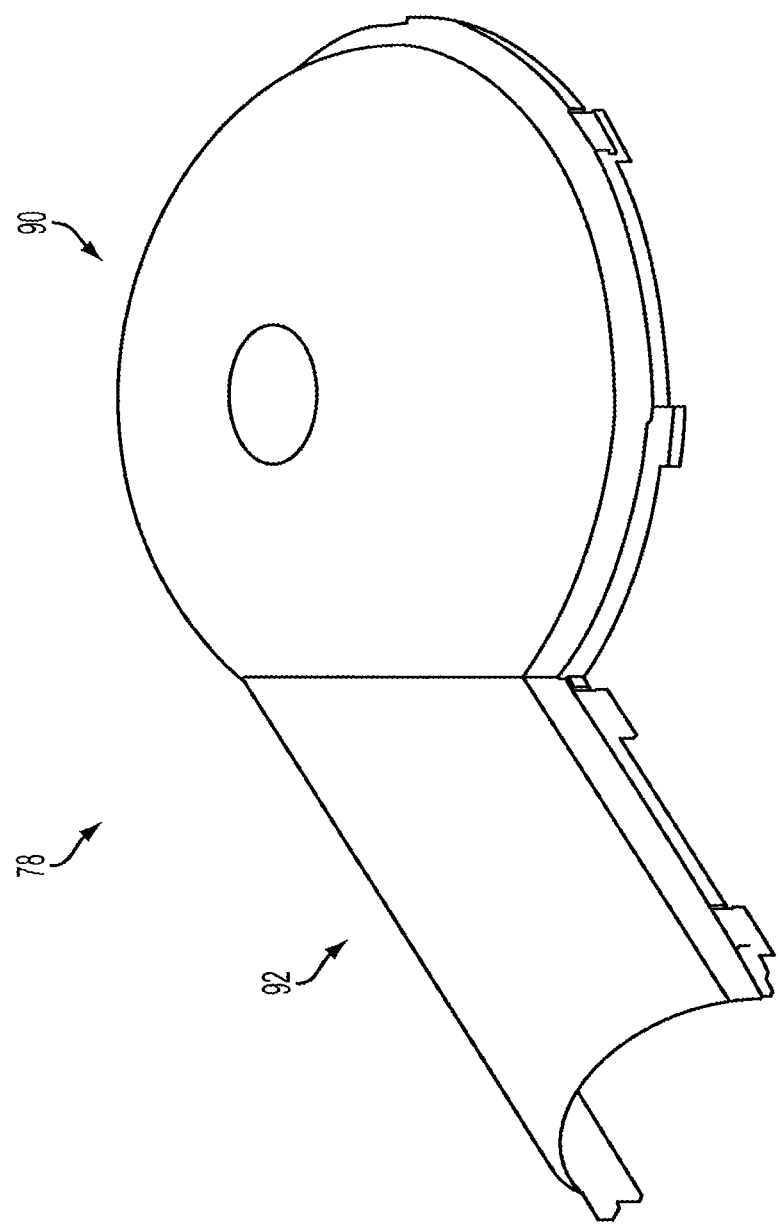
FIG. 26 is a front perspective view of a second portion of a flow restricting apparatus in accordance with one non-limiting embodiment.
Figure 27:
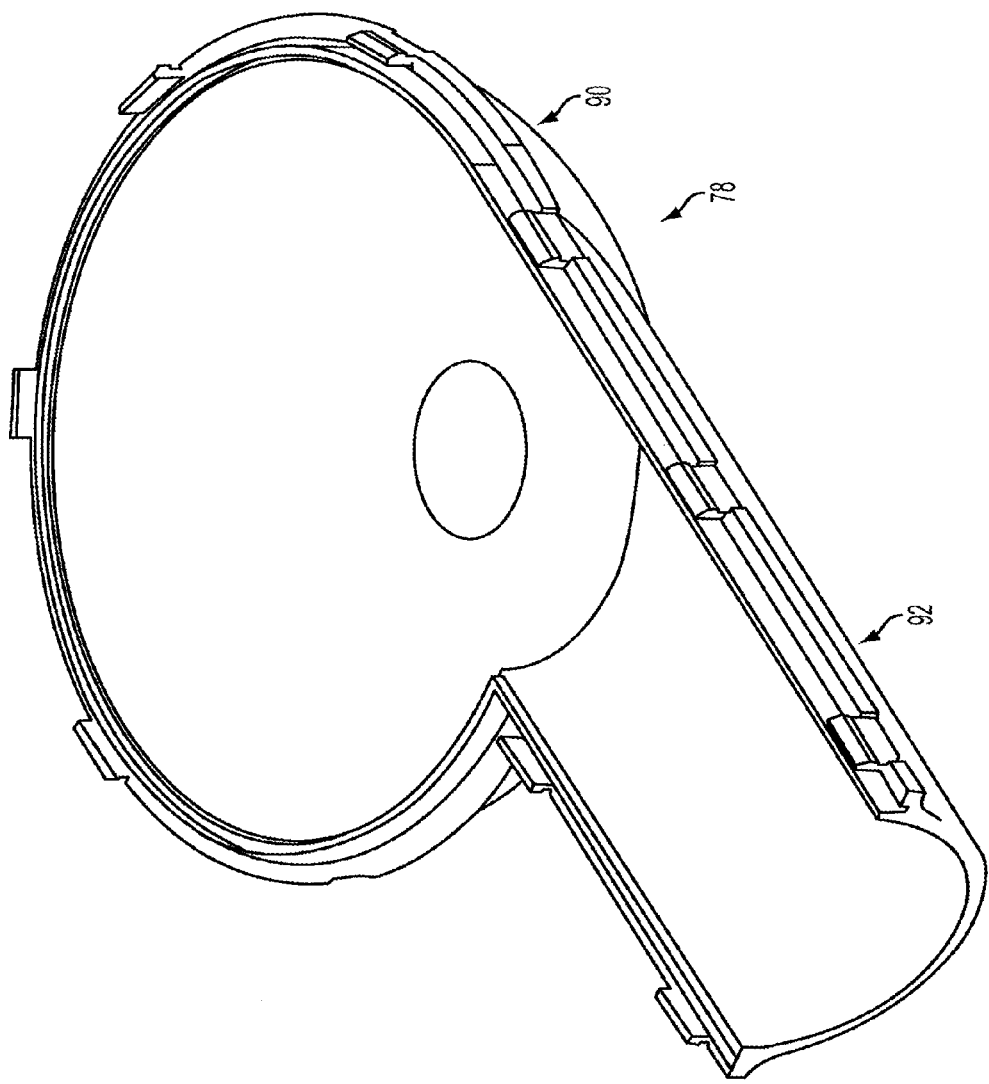
FIG. 27 is a rear perspective view of the second portion of FIG. 26 in accordance with one non-limiting embodiment.

In one embodiment, referring to FIGS. 26 and 27, the second portion 78 can comprise a dome-shaped portion 90 and an elongate portion 92. The dome-shaped portion 90 and the elongate portion 92 can be configured to be engaged with or attached to the dome shaped-portion 86 and the elongate portion 88, respectively, to form the vortex valve 10. In various embodiments, the first portion 76 can be connected to the second portion 78 using any suitable methods, such as snap-fitting, press-fitting, interlocking, gluing, and/or welding, for example. In one embodiment, when the first portion 76 is assembled to the second portion 78, the elongate portions 88 and 92 can define the inlet 26 of the vortex valve 10, while the dome-shaped portions 86 and 90 can define a vortex chamber of the vortex valve 10. In other various embodiments, the vortex valve 10 can be formed of one piece, though injection molding or other suitable process, for example.

Figure 28:
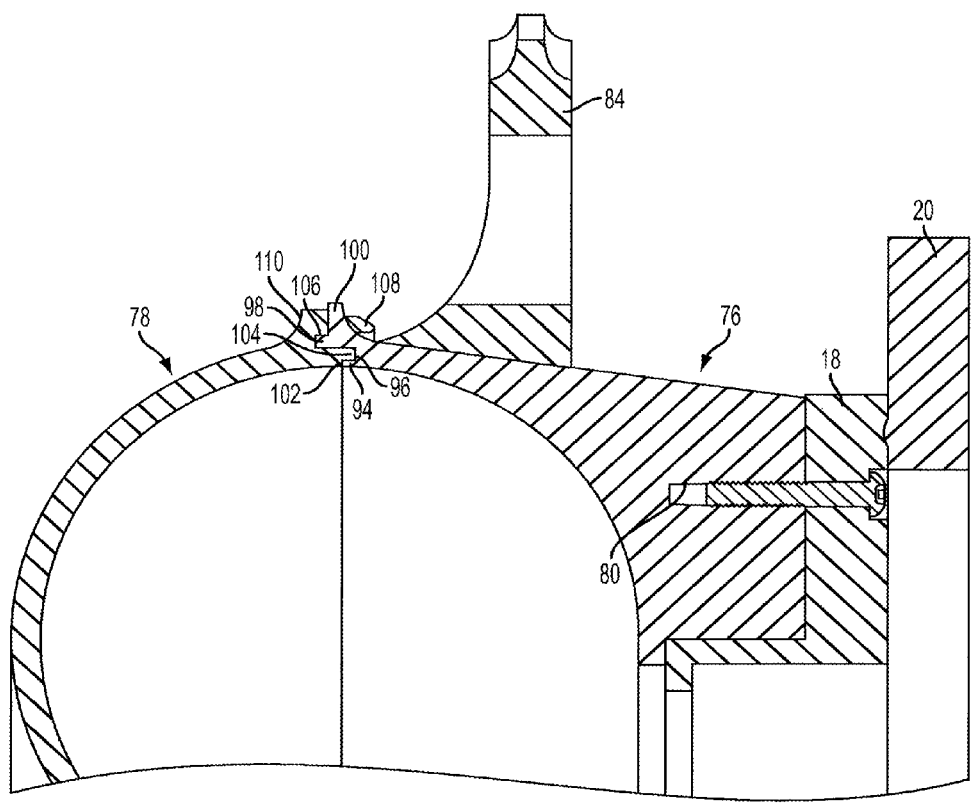
FIGS. 28 and 29 illustrate the connection between a first portion of a flow restricting apparatus and a second portion of the flow restricting apparatus in accordance with one non-limiting embodiment.
Figure 29:
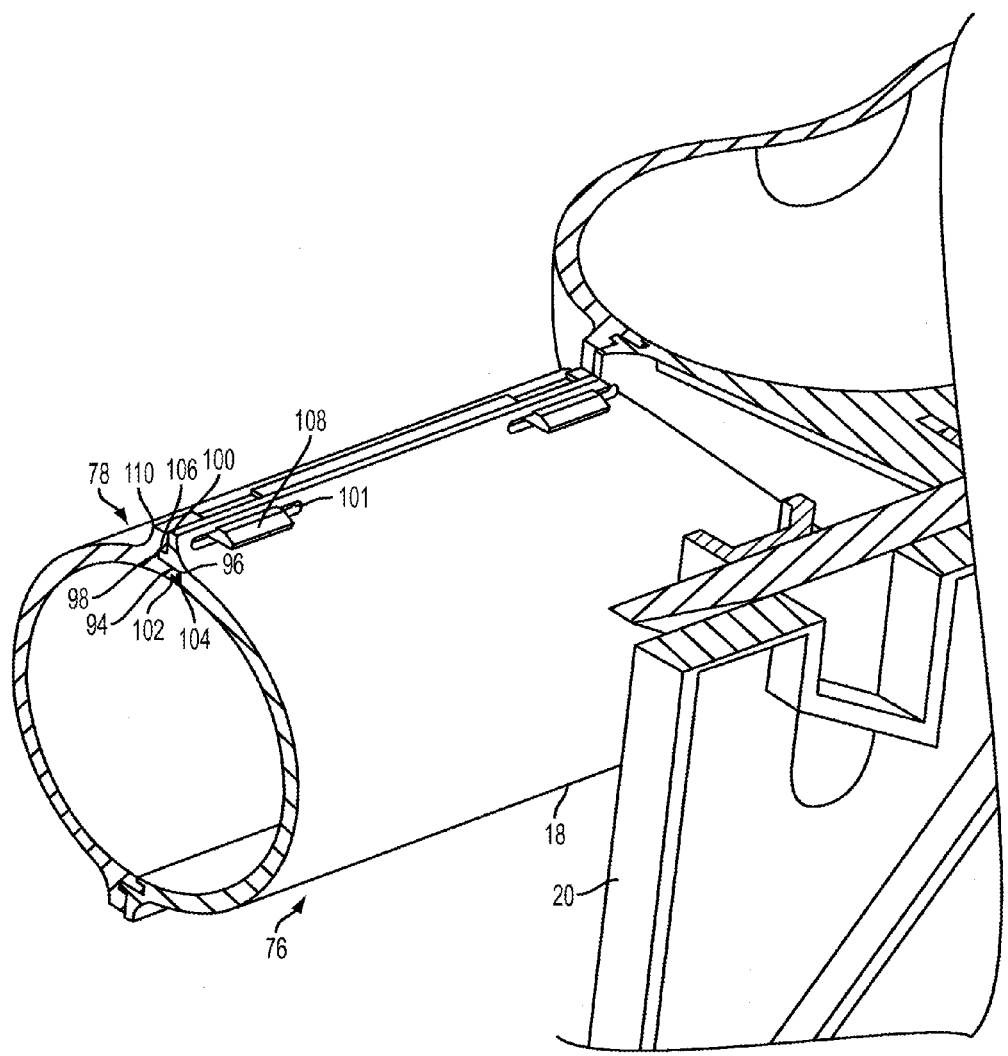
Figure 30:
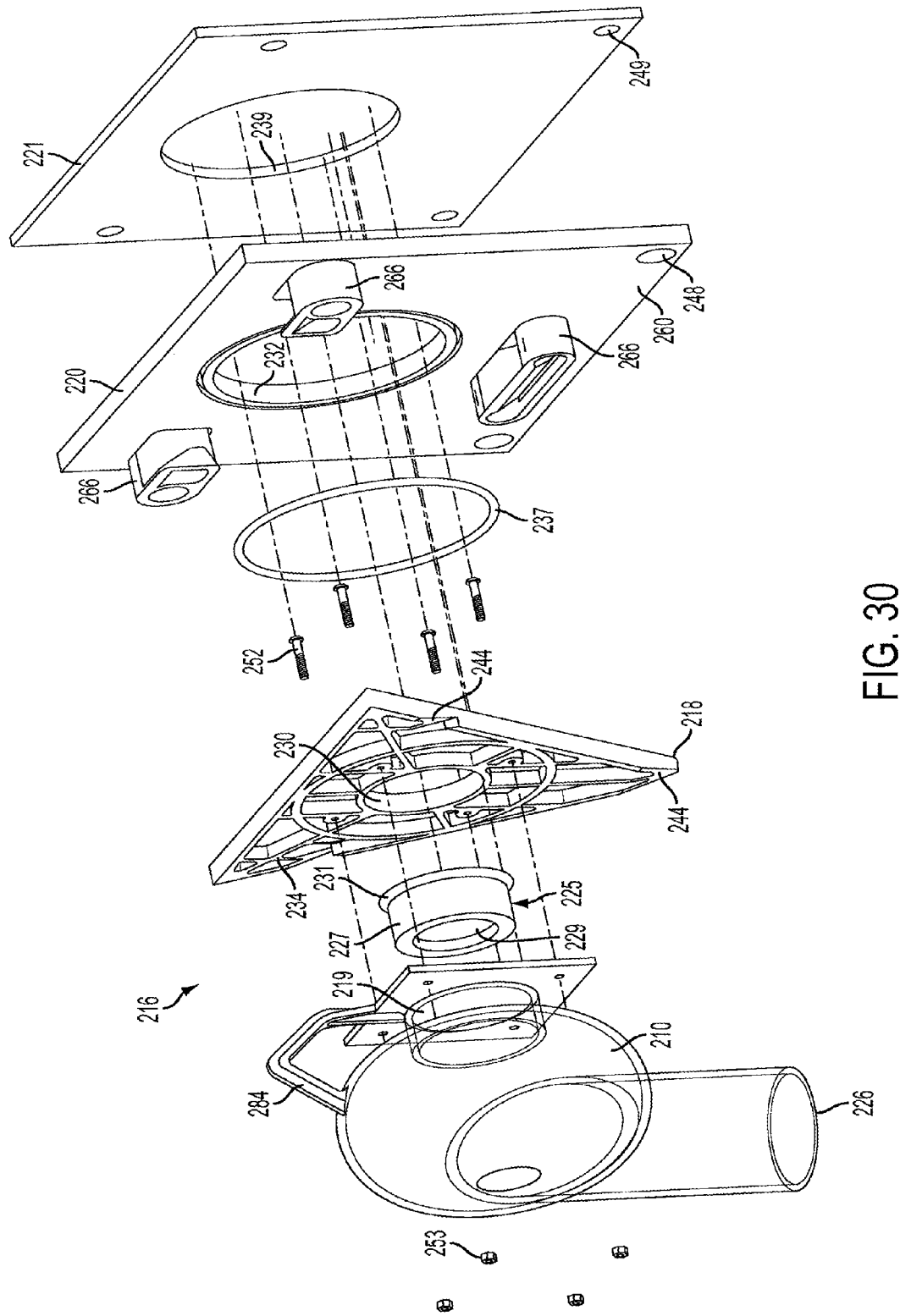
FIG. 30 is an exploded perspective view of a connector assembly for a flow restricting apparatus in accordance with one non-limiting embodiment.
Figure 31:
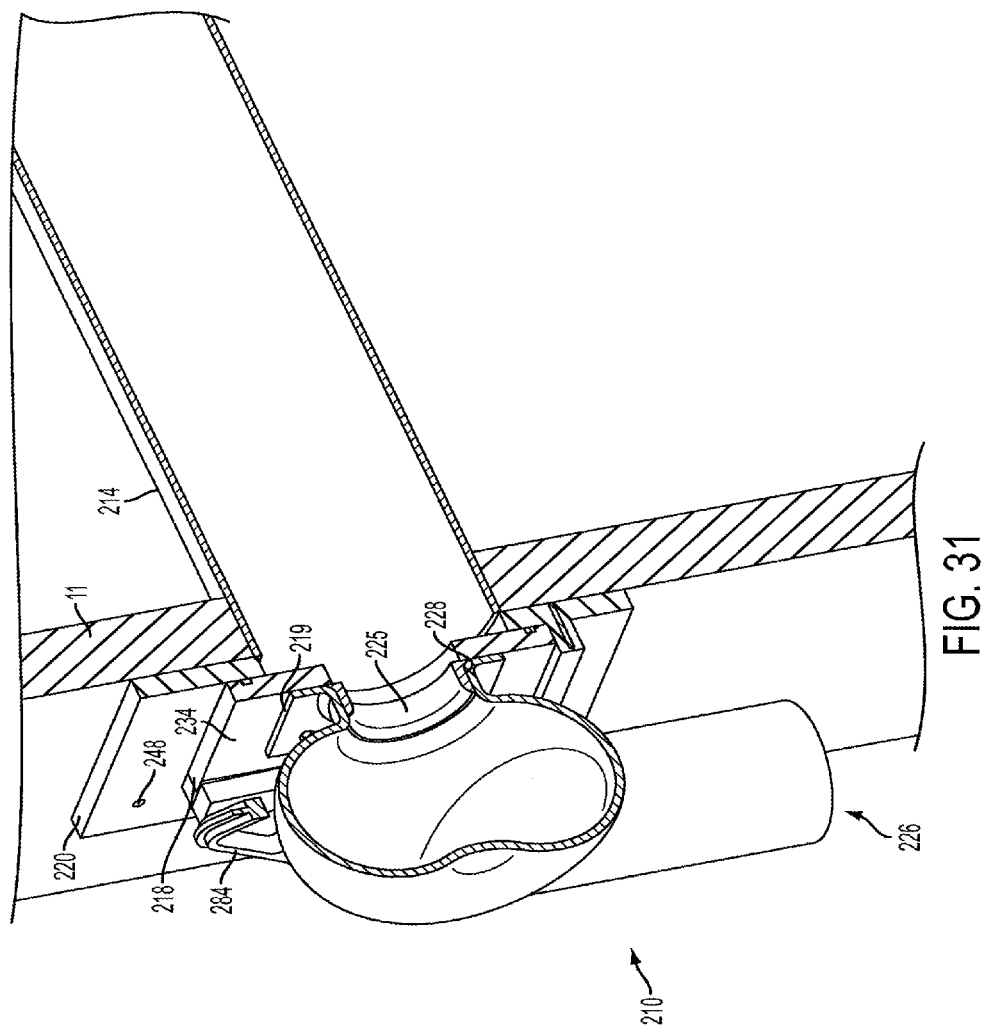
FIG. 31 is a partial cut-away perspective view of the connector assembly of FIG. 30 installed in a basin and engaged with an outlet conduit in accordance with one non-limiting embodiment.
Figure 32:
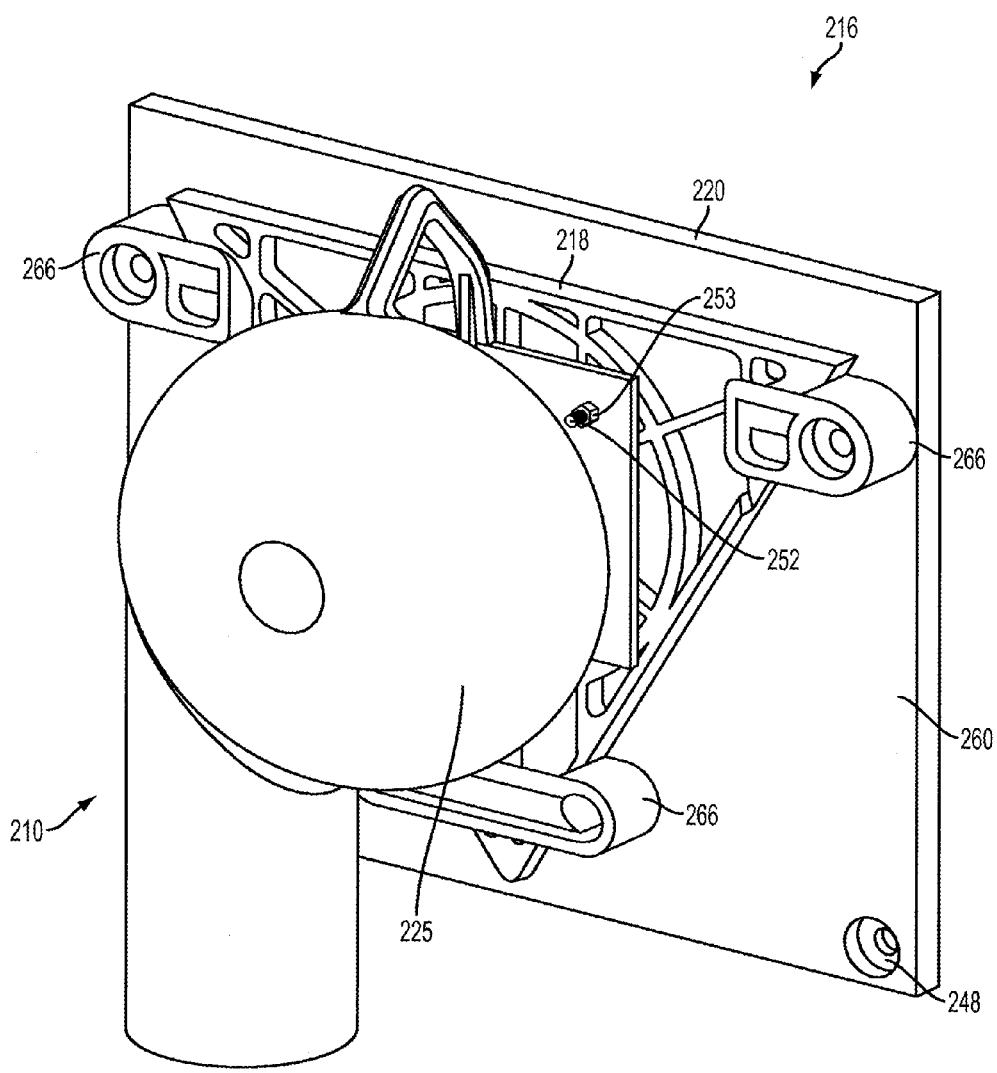
FIG. 32 is an illustrative perspective view of the connector assembly of FIG. 30 in accordance with one non-limiting embodiment.
Figure 33:
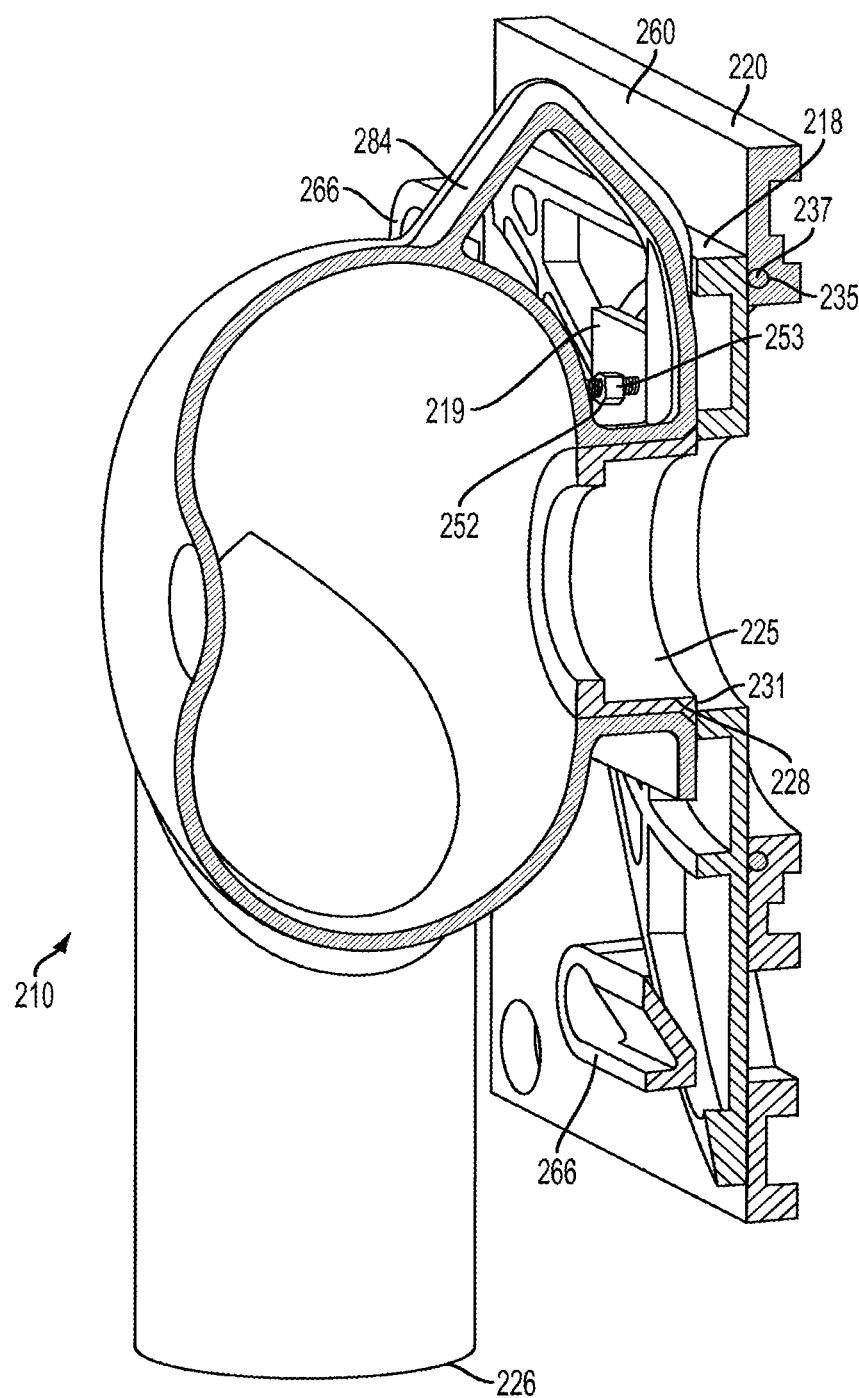
FIG. 33 is a cut-away perspective view of the connector assembly of FIG. 32 in accordance with one non-limiting embodiment.
Figure 34:
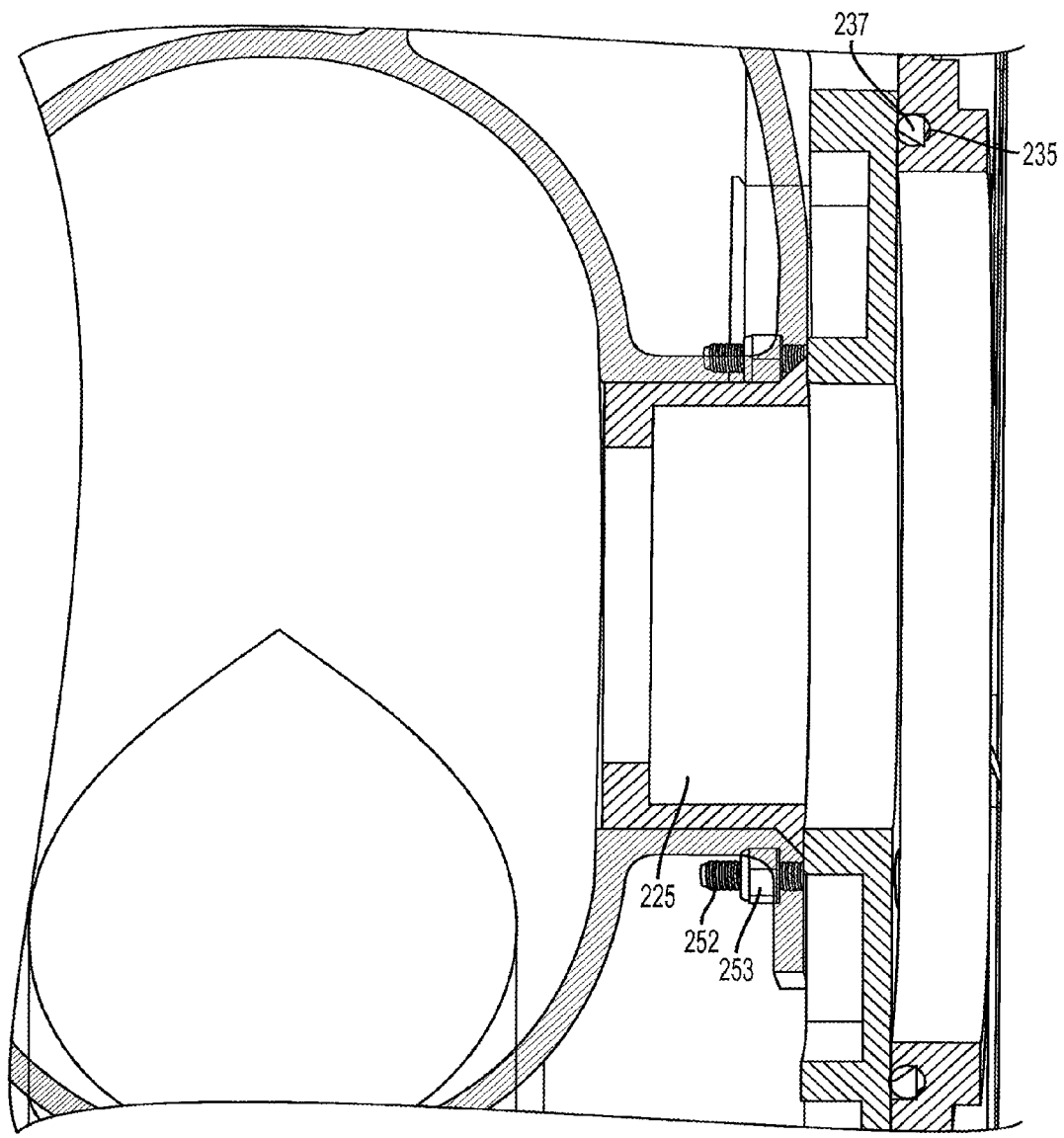
FIG. 34 is a partial cut-away side view of the connector assembly of FIG. 32 in accordance with one non-limiting embodiment.
Figure 35:
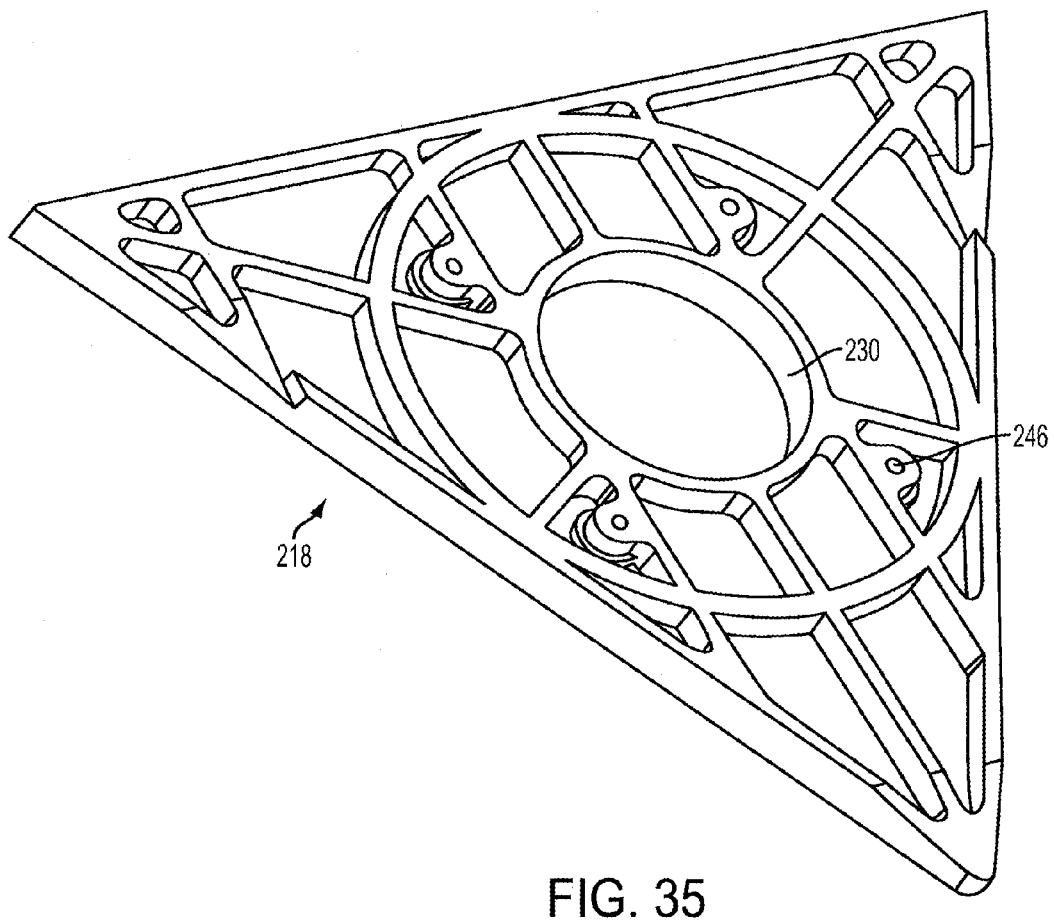
FIG. 35 is a perspective view of an engaging member of the connector assembly of FIG. 30 in accordance with one non-limiting embodiment.
Figure 36:
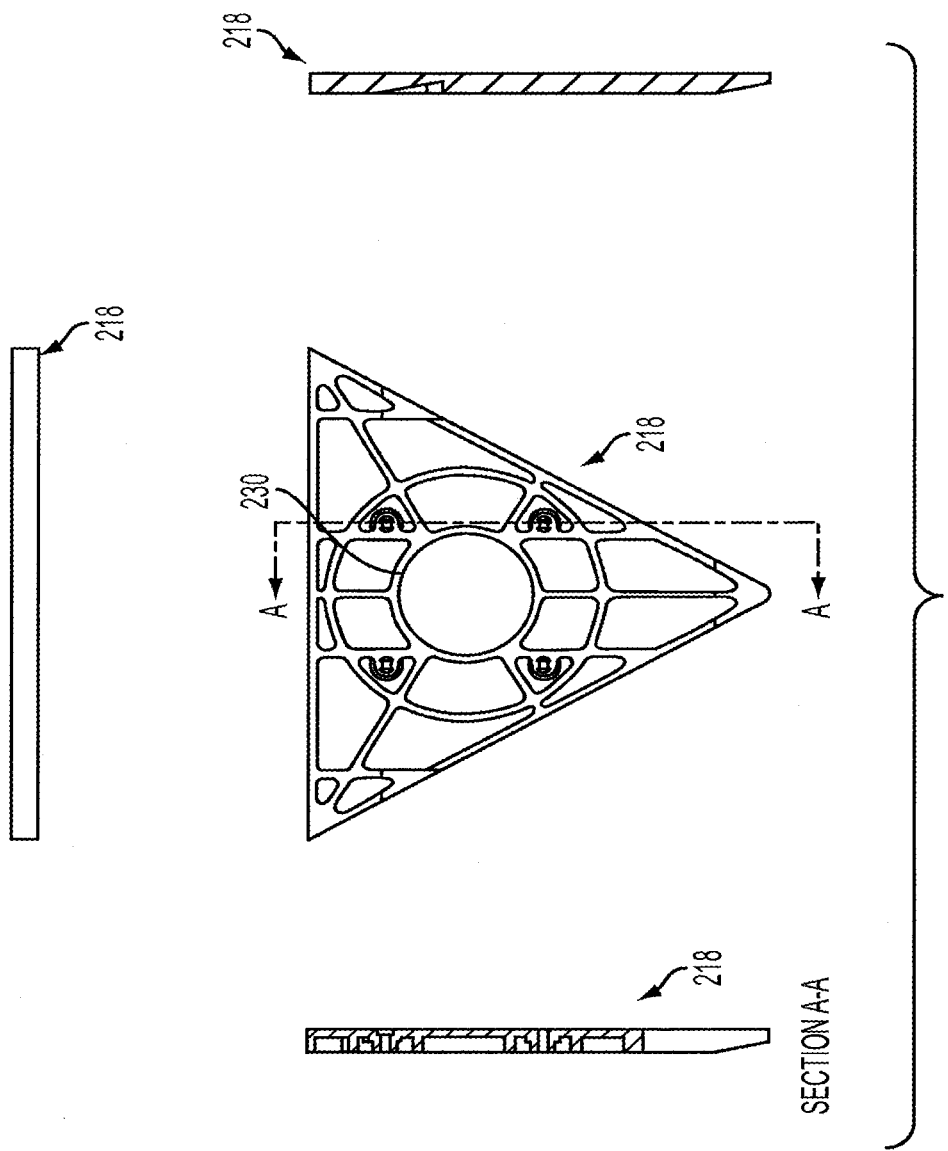
FIGS. 36 and 37 illustrate views of engaging members of the connector assembly of FIG. 30 in accordance with one non-limiting embodiment.
Figure 37:
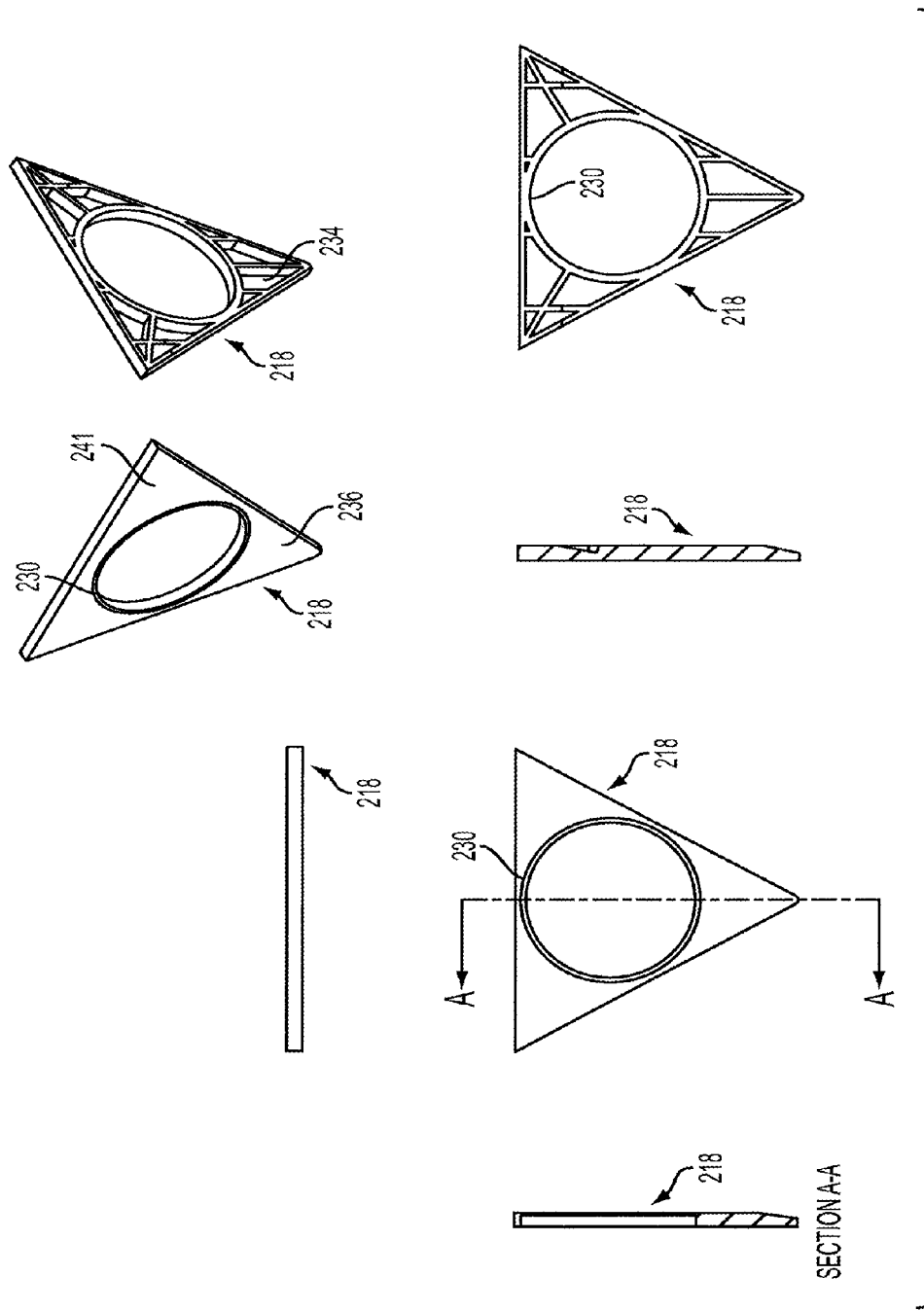
Figure 38:
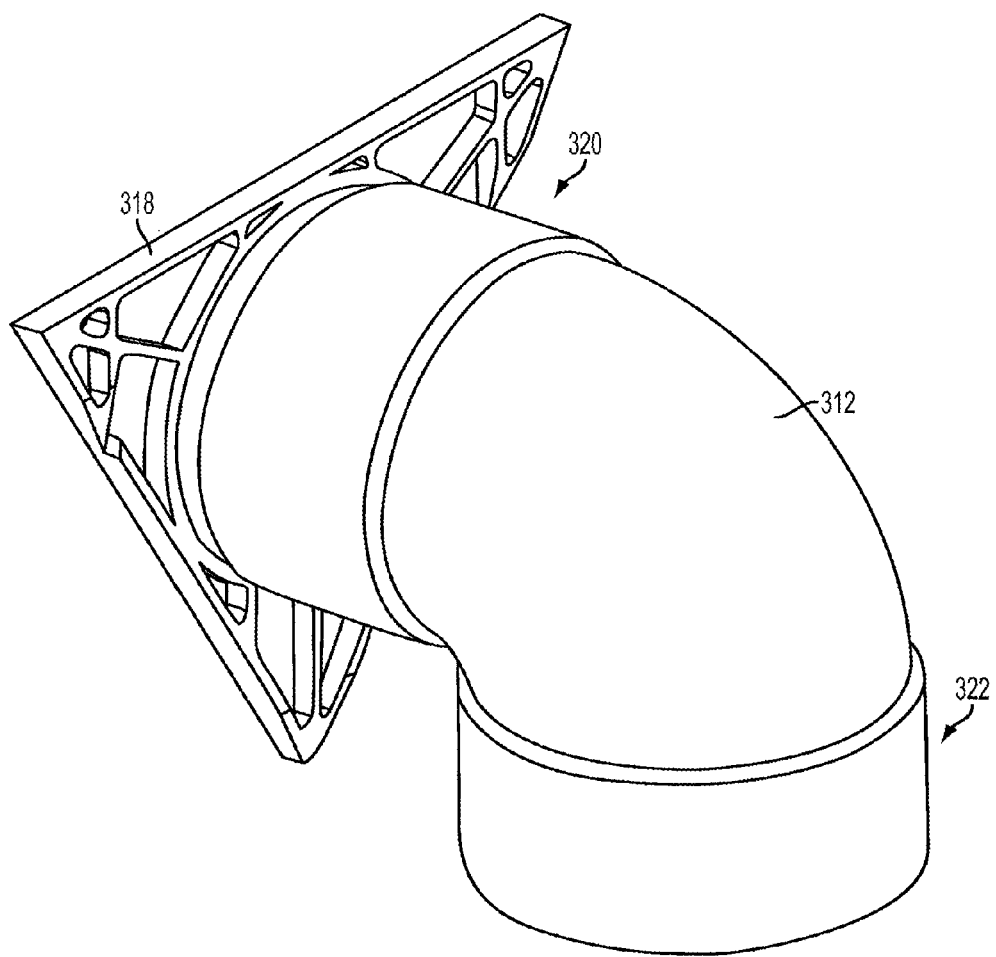
FIG. 38 is a perspective view of an engaging member attached to a fluid flow restricting assembly in accordance with one non-limiting embodiment.
Figure 39:
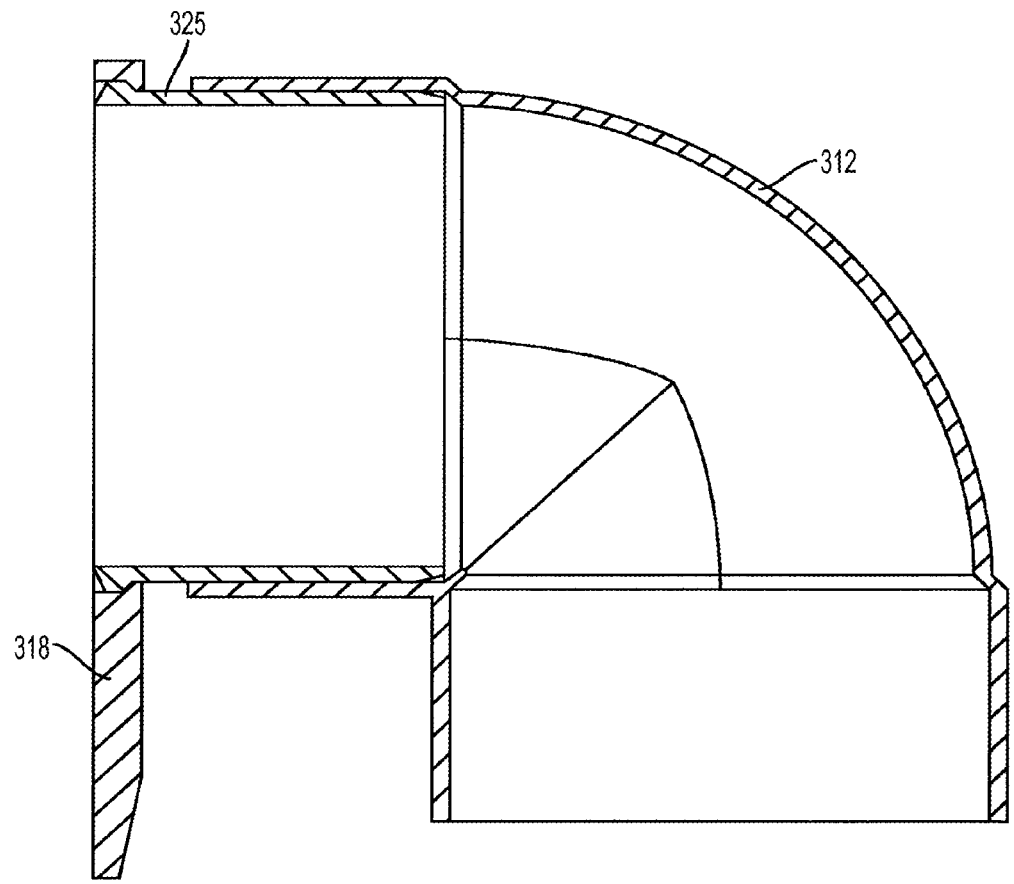
FIG. 39 is a cut-away side view of the engaging member attached to the flow restricting assembly of FIG. 38 in accordance with one non-limiting embodiment.
Figure 40:
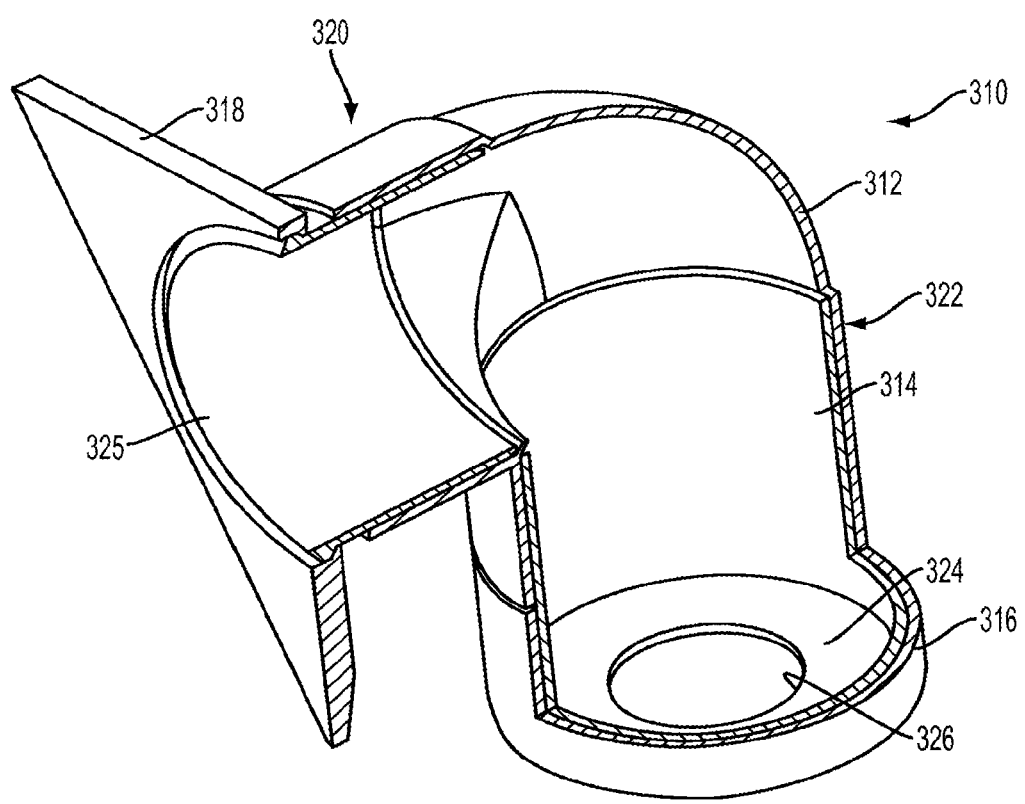
Figure 41:
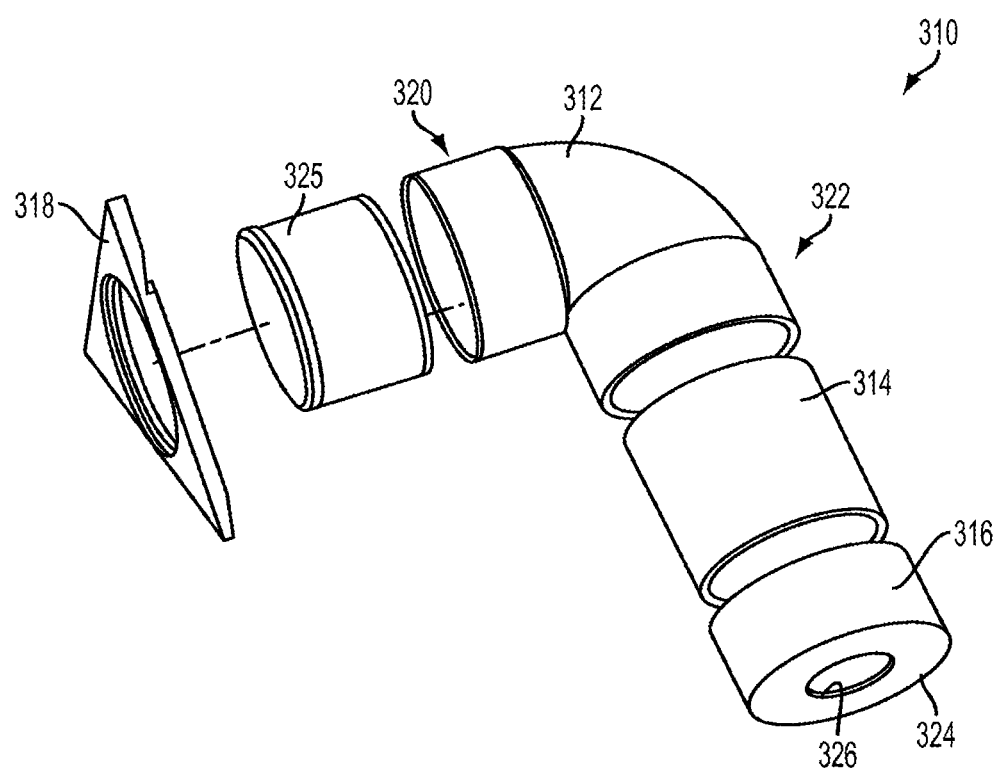
FIG. 41 is an exploded perspective view of the flow restricting assembly and the engaging member FIG. 40 in accordance with one non-limiting embodiment.
Figure 42:
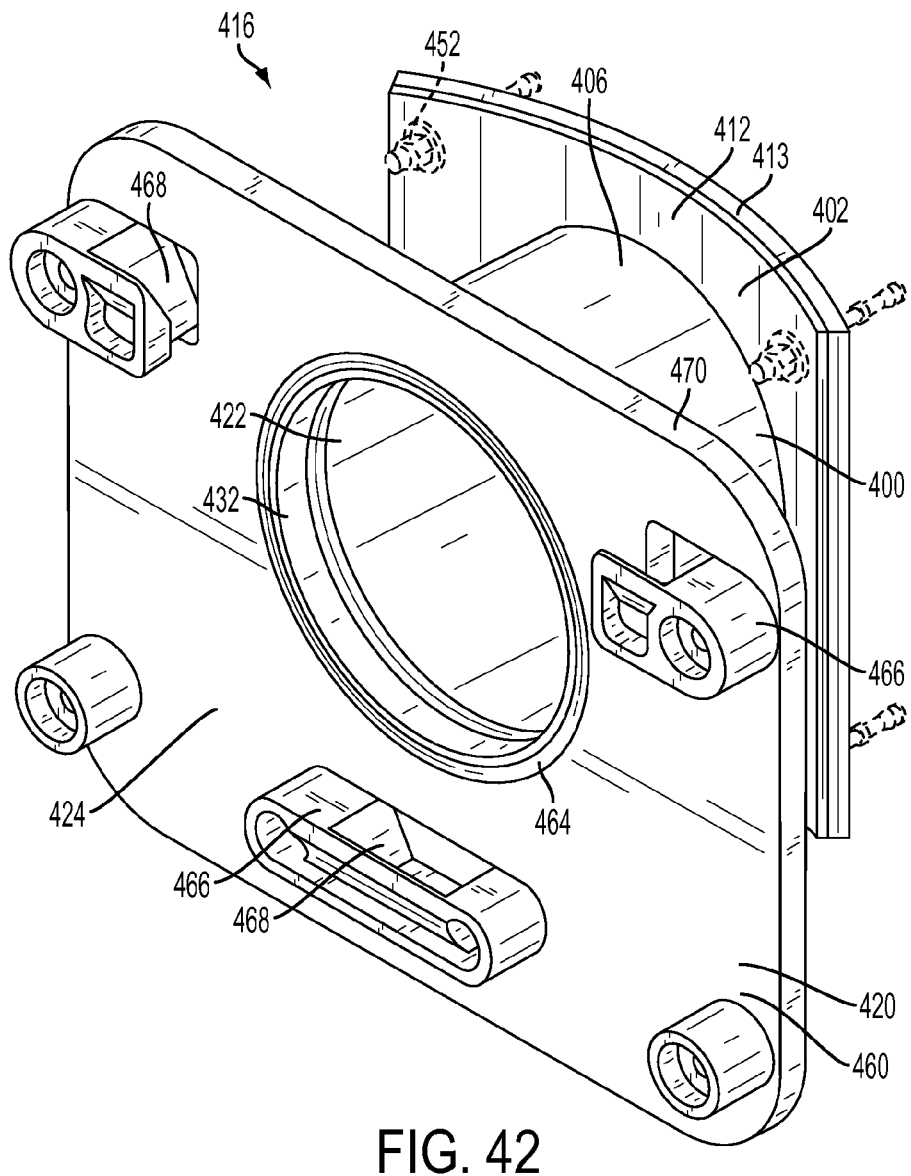
FIG. 42 is a perspective view of a basin adapter secured to a receiving member in accordance with one non-limiting embodiment.
Figure 43:
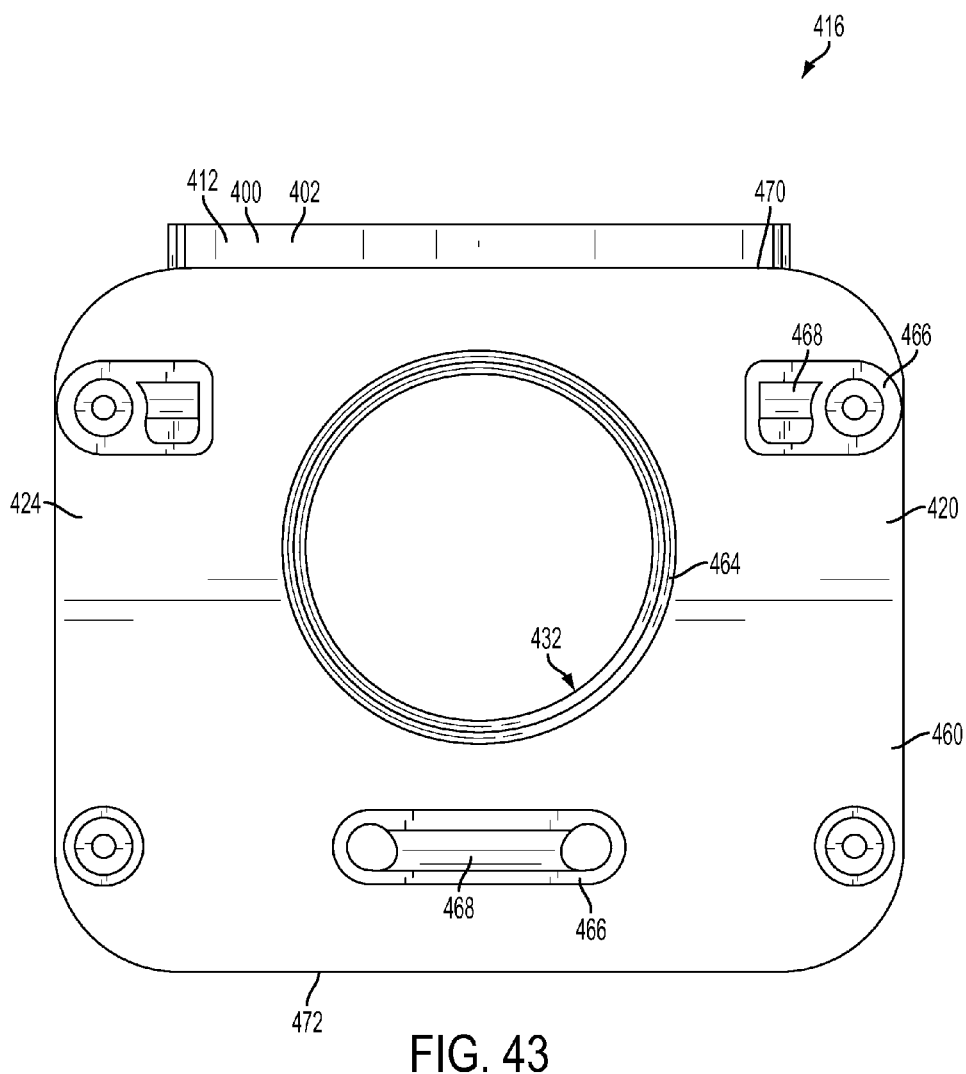
FIG. 43 is a front view of a basin adapter secured to a receiving member in accordance with the non-limiting embodiment shown in FIG. 42.
Figure 44:
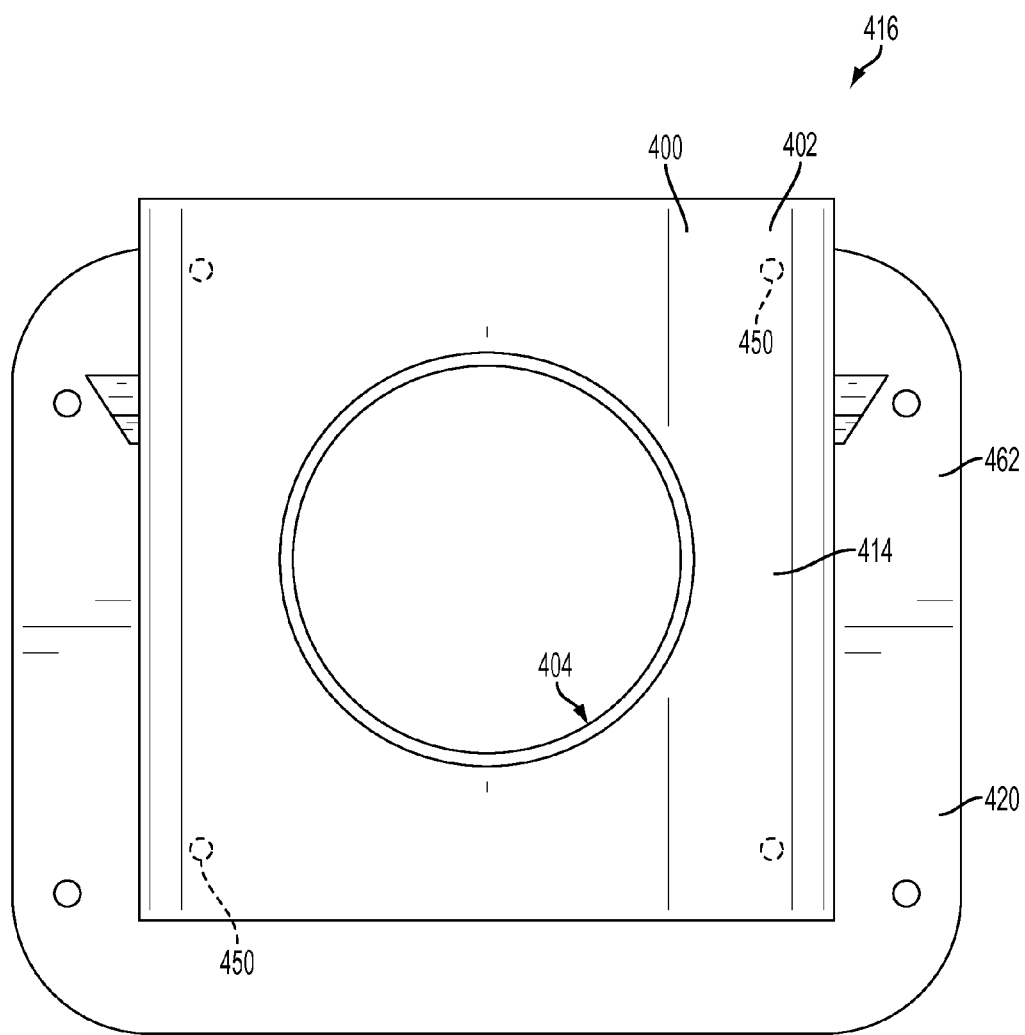
FIG. 44 is a rear view of a basin adapter secured to a receiving member in accordance with the non-limiting embodiment shown in FIG. 42.
Figure 45:
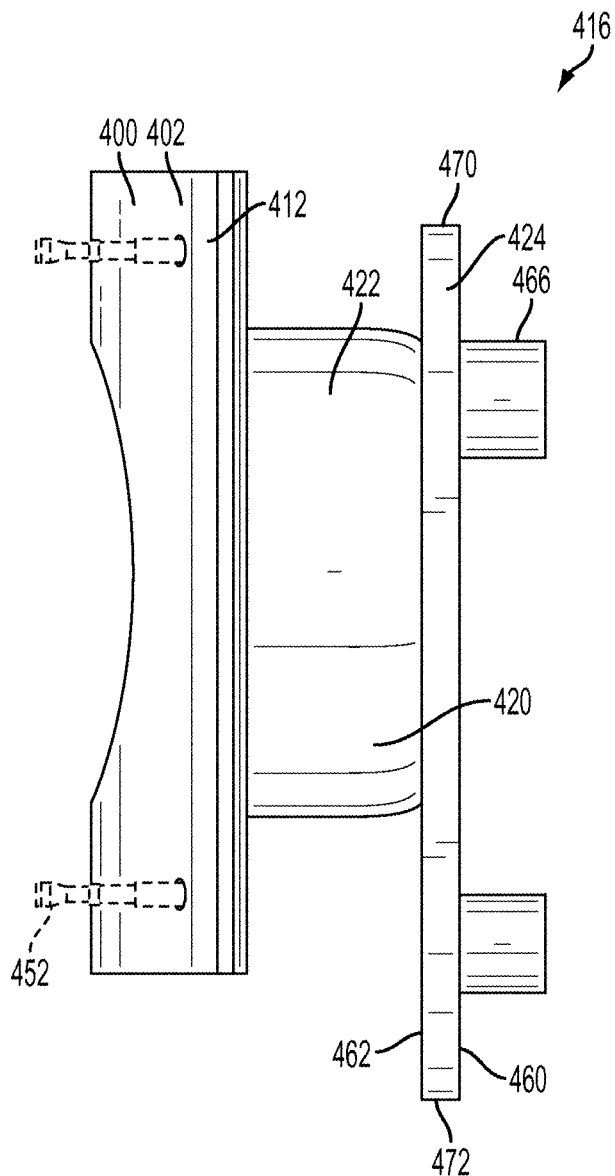
FIG. 45 is a right side view of a basin adapter secured to a receiving member in accordance with the non-limiting embodiment shown in FIG. 42.
Figure 46:
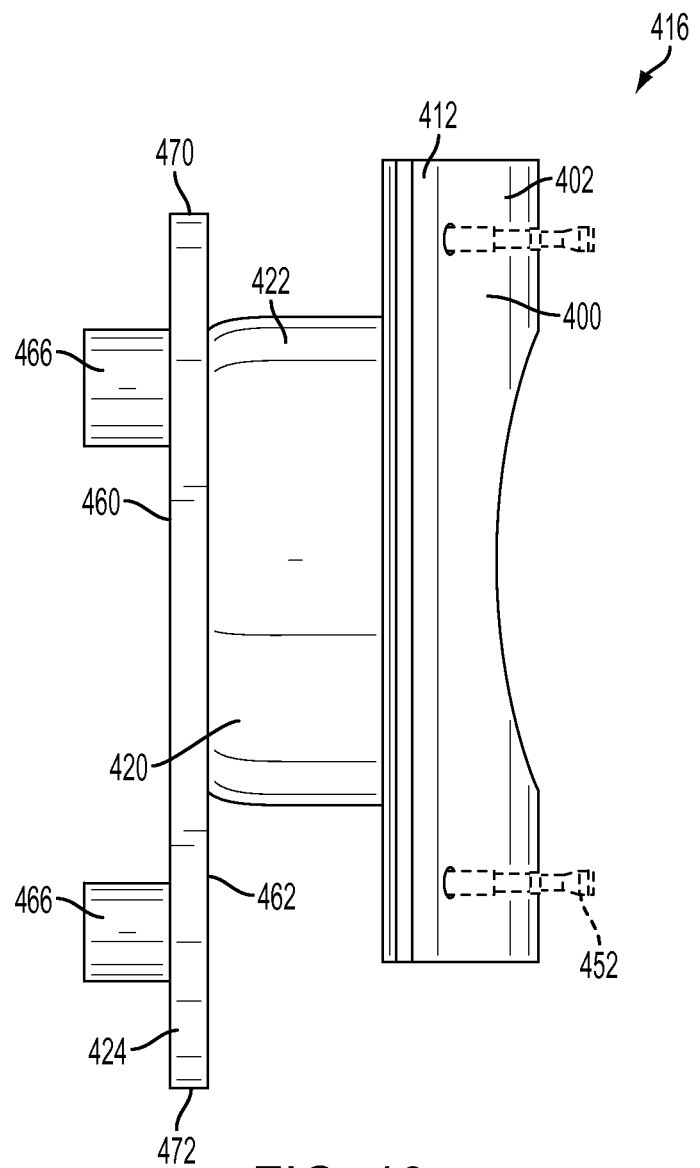
FIG. 46 is a left side view of a basin adapter secured to a receiving member in accordance with the non-limiting embodiment shown in FIG. 42.
Figure 47:
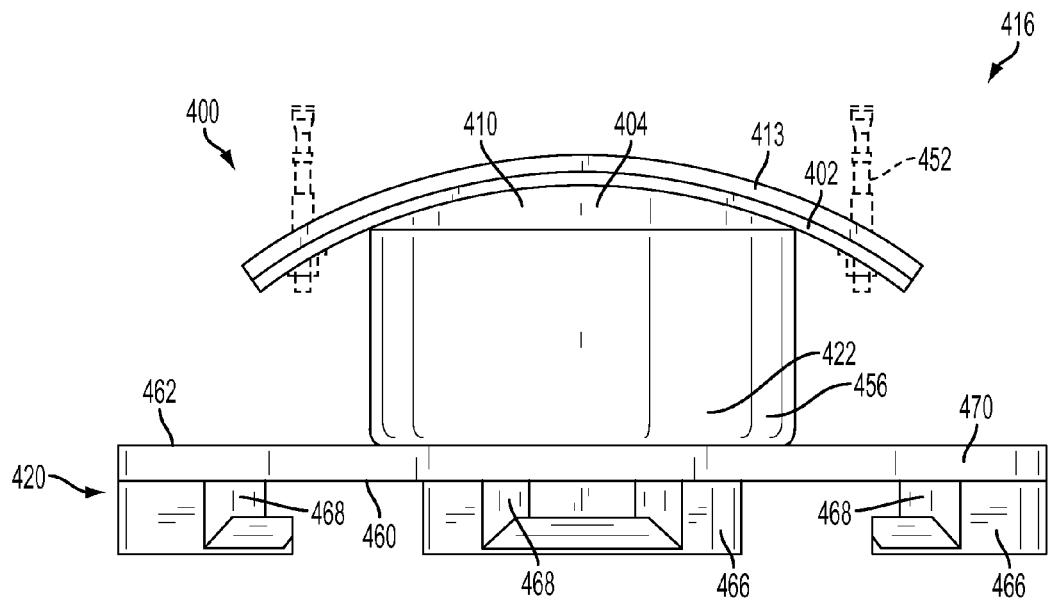
FIG. 47 is a top view of a basin adapter secured to a receiving member in accordance with the non-limiting embodiment shown in FIG. 42.
Figure 48:
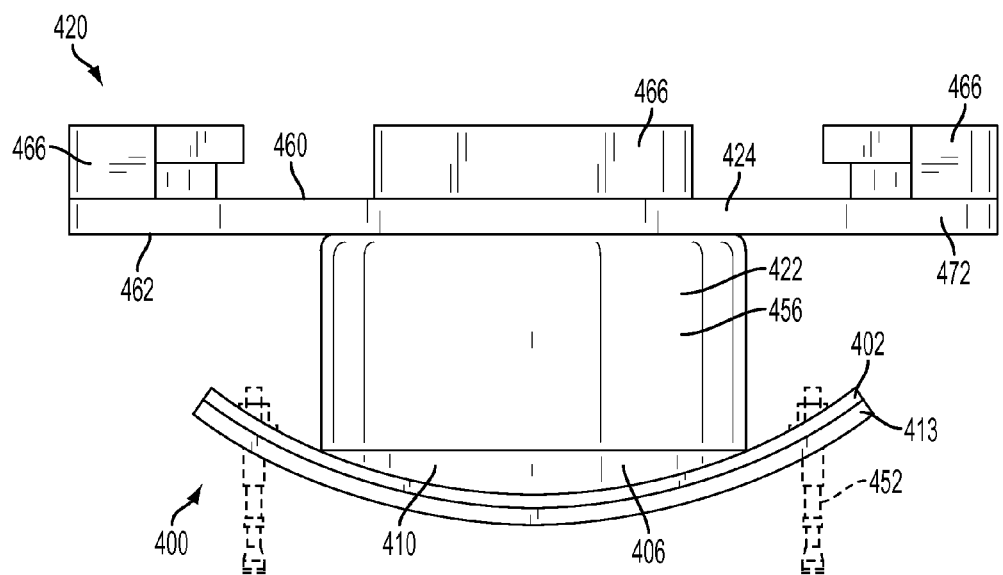
FIG. 48 is a bottom view of a basin adapter secured to a receiving member in accordance with the non-limiting embodiment shown in FIG. 42.
Figure 49:
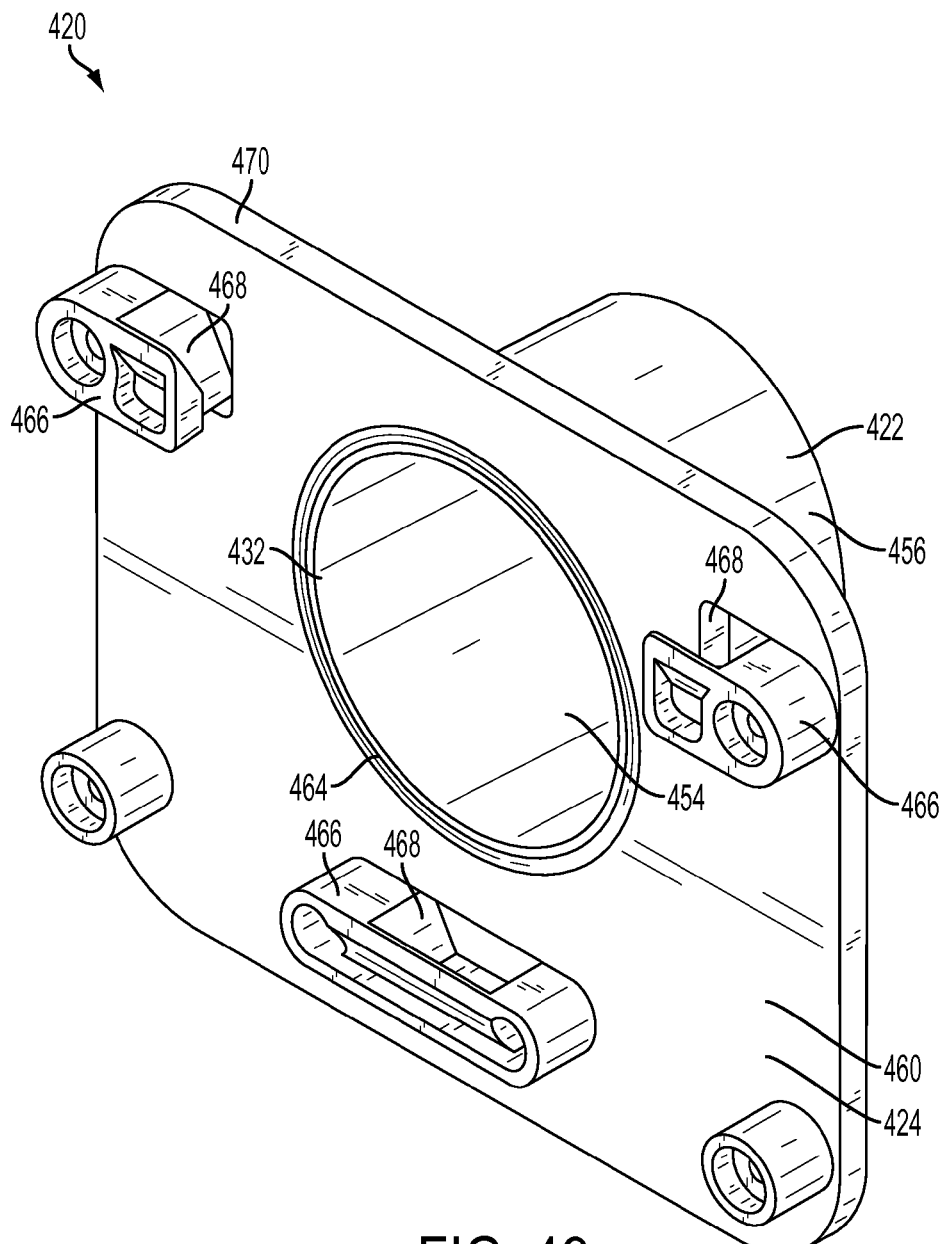
FIG. 49 is a perspective view of a receiving member in accordance with one non-limiting embodiment.
Figure 50:
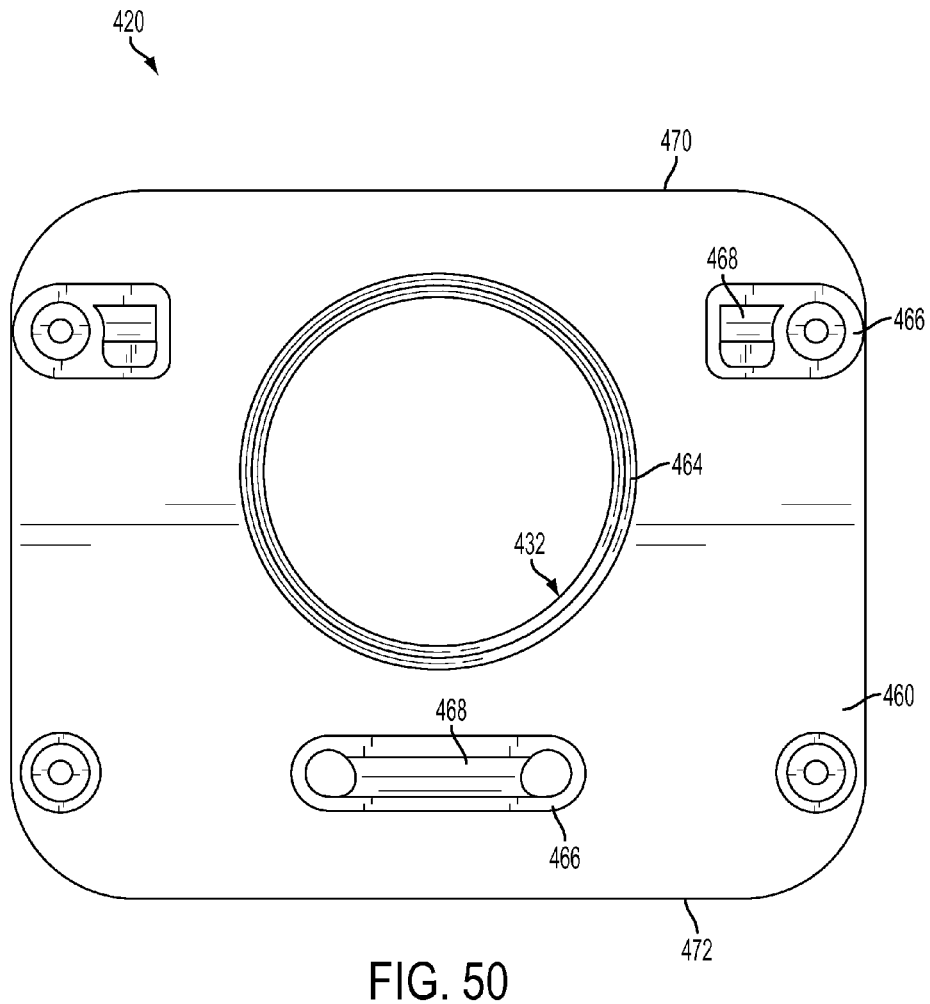
FIG. 50 is a front view of a receiving member in accordance with the non-limiting embodiment shown in FIG. 49.
Figure 51:
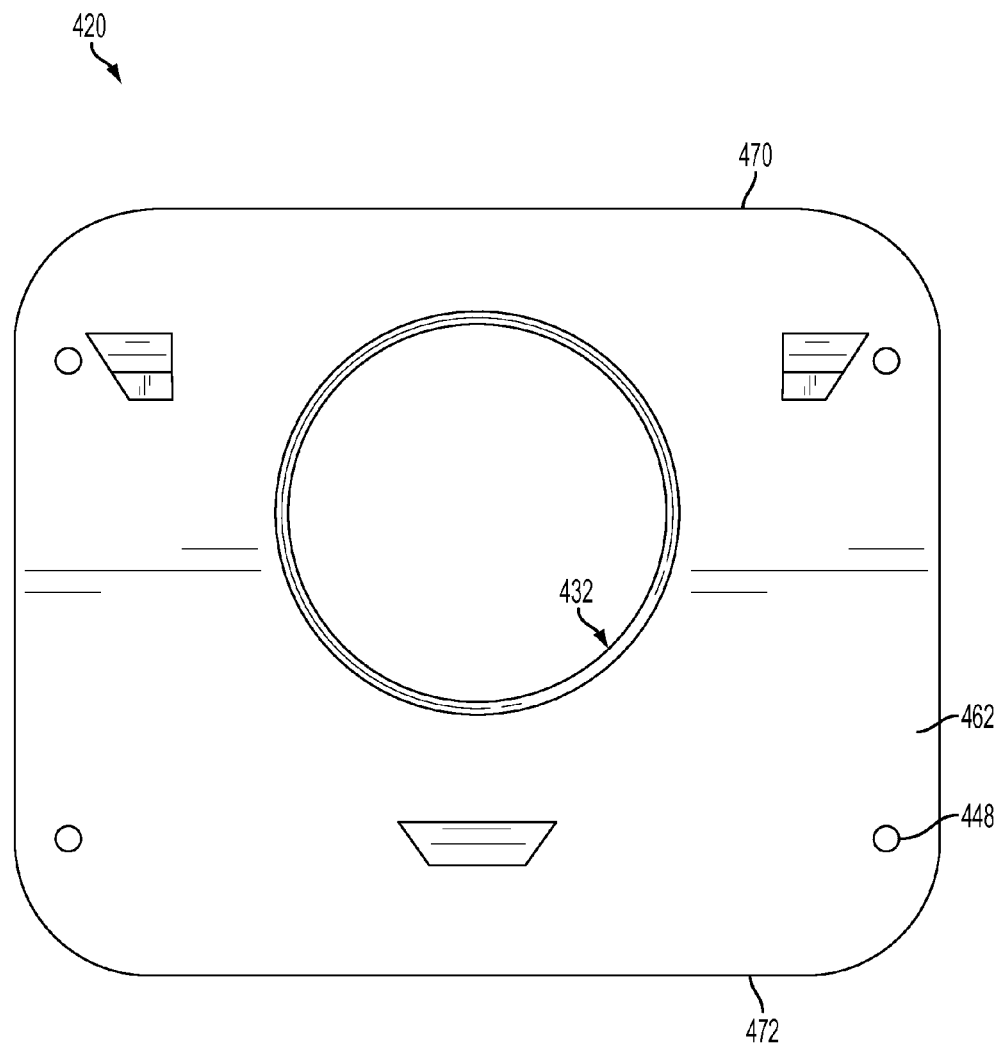
FIG. 51 is a rear view of a receiving member in accordance with the non-limiting embodiment shown in FIG. 49.
Figure 52:
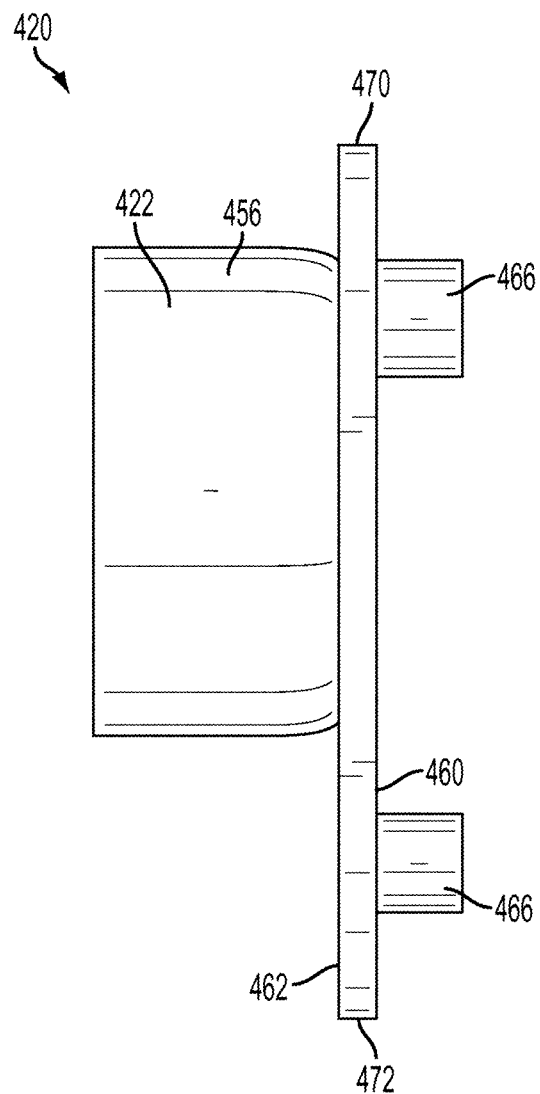
FIG. 52 is a right side view of a receiving member in accordance with the non-limiting embodiment shown in FIG. 49.
Figure 53:
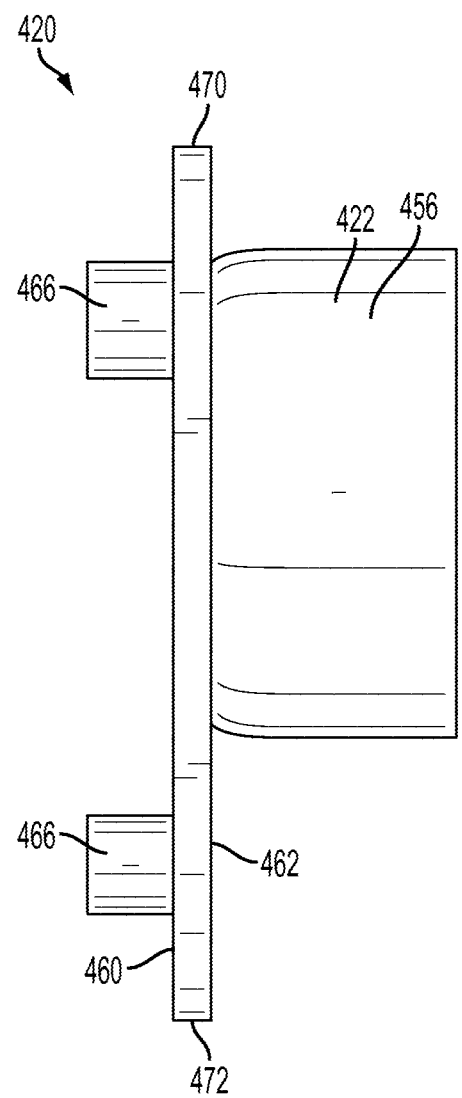
FIG. 53 is a left side view of a receiving member in accordance with the non-limiting embodiment shown in FIG. 49.
Figure 54:
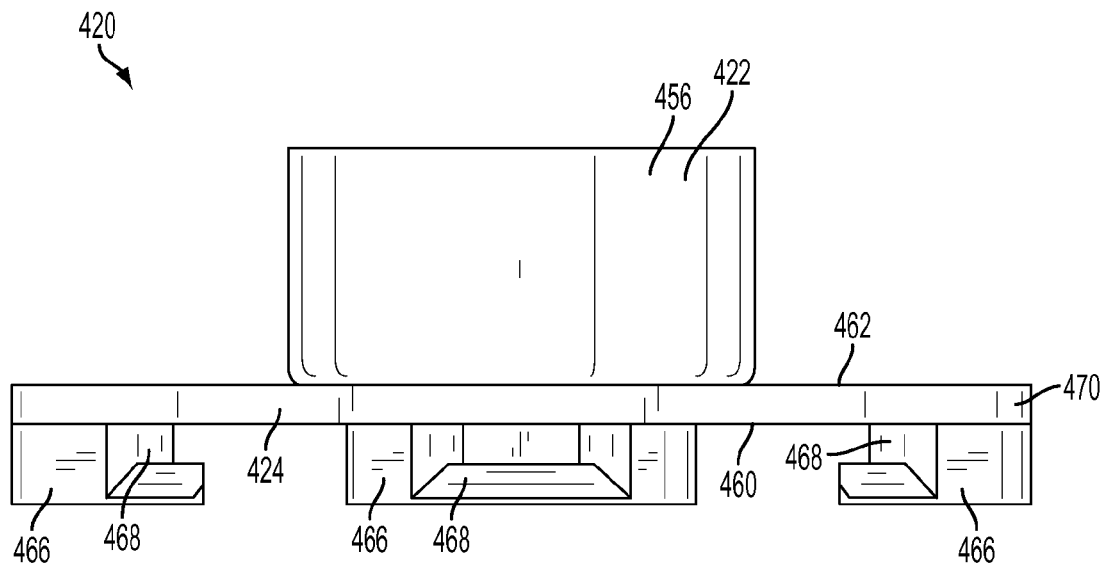
FIG. 54 is a top view of a receiving member in accordance with the non-limiting embodiment shown in FIG. 49.
Figure 55:
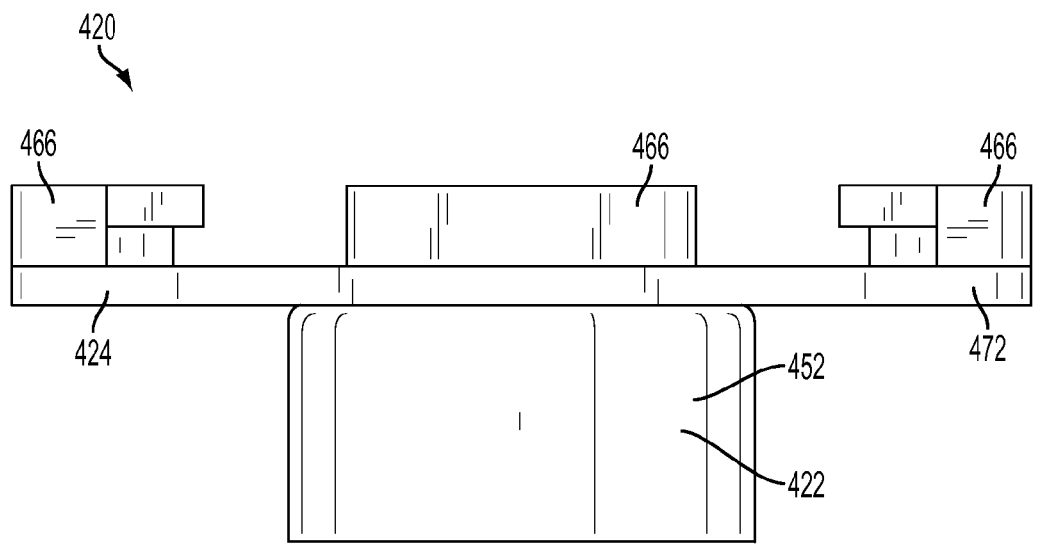
FIG. 55 is a bottom view of a receiving member in accordance with the non-limiting embodiment shown in FIG. 49.
Figure 56:
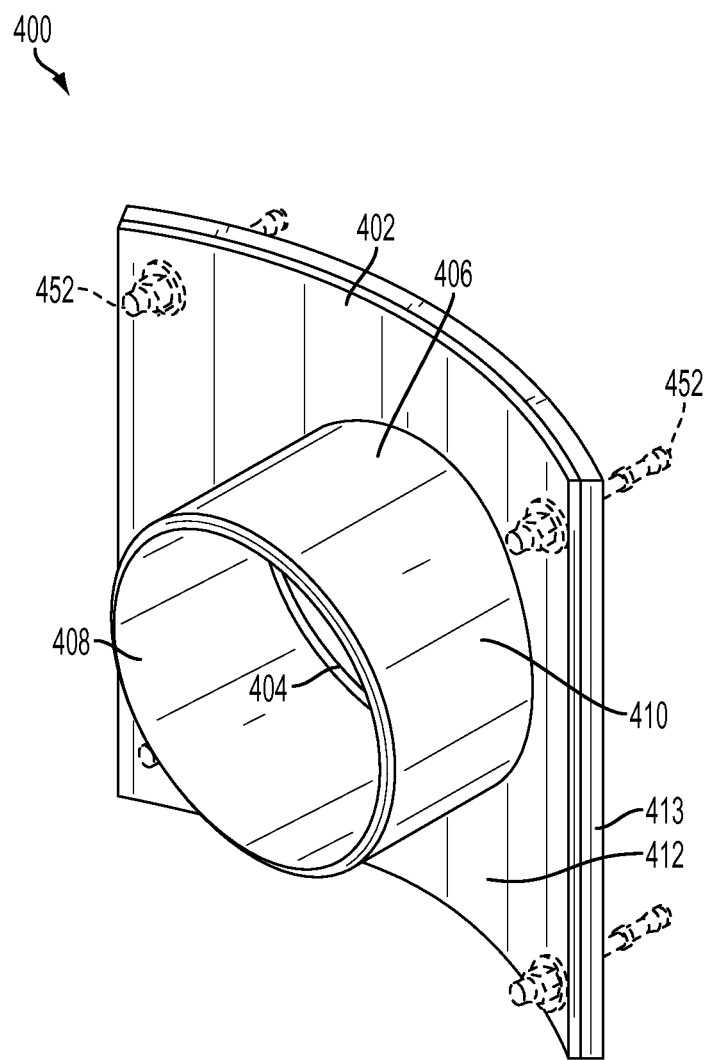
FIG. 56 is a perspective view of a basin adapter in accordance with one non-limiting embodiment.
Figure 57:
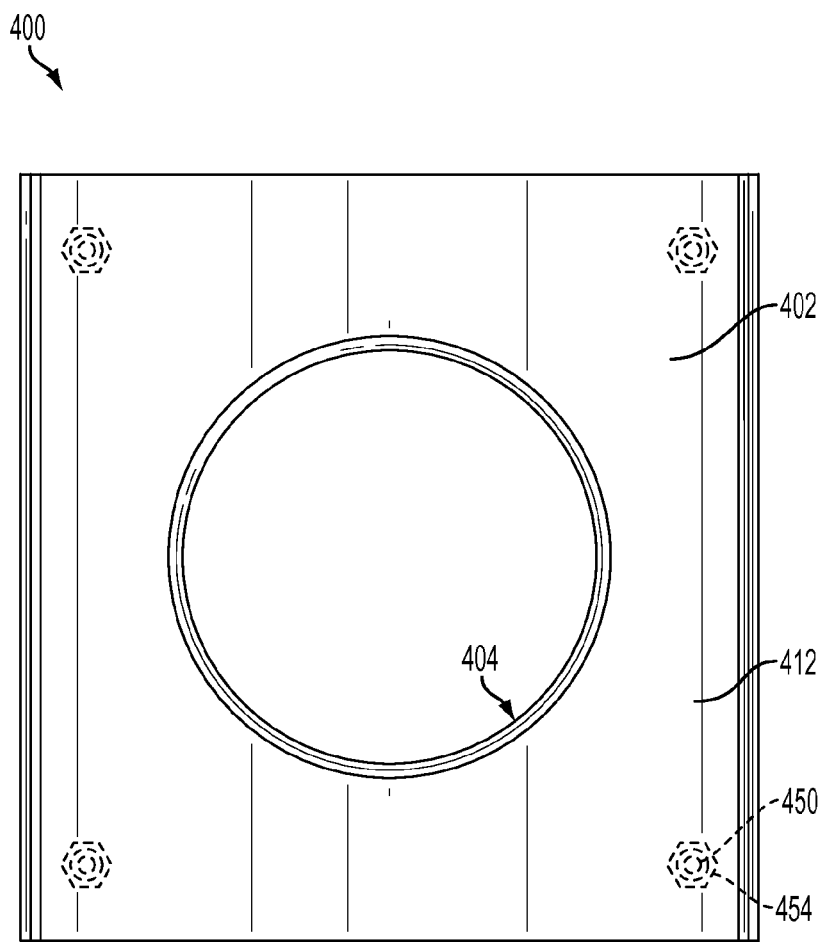
FIG. 57 is a front view of a basin adapter in accordance with the non-limiting embodiment shown in FIG. 56.

In one embodiment, referring to FIGS. 24-29, and more specifically to FIGS. 28 and 29, the first portion 76 can comprise an edge comprising a first lip 94, a notch 96, a second lip 98, and a flange 100 defining a recess 101. The second portion 78 can comprise and edge comprising a notch 102, a lip 104, a recess 106, and an engagement member 108 defined on a flange 110. When the first portion 76 is engaged with the second portion 78, the above-mentioned features can be engaged as illustrated in FIGS. 28 and 29 to form a fluid-tight seal, or substantially a fluid-tight seal.

Figure 4:
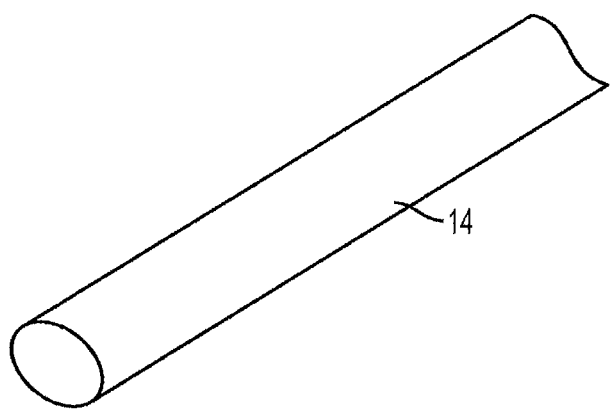
FIG. 4 is a perspective view of an outlet conduit comprising an end in accordance with one non-limiting embodiment.
Figure 5:
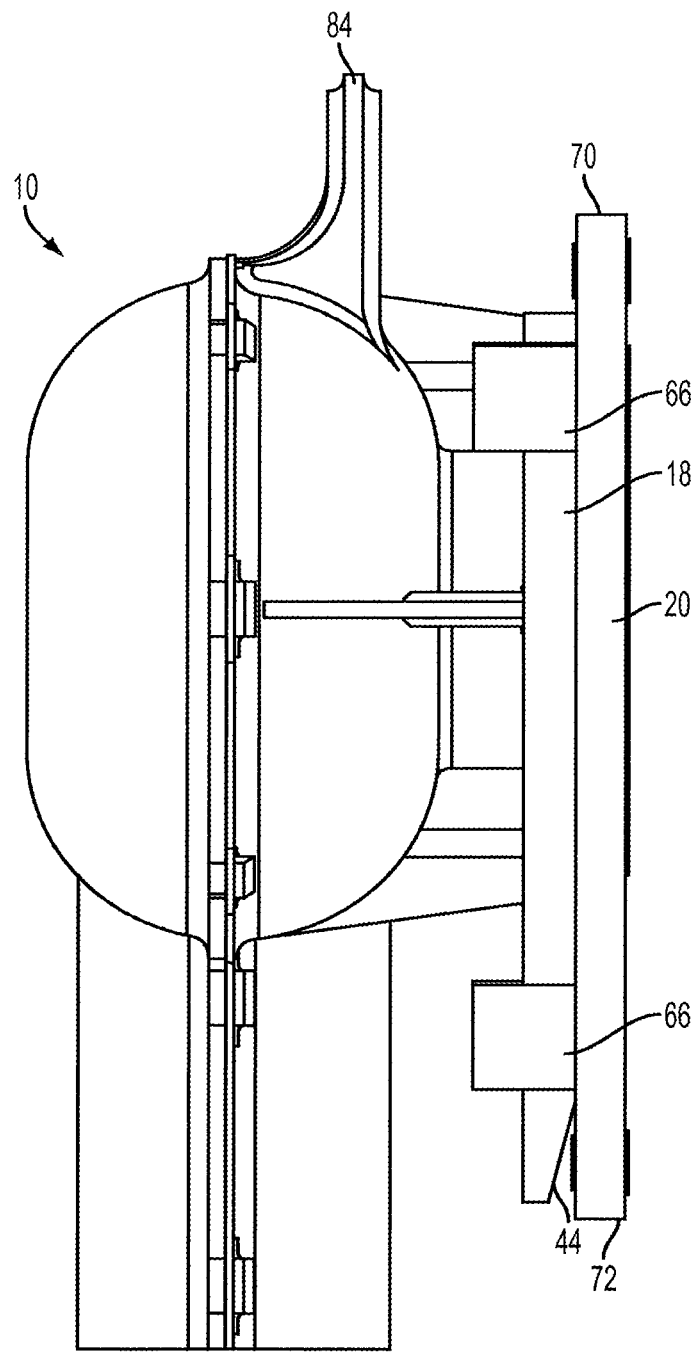
FIG. 5 is a side view of the flow restricting apparatus attached to the connector assembly of FIG. 2 in accordance with one non-limiting embodiment.
Figure 6:
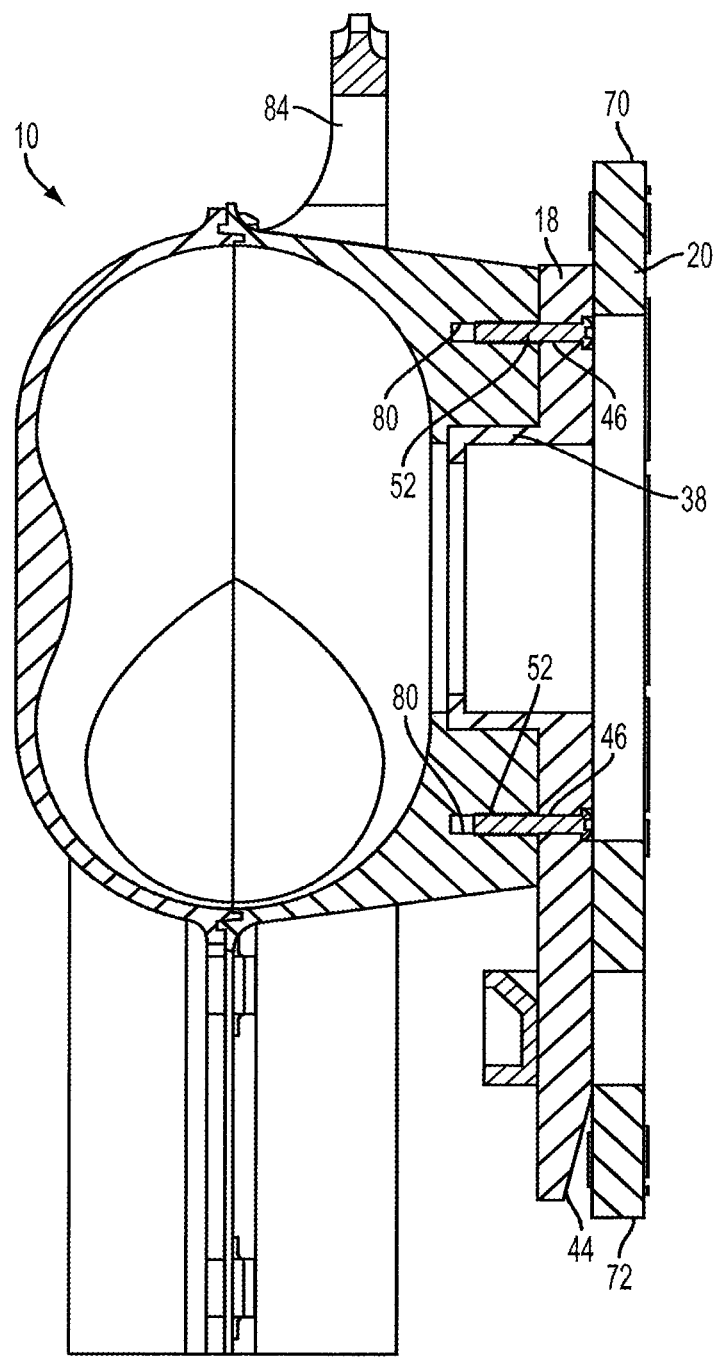
FIG. 6 is a side cut-away view of the flow restricting apparatus attached to the connector assembly of FIG. 2 in accordance with one non-limiting embodiment.
Figure 7:
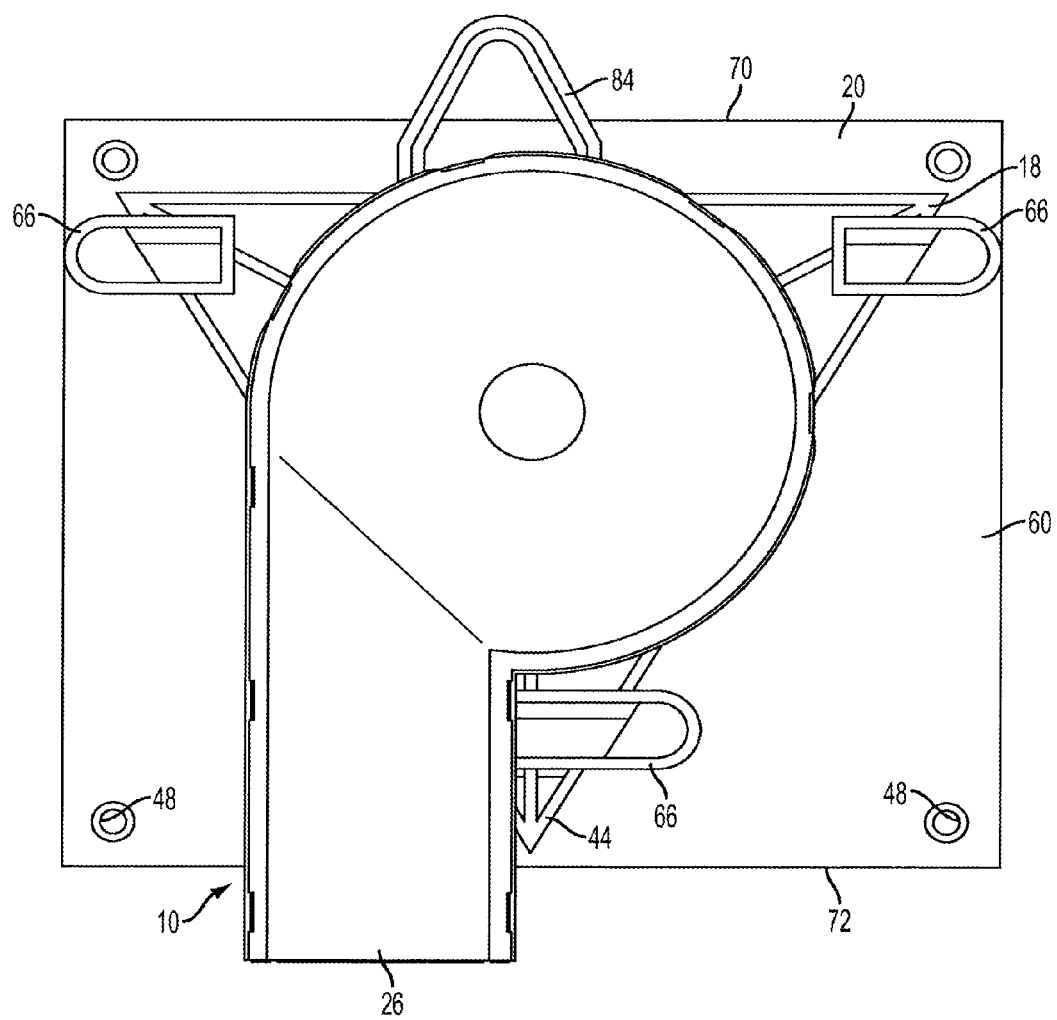
FIG. 7 is a front view of the flow restricting apparatus attached to the connector assembly of FIG. 2 in accordance with one non-limiting embodiment.
Figure 8:
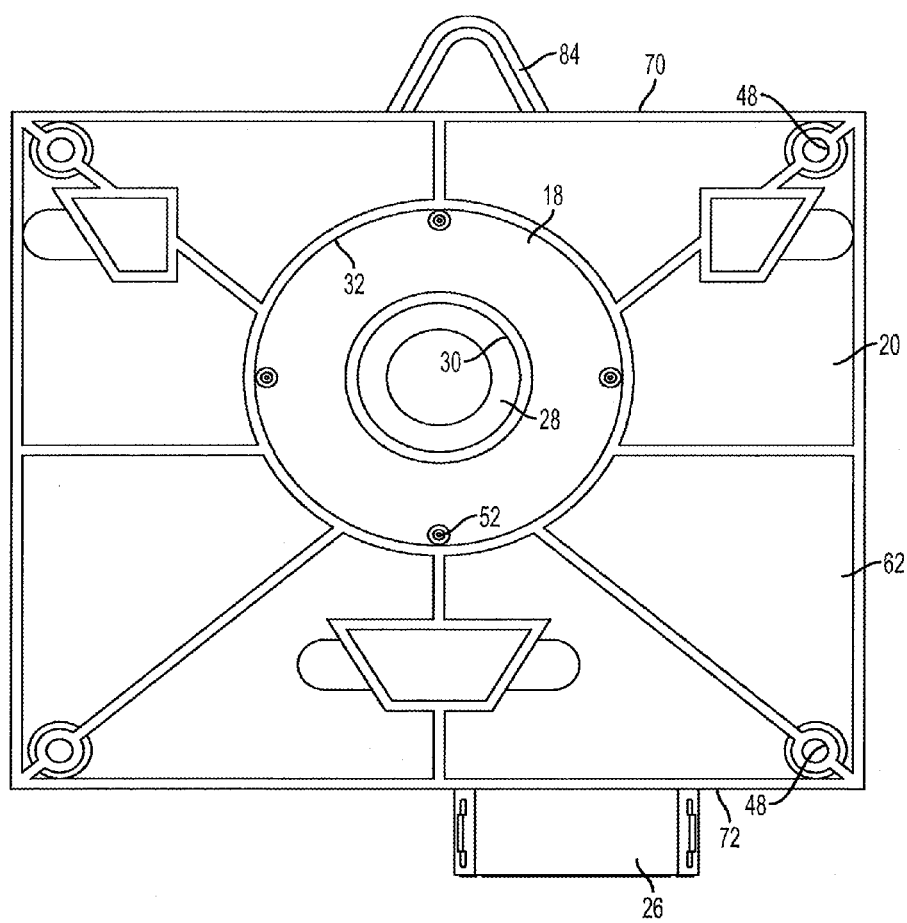
FIG. 8 is a rear view of the flow restricting apparatus attached to the connector assembly of FIG. 2 in accordance with one non-limiting embodiment.
Figure 9:
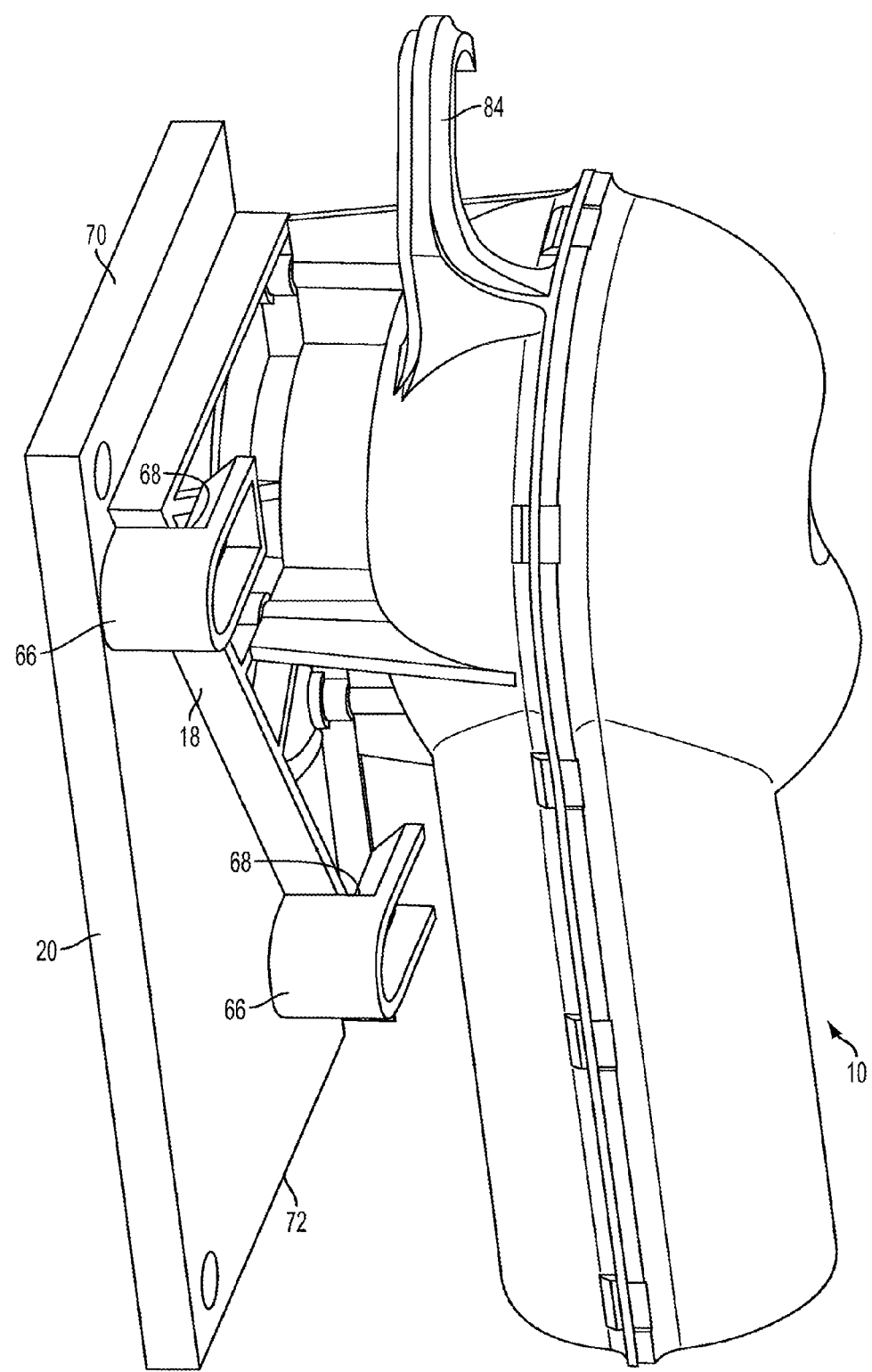
FIG. 9 is a partial perspective view of the flow restricting apparatus attached to the connector assembly of FIG. 2 in accordance with one non-limiting embodiment.
Figure 10:
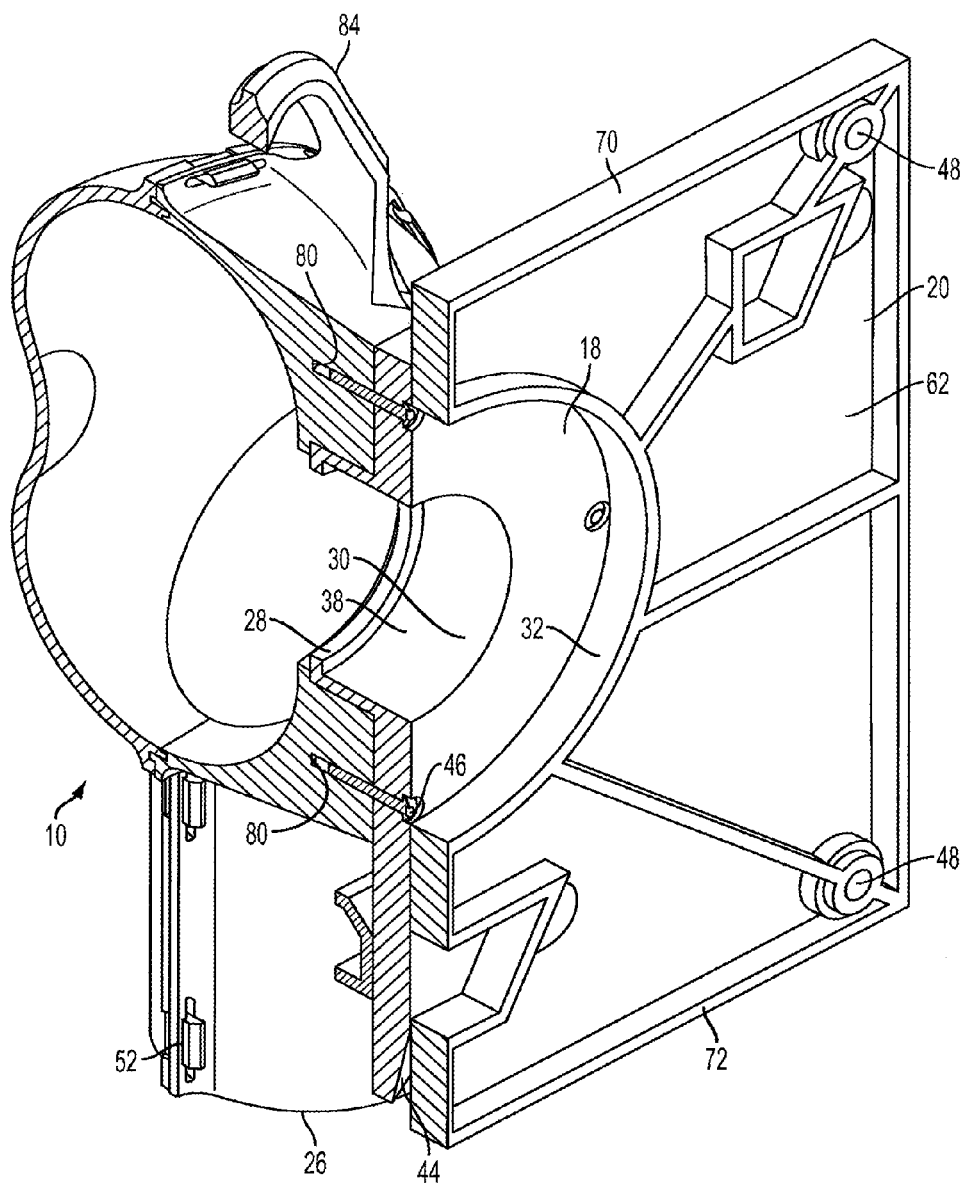
FIG. 10 is another partial perspective view of the flow restricting apparatus attached to the connector assembly of FIG. 2 in accordance with one non-limiting embodiment.
Figure 11:
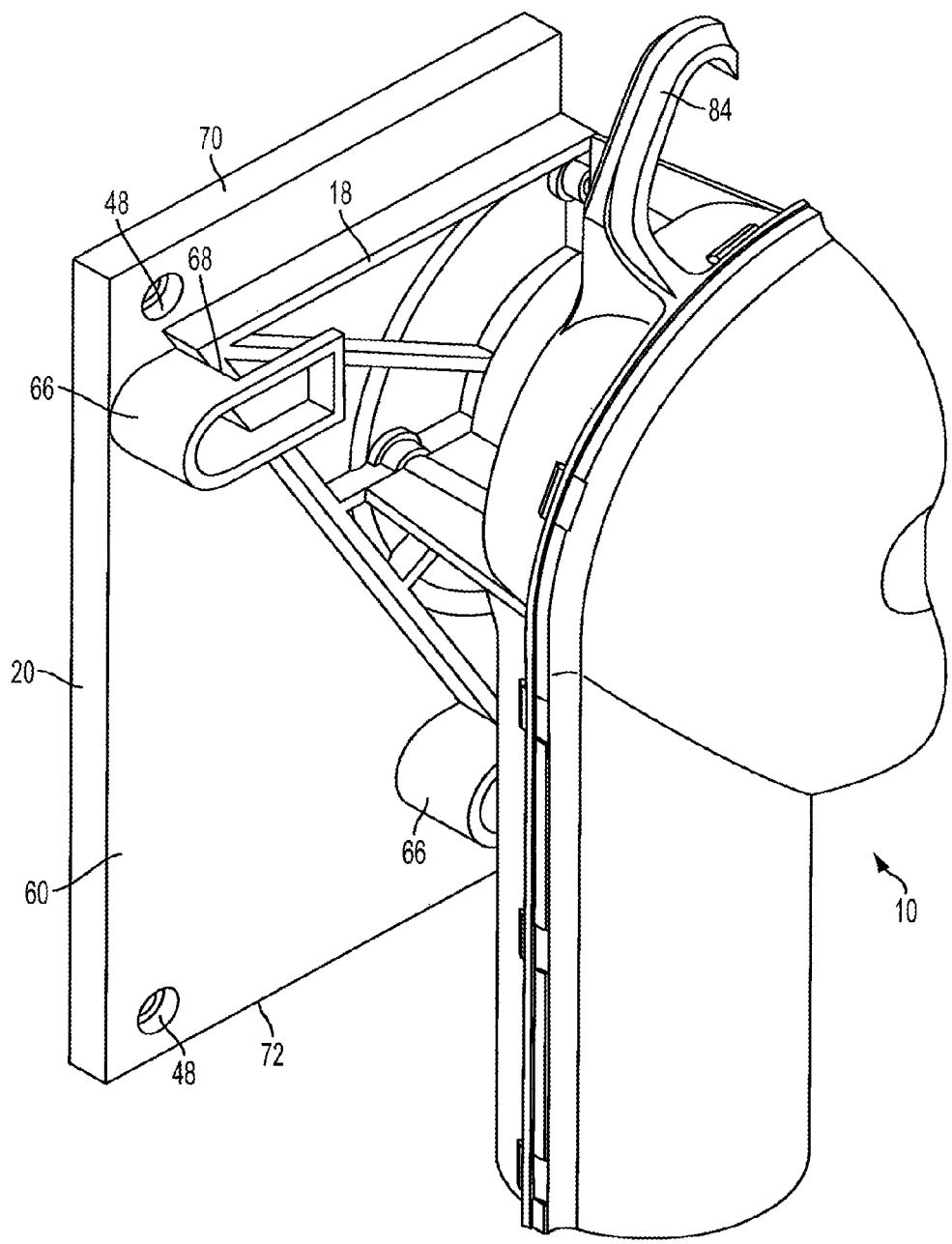
FIG. 11 is another partial perspective view of the flow restricting apparatus attached to the connector assembly of FIG. 2 in accordance with one non-limiting embodiment.
Figure 12:
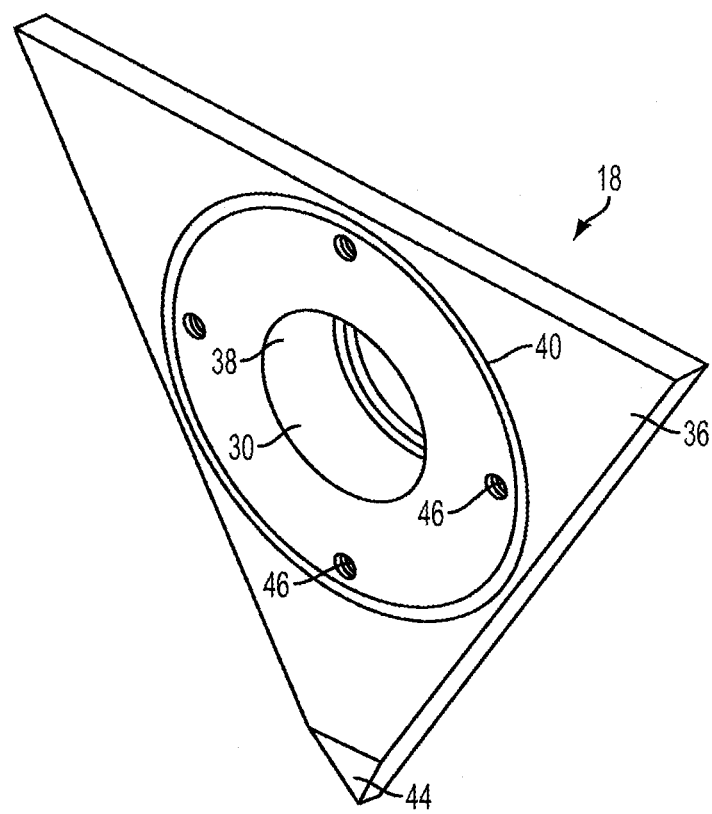
FIG. 12 is a front perspective view of an engaging member of the connector assembly of FIG. 2 in accordance with one non-limiting embodiment.
Figure 13:
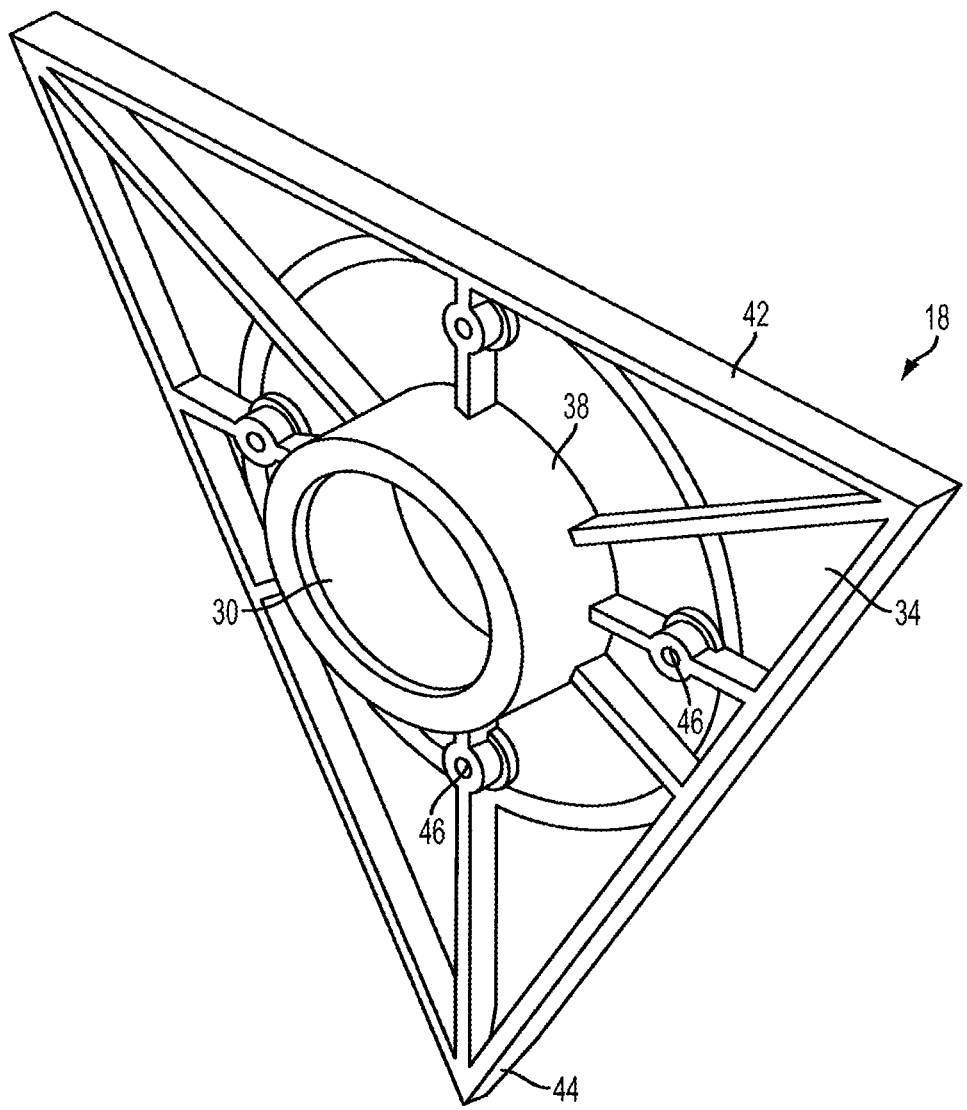
FIG. 13 is a rear perspective view of the engaging member of the connector assembly of FIG. 2 in accordance with one non-limiting embodiment.
Figure 14:
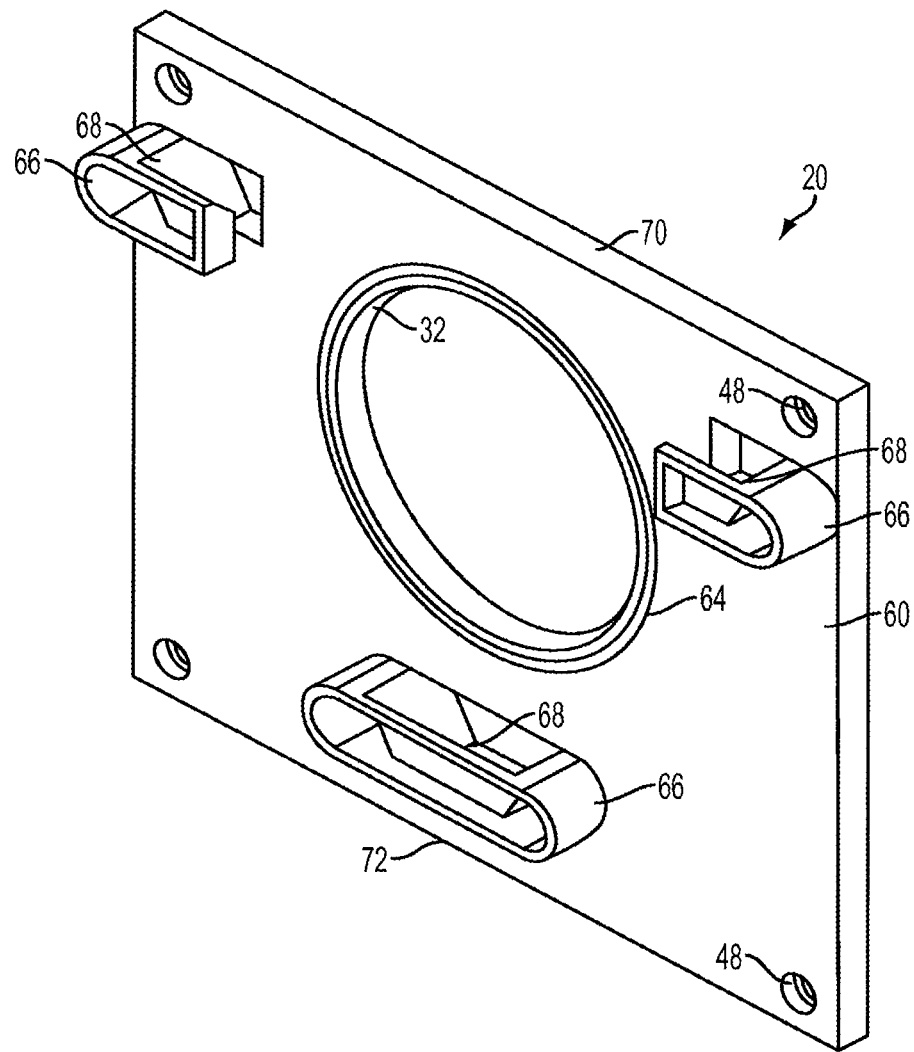
FIG. 14 is a front perspective view of the receiving member of the connector assembly of FIG. 2 in accordance with one non-limiting embodiment.
Figure 15:
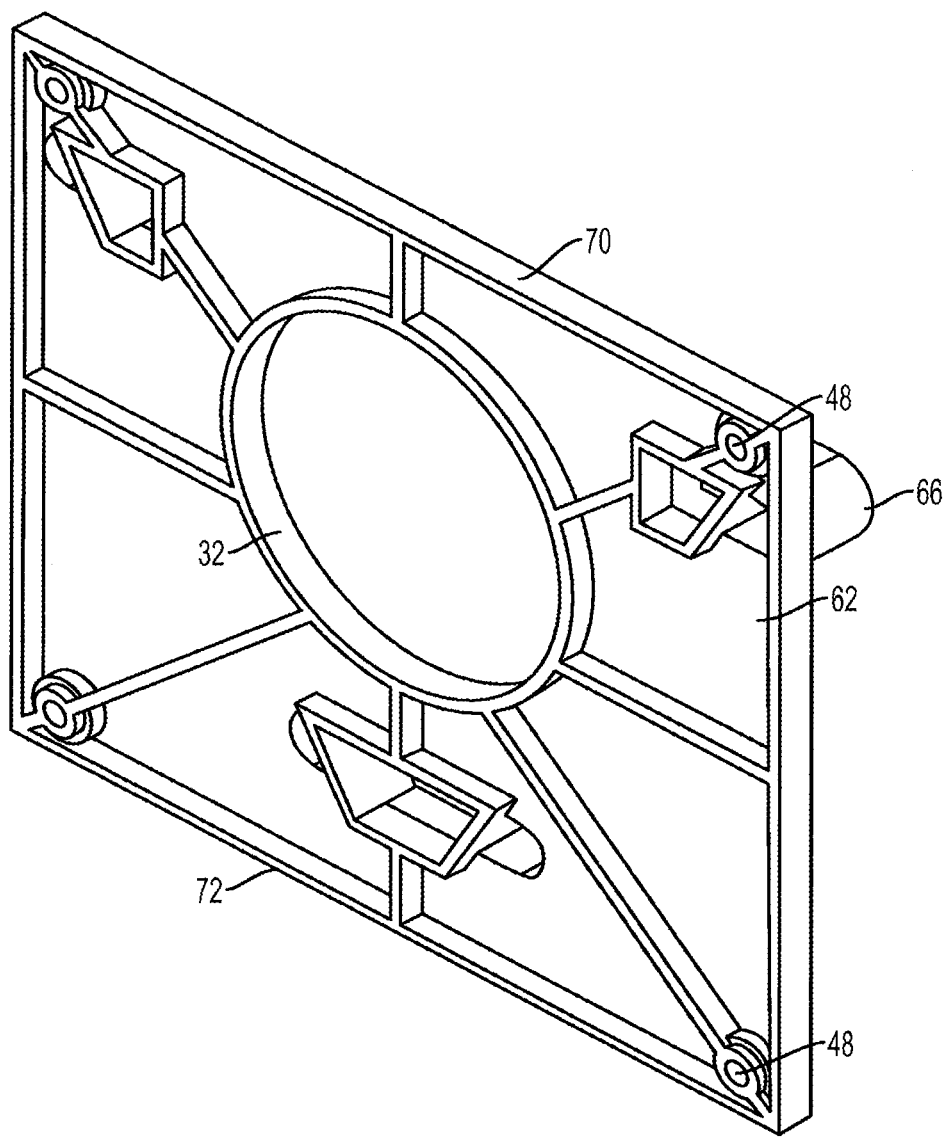
FIG. 15 is a rear perspective view of the receiving member of the connector assembly of FIG. 2 in accordance with one non-limiting embodiment.
Figure 16:
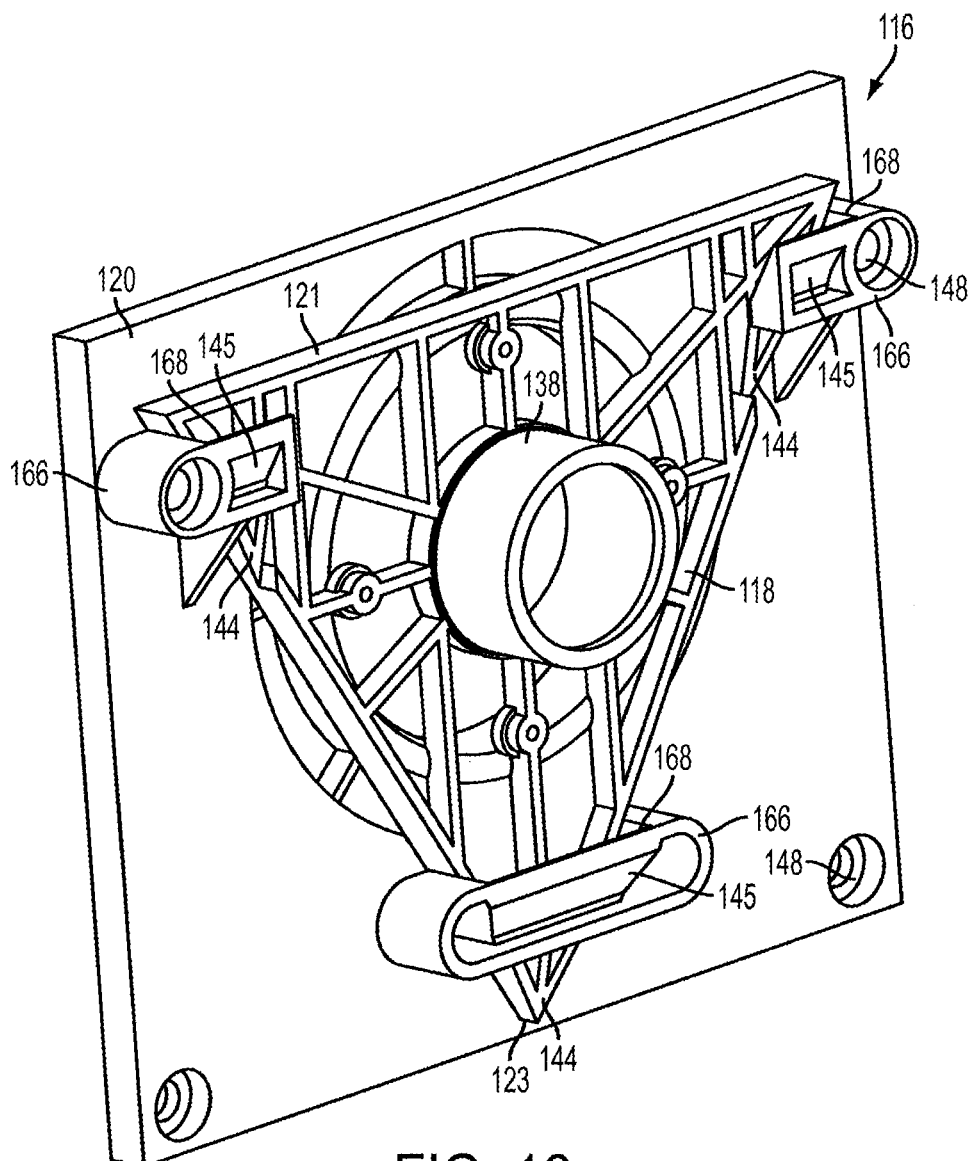
FIG. 16 is a perspective view of a connector assembly for a flow restricting apparatus in accordance with one non-limiting embodiment.
Figure 17:
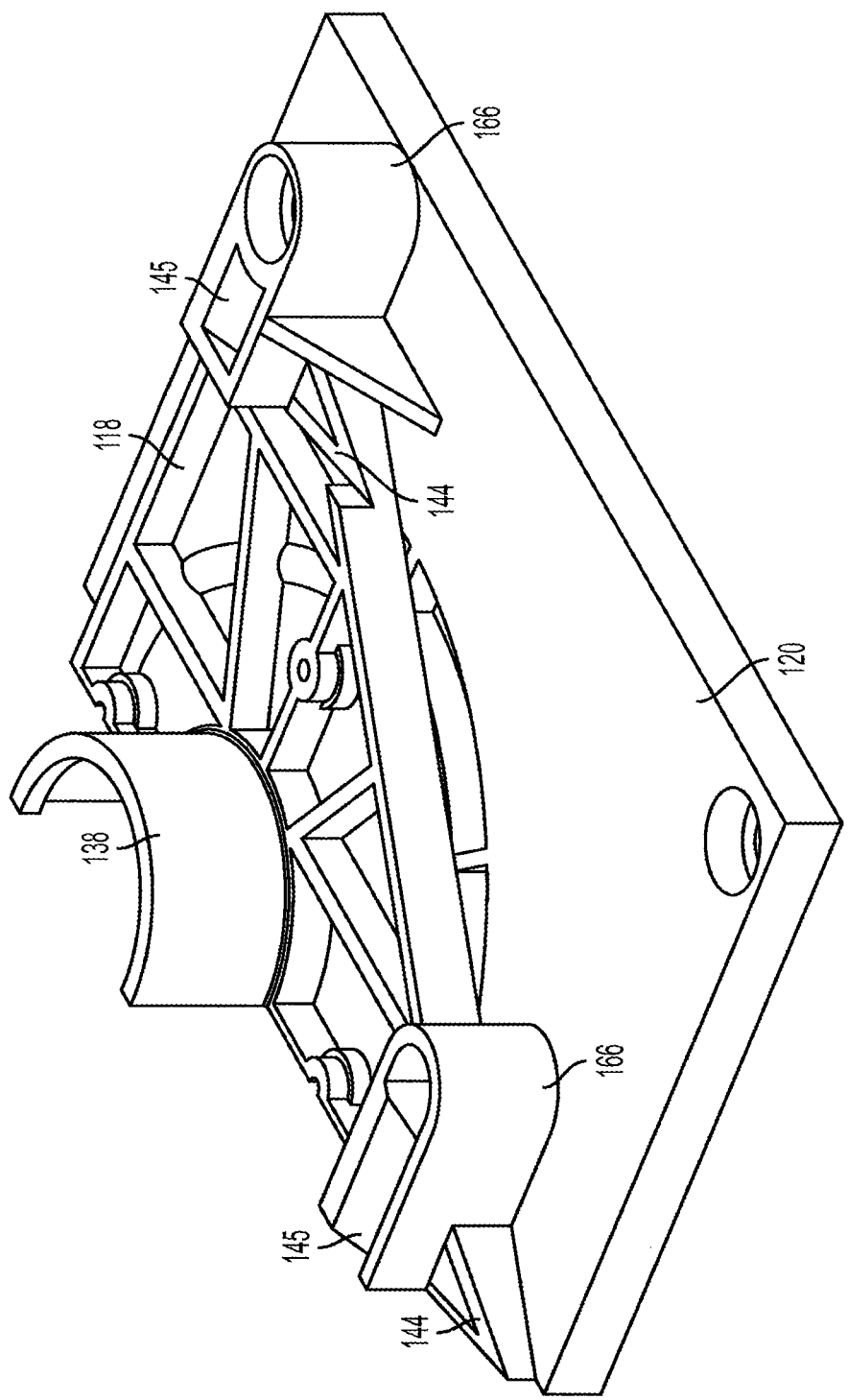
FIG. 17 is partial perspective view of the connector assembly of FIG. 16 in accordance with one non-limiting embodiment.
Figure 18:
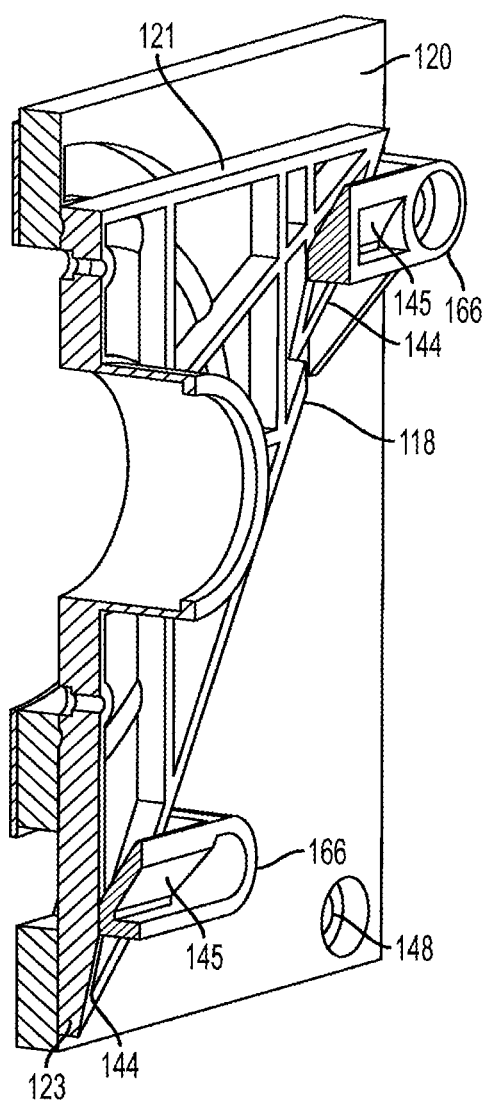
FIG. 18 is another partial perspective view of the connector assembly of FIG. 16 in accordance with one non-limiting embodiment.
Figure 19:
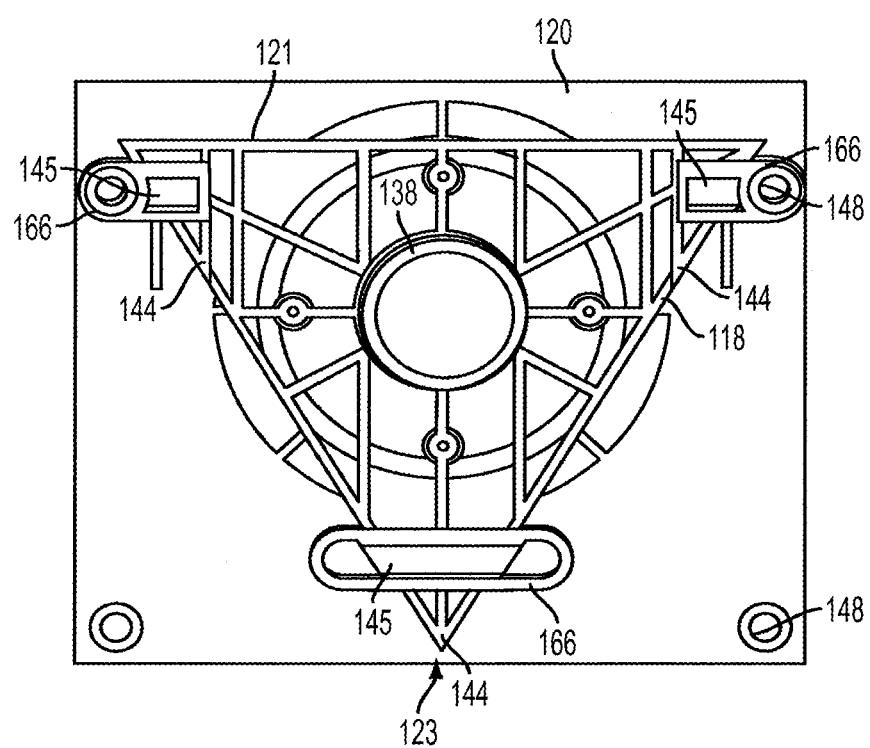
FIG. 19 is a front view of the connector assembly of FIG. 16 in accordance with one non-limiting embodiment.
Figure 20:
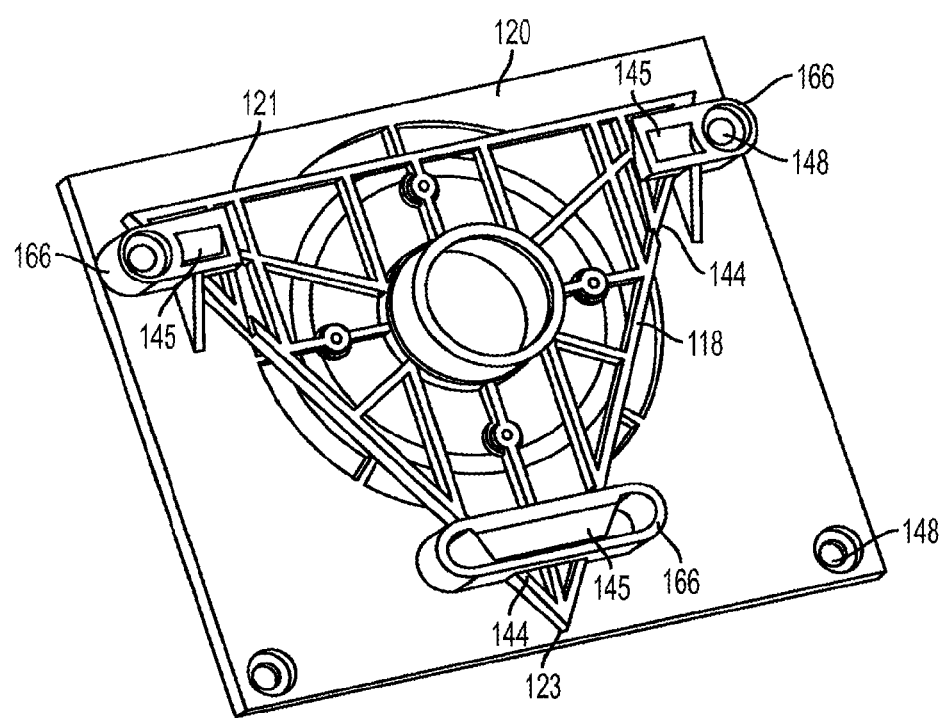
FIGS. 20 and 21 are perspective views of the connector assembly of FIG. 16 in accordance with various non-limiting embodiments.
Figure 21:
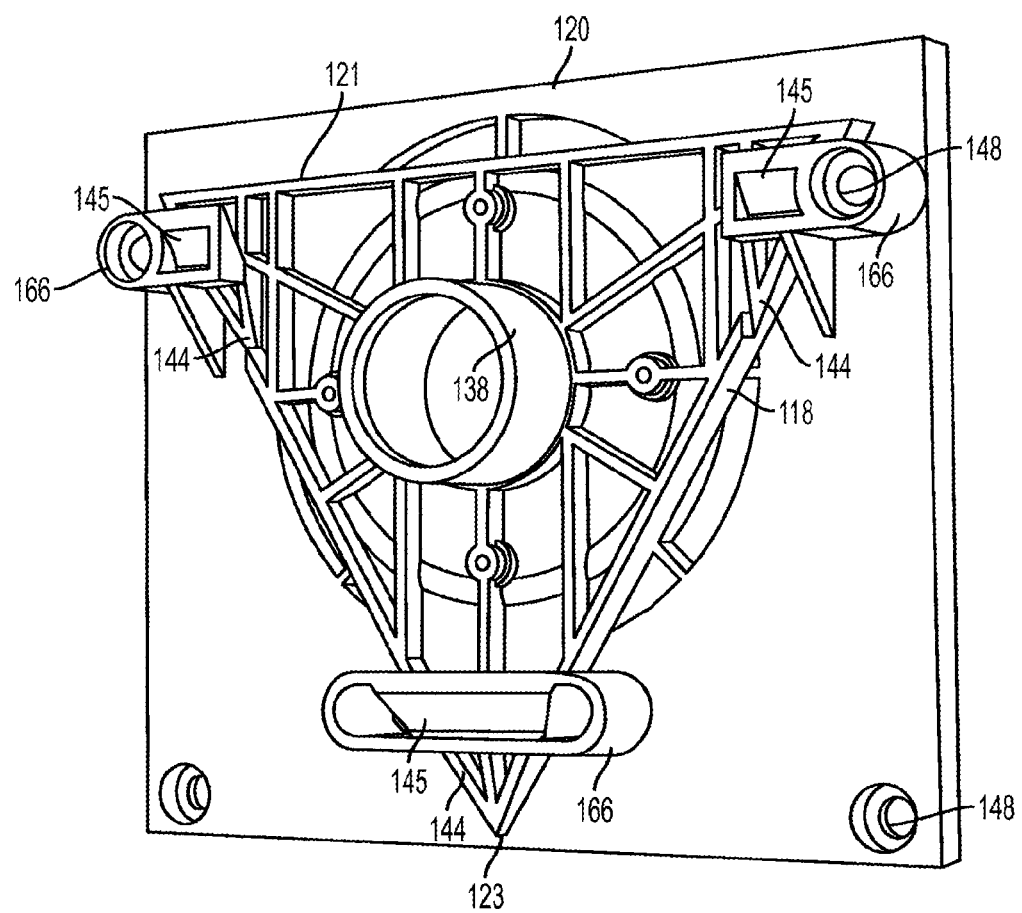

In one embodiment, referring to FIGS. 1 and 4, during installation of the connector assembly 16 or 116, the receiving member 20 can receive the end portion of the outlet conduit 14. The engaging member 18 can be engaged with the vortex valve 10 using the connection members 52 and the apertures 46 and 80, as described above. Once the engaging member 18 is engaged with the vortex valve 10, the vortex valve 10 and the engaging member 18 (as an assembly) can be lowered, positioned, moved, and/or slide into engagement with the receiving member 20, as described herein. When the engaging member 18 is engaged with the receiving member 20, the outlet 28 of the vortex valve 10, the bore 30 of the engaging member 18, the bore 32 of the receiving member 20, and the inlet opening of the outlet conduit 14 can be in fluid communication such that the fluid can flow from the basin 12 to the outlet conduit 14. In one embodiment, the engaging member 18 can be removably engaged with the receiving member 20 such that the vortex valve 10 and the engaging member 18 can be removed from the basin 12, drainage gully, and/or other structure for periodic maintenance, replacement, and/or monitoring of the vortex valve 10, for example.

In one embodiment, the engaging member 18 or 118 and the receiving member 20 or 120 can be comprised of a thermoplastic material, such as PVC, a thermoset material, and/or a metal material, for example.

In one embodiment, referring to FIGS. 30-37, a connector assembly 216 for a fluid flow restricting apparatus, such as vortex valve 210, for example, can comprise an engaging member 218, a receiving member 220, a seal 221, a sealing means, and an insert 225. Similar numbers (e.g., 18, 218), as discussed above, will denote the same or similar components in the description of these embodiments unless otherwise noted. In one embodiment, the engaging member 218 can comprise a first face 234, a second face 236, and a bore 230 defined through the engaging member 218 at least partially intermediate the first face 234 and the second face 236. The first face 234 can comprise tapered or angled portions 244 similar to that described herein. The engaging member 218 can be bolted or otherwise attached to a mounting plate 219 of the vortex valve 210 using connection members 252 and associated nuts 253. The second face 236 can comprise a flat surface 241 (see e.g., FIG. 37). Similar to the engaging member 18 described above, the engaging member 218 can comprise apertures 246 configured to receive the connection members 252.

In one embodiment, the insert 225 can comprise a body 227 defining an aperture 229 therethrough and a flanged portion 231. The flanged portion 231 can extend outwardly from the body 227. A surface of the flanged portion 231 can be configured to engage the second face 236 of the engaging member 218 when the insert 225 is at least partially positioned within the bore 230. In one embodiment, the surface can be beveled, for example. The flanged portion 231 can prevent the insert 225 from being fully slidable through the bore 230 in the engaging member 218 and can help retain the insert 225 engaged with the engaging member 218. The body 227 of the insert 225 can extend into an outlet 228 of the vortex valve 210 and can form a sealed connection with the outlet 228 when the engaging member 218 is engaged with the mounting plate 219 of the vortex valve 210.

In one embodiment, a kit or set of inserts 225 can be provided with the connector assembly 216. For example, two or more inserts 225 can be provided. The inserts 225 can each have different aperture 229 sizes, shapes, and/or diameters or perimeters such that a first insert can provide a different fluid flow rate therethrough than a second insert, for example. In various embodiments, the first insert can have a first size, shape, and/or diameter and the second insert can have a second size, shape, and/or diameter. In one embodiment, the first size, shape, and/or diameter can be different than, larger than, or smaller than the second size, shape, and/or diameter such that the first insert can provide a fluid flow rate therethrough that is different than, larger than, or smaller than the second insert, for example. In one embodiment, the insert 225 can comprise an end wall on a portion of the insert 225 most distal from the flanged portion 231. The end wall can comprise a portion of the aperture 229. In such an embodiment, the size, shape, and/or diameter of the portion of the aperture 229 on the end wall can be varied to vary the fluid flow rate through the insert 225, although the rest of the aperture 229 can be manufactured at a consistent size, shape, and/or diameter, for example.

In one embodiment, a particular fluid flow rate through the connector assembly 216 can be desired by the consumer. In such an embodiment, the connector assembly 216 can be provided to the consumer with the appropriate insert 225 for that particular desired flow rate. In other embodiments, consumers can desire to purchase a connector assembly 216 that can be adaptable for multiple flow rates. In such an instance, the connector assembly 216 can be provided with more than one insert 225 or a plurality of inserts 225, each having different fluid flow rates, for example. By providing the various inserts 225 with the connector assembly 216, the bore 230 of the engaging member 218 can be manufactured the same size or diameter in various embodiments, as compared to the embodiments discussed above where the size of the bore 30 is varied to adjust the flow rate of fluid through the engaging member 18. As a result, the inserts 225 can have a consistent outer perimeter independent of the aperture 229 size, shape, and/or diameter.

In one embodiment, the receiving member 220 can be similar to the receiving member 20 described above except that the receiving member 220 can not comprise the raised lip 64. Instead, the receiving member 220 can comprise a groove 235 for receiving a portion of a sealing means, such as gasket 237, for example. The gasket 237 can be at least partially positioned within the groove 235. In one embodiment, the gasket 237, when positioned at least partially within the groove 235, can extend from the groove 235 beyond a plane of the first side 260 of the receiving member 220 about ½ of its width, about ⅓ of its width, about ¼ of its width, and/or any other suitable portion of its width. The gasket 237 can extend from the groove 235 such that it can be compressed to create a fluid-tight, or substantially fluid tight, seal between the engaging member 218 and the receiving member 220 when the engaging member 218 is engaged with the receiving member 220. In one embodiment, the gasket 237 can be situated within the groove 235 or attached to the groove 235 using an adhesive, for example. In such an embodiment, the second face 236 of the engaging member 218 can be flat, or substantially flat, where the gasket 237 will contact the engaging member 218 such that the gasket 237 can be compressed against the second face 236 when the engaging member 218 is engaged with the receiving member 220. The receiving member 220 can be bolted or otherwise attached to the side wall 11 of the basin 12 using bolts and apertures 248. Similar to the receiving member 20, the receiving member 220 can comprise a bore 232 configured to receive an end portion of the outlet conduit 214. The end portion of the outlet conduit 214 can be attached to the receiving member 20 using fasteners, such as anchor bolts, for example.

In one embodiment, the second face 236 of the engaging member 218 can comprise a groove (not illustrated) configured to receive the gasket 237, for example. In such an embodiment, the first side 260 of the receiving member 220 can be flat, or substantially flat, where the first side 260 would contact the gasket 237. In various embodiments, a groove can not be provided in either of the first side 260 or the second face 236 and the gasket 237 can be compressed intermediate the engaging member 218 and the receiving member 220 when the engaging member 218 is engaged with the receiving member 220. In still other various embodiments, a groove can be provided on the first side 260 of the receiving member 220 and on the second face 236 of the engaging member 218. In such an embodiment, a first portion of the gasket 237 can be configured to be positioned within the groove on the second face 236 and a second portion of the gasket 237 can be configured to be positioned within the groove of the first side 260, for example. In such an embodiment, the gasket 237 can be positioned or attached in the groove either on the first side 260 or the second face 236 and then can be aligned with the groove on the other of the first side 260 or the second face 236 when the engaging member 218 is engaged with the receiving member 220. The gasket 237 can have any suitable thickness such that it is at least partially compressed when the engaging member 218 is engaged with the receiving member 220.

Although the gasket 237 is illustrated as the sealing means in FIGS. 30-37, the first and receiving members 218 and 220 can have the raised lip and groove configurations discussed above with respect to other embodiments either in addition to the gasket 237 and groove(s) or as a replacement to the gasket 237 and groove(s).

In embodiment, the seal 221 can be configured to be positioned intermediate the side wall 11 of the basin 12 and the second side 262 of the receiving member 220. The seal 221 can create a fluid-tight, or substantially fluid-tight, seal intermediate the side wall 11 and the receiving member 220. In one embodiment, the seal 221 can comprise a neoprene foam material, for example, or any other suitable sealing material. In various embodiments, the seal 221 can be rectangular, circular, or otherwise shaped, for example, and can have any suitable thickness. The seal 221 can define a bore 239 therethrough configured to receive the end portion of the outlet conduit 214. The seal 221 can also comprise apertures 249 which can align with apertures 248 in the receiving member 220 such that the receiving member 220 and the seal 221 can be engaged with the side wall 11 of the basin 12. Although the seal 221 is illustrated as a separate component, those of skill in the art will recognize that a sealing substance can be positioned intermediate the side wall 11 and the second side 262 of the receiving member 220 to accomplish a similar or the same sealing result.

In various embodiments, fluid flow restricting apparatuses or assemblies used with the connector assemblies described herein can comprise vortex valves, P-trap assemblies, elbows, fluid flow restricting apertures in the engaging member (18, 118, or 218), odor control devices, floatable abatement control devices, and/or other suitable flow or fluid flow restricting apparatuses and/or assemblies as will be recognized by those of skill in the art. In one embodiment, referring to FIGS. 38-41, a fluid flow restricting assembly 310 can comprise an elbow 312, a coupling 314, and a flow restricting cap 316. In various embodiments, the fluid flow restricting assembly 310 can be attached to an engaging member 318 using an insert 325. The insert 325 can be similar to or the same as the insert 225 described above. The elbow 312 can comprise a first end portion 320 and a second end portion 322. The first end portion 320 of the elbow 312 can be configured to be engaged with or slid over a portion of the insert 325 after the insert 325 is engaged with the engaging member 318. The second end portion 322 of the elbow 312 can be engaged with or slid over a portion of the coupling 314. The flow restricting cap 316 can also be engaged with or slid over a portion of the coupling 314. In one embodiment, the flow restricting cap 316 can not be provided and a flow restriction plate defining a flow restricting aperture can be provided on the second end portion 322.

In one embodiment, the connections between the various components of the fluid flow restricting assembly 310 can be made using suitable adhesives, cements, suitable sealants, suitable fasteners, welding, and/or plastic welding, for example. In various embodiments, such connections can be fluid-tight, or substantially fluid-tight connections. In one embodiment, the coupling 314 can not be provided and the flow restricting cap 316, or another suitable flow restricting cap, can be engaged with the second end portion 322 of the elbow 312 directly. In other various embodiments, an elbow can be integrally formed with a flow restricting cap or a flow restricting plate on a second end portion. In such an embodiment, only a first end portion of the elbow would need to be engaged with or slid onto the insert 325 to make the connection of the fluid flow restricting assembly 310 and the insert 325. In one embodiment, a fluid flow restricting assembly can be formed of a single component. Such a single component fluid flow restricting assembly can be attached to the insert 325 or can be formed with the insert 325 or the engaging member 318.

In one embodiment, the flow restricting cap 316 can comprise an end wall 324 defining an aperture 326 therein. In various embodiments, more than one flow restricting cap 316 can be provided with a fluid flow restricting assembly. These flow restricting caps 316 can comprise differently sized or shaped apertures 326 in their end walls 324. Such a feature can allow a user of the fluid flow restricting assembly 310 to change the fluid flow rate through the fluid flow restricting assembly 310 merely by changing the flow restricting cap 316. In one embodiment, where the flow restricting cap 316 is integrally formed with the second end portion 322 of the elbow 312, more than one fluid flow restricting assembly can be provided with each fluid flow restricting assembly having a differently sized or shaped aperture in their end walls.

In another embodiment, referring to FIGS. 42-48 and 63, another connector assembly 416 is shown. The connector assembly 416 can be similar to the connector assemblies 16, 116, 216 described above (like numerals will describe like elements), but in this embodiment the connector 416 can comprise a receiving member 420 coupled to the side wall 11 of a basin 12 by an adapter 400. The adapter 400 can maintain fluid communication between the connector assembly 416 for a flow managing apparatus 10 (FIG. 1) and an outlet conduit 14 (FIG. 1). Further, the adapter 400 can provide for a distance or space between the receiving member 420 of the connector assembly 416 and the side wall 11 of the basin 12. An adapter 400 can be used when the side wall 11 is curved or otherwise not entirely flat near the outlet conduit 14 such that the side wall 11 comprises a curvature. In another embodiment, an adapter 400 can be used when the side wall 11 is flat or substantially flat. In one embodiment, the adapter 400 and receiving member 420 can be secured together to form a fluid-tight, or substantially fluid-tight, connection between the adapter 400 and receiving member 420.

Referring now to FIGS. 56-62, an adapter 400 can comprise a curvature plate 402, an adapter bore 404 through the curvature plate 402, and an adapter conduit 406 extending from the curvature plate 402. In one embodiment, the adapter bore 404 can comprise a first diameter and the adapter conduit 406 can comprise a second diameter across the interior surface 408 of the adapter conduit 406. The second diameter can be larger than the first diameter such that the adapter conduit 406 overlaps the adapter bore 404 and overlaps a portion of the curvature plate 402. In another embodiment, the second diameter can substantially equal the first diameter such that the interior surface 408 of the adapter conduit 406 substantially aligns with the adapter bore 404 and the adapter conduit 406 only overlaps the adapter bore 404. In still another embodiment, the second diameter can be slightly smaller than the first diameter such that the adapter conduit 406 fits securely within the adapter bore 404 and only partially overlaps the adapter bore 404. The adapter bore 404 and adapter conduit 406 can be secured together to form a fluid-tight, or substantially fluid-tight, connection therebetween and can form a channel for fluid flow therethrough.

The curvature plate 402 of the adapter 400 can comprise a curvature that matches or otherwise complements the curvature of the side wall 11 around the outlet conduit 14 (FIG. 1). In one embodiment, the curvature of the curvature plate 402 can be configured to position the curvature plate 402 adjacent to and flush with the side wall 11. In another embodiment, the curvature of the curvature plate 402 can be configured to position the curvature plate 402 and a washer, o-ring or any other suitable sealing member or material, such as gasket 413, adjacent to and flush with the side wall 11. The curvature of the side wall 11 can comprise radii of curvature, angles, corners, and/or steps. For example, the side wall 11 can comprise a round diameter with a uniform radius of curvature. Alternatively, the side wall 11 can comprise stepped protrusions around the outlet conduit 14. As another example, the side wall 11 can be angled and/or curved around the outlet conduit 14. As still another example, the outlet conduit 14 can be positioned near or on a corner of the basin 12. In some embodiments, the curvature of the curvature plate 402 can match or otherwise complement the curvature of the side wall 11. In other embodiments, the curvature of the curvature plate 402 can exactly or substantially match the curvature of the side wall 11. In another embodiment, the curvature of the curvature plate can provide for a sealing member or material, such as gasket 413, to be positioned between the curvature plate 402 and side wall 11. The sealing member can be inserted between the entire curvature plate 402 and side wall 11 or between a portion of the curvature plate 402 and side wall 11.

In one embodiment, the adapter 400 can be comprised of a thermoplastic material, such as PVC, a thermoset material, and/or a metal material, for example. The adapter 400 can be formed as a single piece, such as by an injection molding technique. In another embodiment, components of the adapter 400, for example the adapter conduit 406 and the curvature plate 402, can be heat-sealed, or PVC-welded, together. In still another embodiment, components of the adapter 400 can be connected by adhesives and/or fasteners. In yet another embodiment, components of the adapter 400 can be snap-fit together. The components of the adapter 400 can be connected using any suitable fastening devices or methods known to those of skill in the art to form a fluid-tight, or substantially fluid-tight, connection therebetween and can form a channel for fluid flow therethrough.

Figure 58:
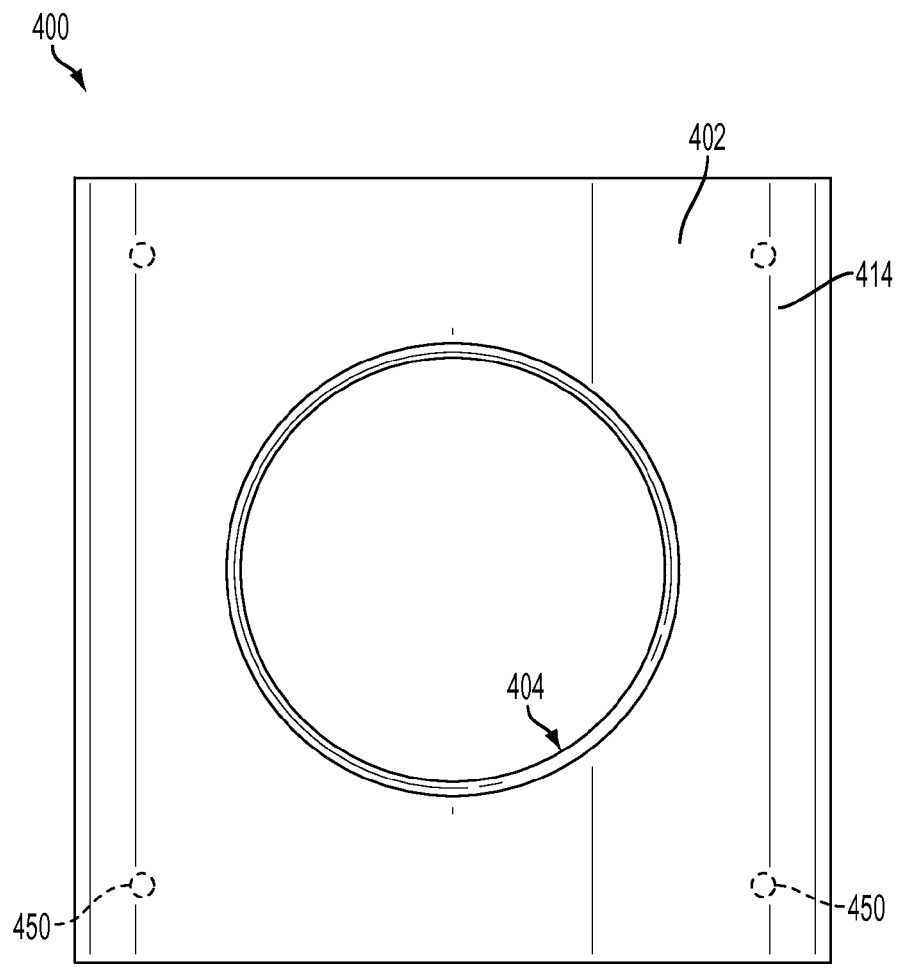
FIG. 58 is a rear view of a basin adapter in accordance with the non-limiting embodiment shown in FIG. 56.
Figure 59:
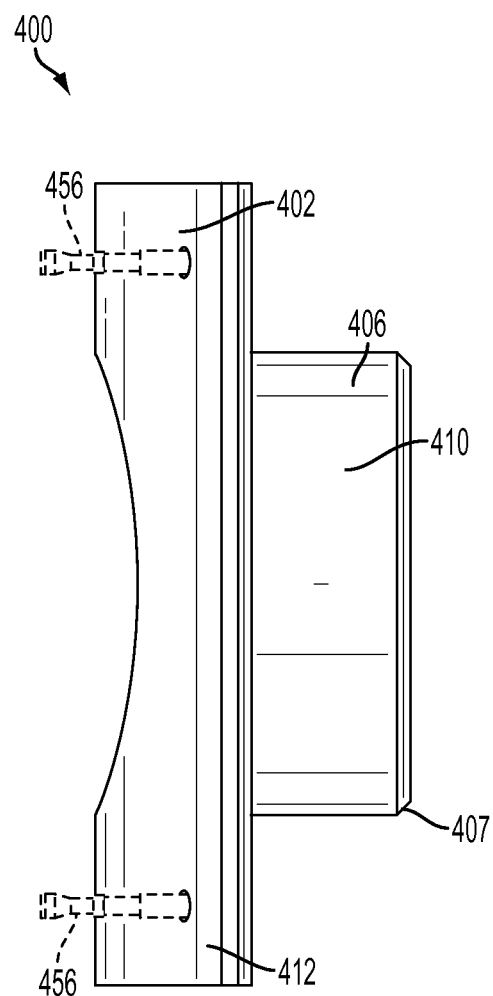
FIG. 59 is a right side view of a basin adapter in accordance with the non-limiting embodiment shown in FIG. 56.
Figure 60:
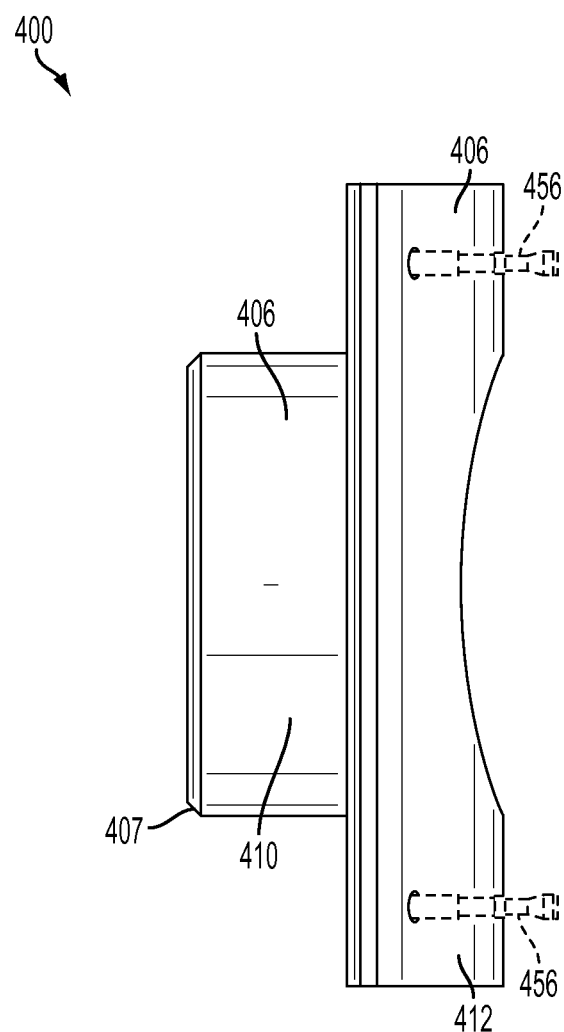
FIG. 60 is a left side view of a basin adapter in accordance with the non-limiting embodiment shown in FIG. 56.
Figure 61:
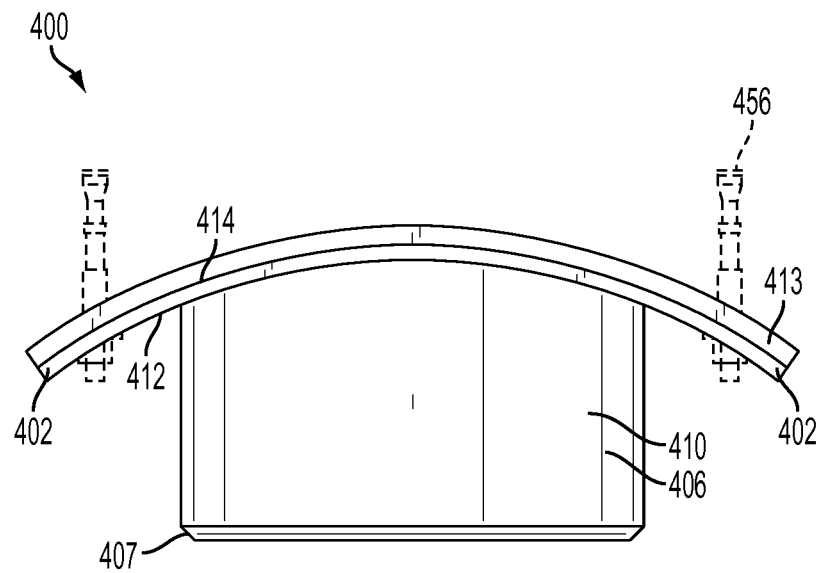
FIG. 61 is a top view of a basin adapter in accordance with the non-limiting embodiment shown in FIG. 56.
Figure 62:
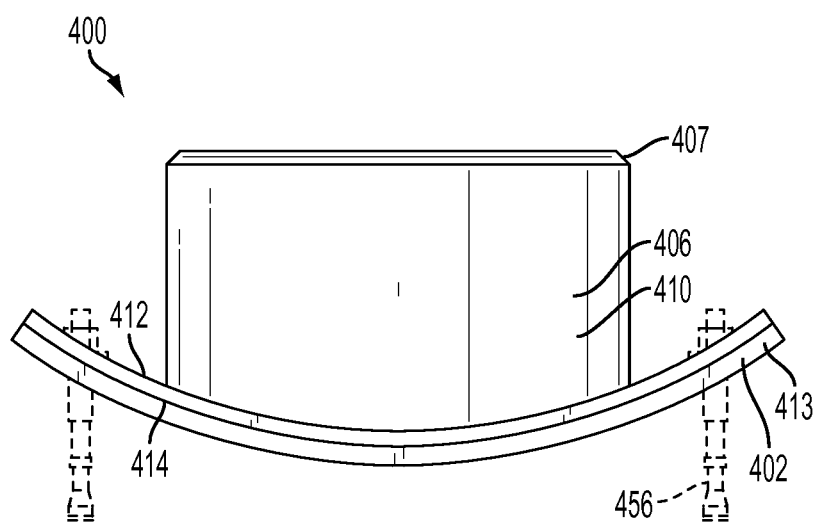
FIG. 62 is a bottom view of a basin adapter in accordance with the non-limiting embodiment shown in FIG. 56.
Figure 63:
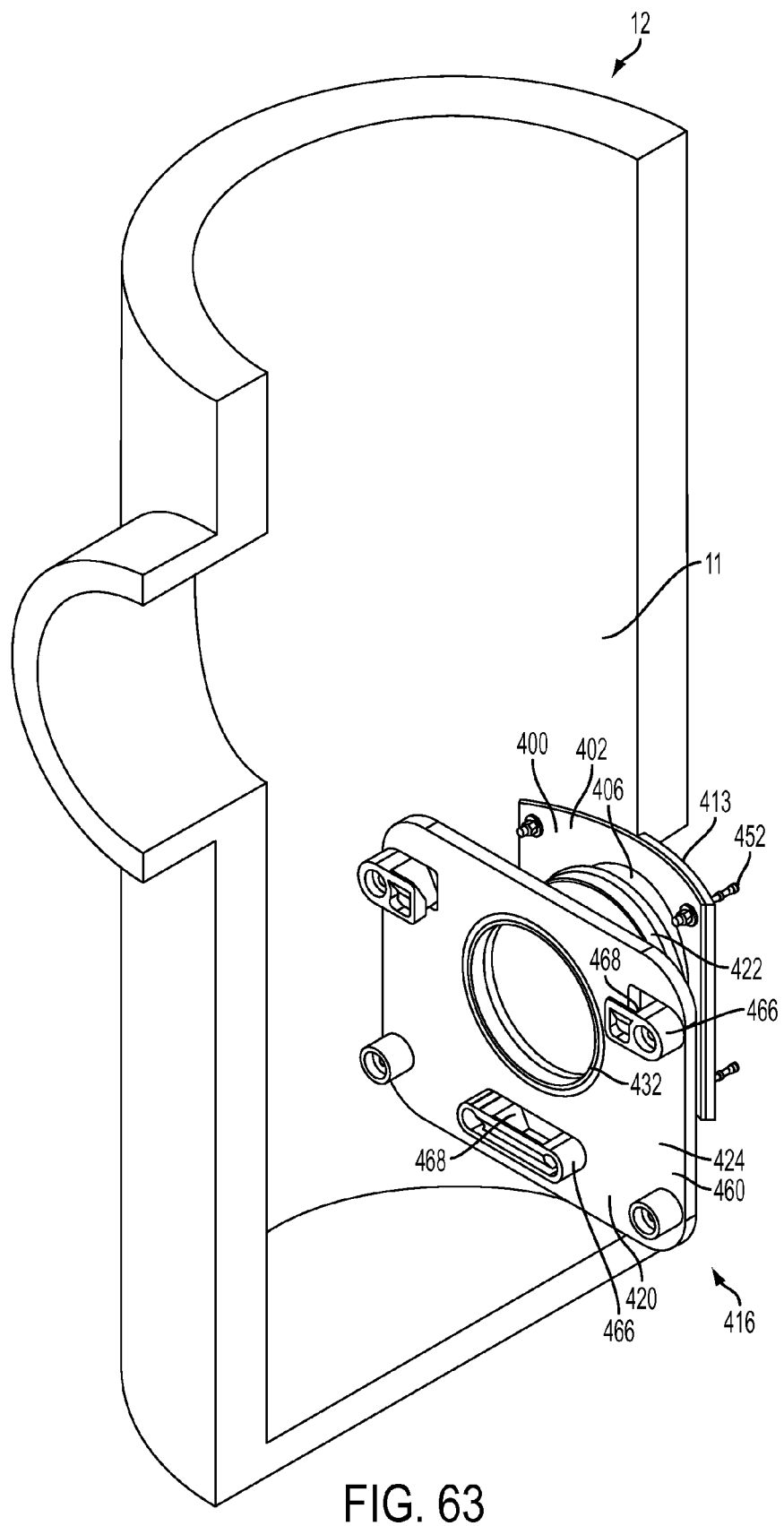
FIG. 63 is a perspective sectional view of a basin having a curved side secured to a basin adapter and receiving member in accordance with one non-limiting embodiment.

Referring to FIG. 58, the curvature plate 402 can also comprise aperture(s) 450 extending through the curvature plate. Side wall 11 can also comprise aperture(s) 450. The aperture(s) can be threaded or unthreaded. The aperture(s) in the curvature plate 402 can align or substantially align with the aperture(s) in the side wall 11. Connection member(s) or fastener(s) 452, such as anchor bolts, can secure the curvature plate 402 of the adapter 400 to the side wall 11 near or around the outlet conduit 14 via the aperture(s). In other embodiments, the adapter 400 can be connected to the side wall 11 using other suitable fastening devices or methods known to those of skill in the art. The curvature plate 402 and side wall 11 can be secured together to form a fluid-tight, or substantially fluid-tight, connection therebetween and can form a channel for fluid flow through the adapter 400 and outlet conduit 14. As described above, a gasket 413 or other suitable sealing member or material can be positioned intermediate the curvature plate 402 and side wall 11 near the outlet conduit 14 and can also be secured by fastener(s) 452 or other suitable fastening devices or methods. In one embodiment, the sealing member can facilitate a fluid-tight, or substantially fluid-tight, connection between the adapter 400 and side wall 11.

Referring to FIGS. 49-55, the connector assembly 416 can comprise a receiving member 420. Receiving member 420 is similar to receiving members 20, 120, 220, described in greater detail above, but can also comprise a receiving conduit 422. In one embodiment, receiving member 420 can comprise a connector plate 424, receiving bore 432, and a receiving conduit 422 extending from the connector plate 424. The connector plate 424 can comprise a first side 460 and a second side 462. The first side 460 can comprise projection(s) 466 and/or receiving portion(s) 468 as described in greater detail above with regard to projections 66, 166 and receiving portions 68, 168. Further, as described in greater detail above, receiving portion(s) 468 can be configured to receive engaging or tapered portion(s) 44, 144, 244 of engaging member 18, 118, 218. The receiving conduit 422 can extend from the second side 462 of connector plate 424. In one embodiment, the receiving bore 432 can comprise a first diameter and the receiving conduit 422 can comprise a second diameter across the interior surface 454 of the receiving conduit 422. The second diameter can be larger than the first diameter such that the receiving conduit 422 overlaps the receiving bore 432 and overlaps a portion of the connector plate 424. In another embodiment, the second diameter can substantially equal the first diameter such that the interior surface 408 of the receiving conduit 422 substantially aligns with the receiving bore 432 and the receiving conduit 422 only overlaps the receiving bore 432. In another embodiment, the second diameter can be slightly smaller than the first diameter such that the receiving conduit 422 securely fits within the receiving bore 432 and only partially overlaps the receiving bore 432.

In one embodiment, the receiving member 420 can be comprised of a thermoplastic material, such as PVC, a thermoset material, and/or a metal material, for example. The receiving member 420 can be formed as a single piece, such as by an injection molding technique. In another embodiment, components of the receiving member 420, for example the receiving conduit 422 and the connector plate 424, can be heat-sealed, or PVC-welded, together. In still another embodiment, the components of the receiving member 420 can be connected by adhesives and/or fasteners. In yet another embodiment, components of the receiving member 420 can be snap-fit together. The components of the receiving member 420 can be connected using any suitable fastening devices or methods known to those of skill in the art to form a fluid-tight, or substantially fluid-tight, connection therebetween and can form a channel for fluid flow therethrough.

In one embodiment, referring again to FIGS. 42-48 and 63, the adapter conduit 406 can be secured to the receiving conduit 422 to form a fluid-tight, or substantially fluid-tight, connection between the receiving member 420 of the connector assembly 416 and the outlet conduit 14 in the side wall 11 (FIG. 1). The connection between the adapter conduit 406 and receiving conduit 422 can form a channel for fluid flow therethrough. In an embodiment, a fluid communication channel can form between the receiving bore 432, receiving conduit 422, adapter conduit 406 and adapter bore 404 when the adapter 400 is secured to the receiving member 420. The receiving conduit 422 can be positioned adjacent to the adapter conduit 406. In other embodiments, the receiving conduit 422 can be positioned around, over, outside, or within the adapter conduit 406. In one embodiment, referring to FIGS. 59-62, the adapter conduit 406 can comprise an angled or tapered rim 407. The tapered rim 407 can be configured to slide the adapter conduit 406 into the receiving conduit 422. The exterior surface 410 of the adapter conduit 406 can be positioned adjacent to the interior surface 454 of receiving conduit 422. Alternatively, the receiving conduit 422 can comprise a tapered rim and can be configured to slide the receiving conduit 422 into the adapter conduit 406. The interior surface 408 of the adapter conduit 406 can be positioned adjacent to the exterior surface 456 of receiving conduit 422. In another embodiment, the adapter conduit 406 and receiving conduit 422 can comprise flat rims; the flat rim of the adapter conduit 406 can be positioned adjacent to the flat rim of the receiving conduit 422.

The connection between the adapter conduit 406 and receiving conduit 422 can be permanent or releasable. In an embodiment, the adapter 400 and receiving member 420 can be formed as a single piece, such as by an injection molding technique. Alternatively, the adapter 400 and receiving member 420 can be heat-sealed, or PVC welded, together. In another embodiment, fasteners can secure the adapter conduit 406 to the receiving conduit 422. In yet another embodiment, the adapter conduit 406 can be secured to the receiving conduit 422 with adhesive. In still another embodiment, the adapter conduit 406 can be snap-fit to the receiving conduit 422. The adapter conduit 406 can be connected to the receiving conduit 422 using any other suitable fastening devices or methods known to those of skill in the art.

When the flow managing device 10 (FIG. 1), engaging member 418, receiving member 420, adapter 400, and outlet conduit 14 (FIG. 1) are connected, fluid can flow from the basin 12 (FIG. 1) into an inlet 26 (FIG. 10) of the flow managing device 10, flow through a channel in the flow managing device 10, flow through an outlet 28 (FIG. 10) of the vortex valve 10, flow through an engaging bore 430, flow through a receiving bore 432, flow through a receiving conduit 422, flow through an adapter conduit 406, flow through an adapter bore 404, and flow into the outlet conduit 14. In various embodiments, when assembled, referring again to FIGS. 42-48 and 63, the outlet 28, engaging bore 430, receiving bore 432, receiving conduit 422, adapter conduit 406, adapter bore 404 and outlet conduit 14 can be in fluid communication such that fluid in the basin 12 can flow into the outlet conduit 14.

The connector plate 424 of the receiving member 420 can be positioned away from the side wall 11 of the basin 12 by the adapter 400. The distance between the side wall 11 and connector plate 424 can be increased by lengthening the receiving conduit 422 and/or adapter conduit 406. Similarly, the distance between the side wall 11 and connector plate 424 can be decreased by shortening the receiving conduit 422 and/or adapter conduit 406. The receiving conduit 422 and/or adapter conduit 406 can be lengthened to position the flow managing device 10 (FIG. 1) farther from the side wall 11 and/or near the center of the basin 12. In another embodiment, the receiving conduit 422 and/or adapter conduit 406 can be shortened to position the flow managing device 10 closer to the side wall 11 and/or far from the center of the basin 12. In one embodiment, the receiving conduit 422 and/or adapter conduit 406 can position the connector plate 424 just far enough from the side wall 11 to prevent the side wall 11 curvature from touching or otherwise interfering with the connector plate 424.

To assemble the connector assembly 416 with the adapter 400 for a flow managing device 10 (FIG. 1), such as a vortex valve, the receiving conduit 422 of the receiving member 420 can be secured to the adapter conduit 406 of the adapter 400 with any suitable fastening method, as described in greater detail above. The receiving conduit 422 and adapter conduit 406 can be secured to form a fluid-tight, or substantially fluid-tight, connection between the receiving member 420 and adapter 400. The receiving conduit 422 and adapter conduit 406 can be connected such that a fluid communication channel can form between the receiving bore 432, receiving conduit 422, adapter conduit 406 and adapter bore 404.

The curvature plate 402 of the adapter 400 can be secured to the side wall 11 of the basin 12 around the outlet conduit 14 (FIG. 1) with fasteners or any suitable fastening method, as described in greater detail above. The curvature of the curvature plate 402 can match or otherwise complement the curvature of the side wall 11 to form a fluid-tight, or substantially fluid-tight, connection between the adapter 400 and side wall 11. In another embodiment, a gasket 413 can be positioned intermediate the curvature plate 400 and side wall 11. The adapter 400 and basin 12 can connect such that a fluid communication channel can form between the adapter conduit 406, adapter bore 404 and outlet conduit 14.

A flow managing device 10 (FIG. 1) can be secured to an engaging member 18 (FIGS. 12 and 13) with fasteners or any suitable fastening method, as described in greater detail above. The flow managing device 10 and engaging member 18 can be secured to form a fluid tight, or substantially fluid-tight, connection between the flow managing device 10 and engaging member 18. The connection between the flow managing device 10 and engaging member 18 can form a fluid communication channel between the flow managing device 10 and engaging bore 30 of the engaging member 18.

The engaging member 18 (FIGS. 12 and 13) can be secured to the receiving member 420 (FIGS. 49-55) by engaging the engaging or tapered portions 44 of the engaging member 18 with the receiving portions 468 of receiving member 420, as described in greater detail above. The receiving portions 468 can receive the engaging portions 44 to form a fluid tight, or substantially fluid-tight, connection between the receiving member 420 and engaging member 18. The engaging member and receiving member can be connected such that a fluid communication channel can form between the engaging bore 30, receiving bore 432, and receiving conduit 422. Upon connecting the flow managing device 10, engaging member 18, receiving member 420, adapter 400, and outlet conduit 14, the flow managing device 10 can be in fluid communication with the outlet conduit 14 via the connector assembly 416 with adapter 400.

The method of assembling a connector described above is merely illustrative; it is not intended to limit the scope of the invention. In fact, the steps of the method can be performed in a different order, additional steps can be added to the method, steps can be removed from the method, and/or steps may be duplicated throughout the method. For example, it is contemplated that the flow managing device 10 (FIG. 1) can be secured to the engaging member 18 (FIGS. 12 and 13) before the receiving member 420 is secured to the adapter 400 and/or before the adapter 400 is secured to the side wall 11. Further, additional components can be added to the flow managing device 10, connector 416, adapter 420, and/or side wall 11 before, between, or after the steps described above.

In various embodiments, more than one adapter 400 can be provided with a connector assembly 416. These adapters 400 can each comprise a different curvature in their respective curvature plates 402. Such a feature can allow a user of the connecting assembly 416 to fit the connector assembly 416 to various basins 12 simply by changing the adapter 400.

In accordance with still other embodiments, components for connector assemblies are shown in U.S. design application Ser. No. 29/404,573, filed Oct. 21, 2011, entitled "TRIANGULAR PLATE" by Hugo Marquis-Martin and U.S. design application Ser. No. 29/404,575, filed Oct. 21, 2011, entitled "BACK PLATE" by Hugo Marquis-Martin, which are also incorporated herein by reference in their respective entireties.

In various embodiments, the components of the flow managing device can include sewer pipes, sewer pipe elbows, sewer pipe couplings, and/or sewer pipe caps, for example. In various embodiments, these components can have a diameter in the range of 3 inches to 20 inches, 5 inches to 15 inches, and 6 inches to 10 inches, for example. Additional examples of components for flow managing devices are shown in U.S. design application Ser. No. 29/404,568, filed Oct. 21, 2011, entitled "ELBOW PIPE ASSEMBLY" by Hugo Marquis-Martin; U.S. design application Ser. No. 29/404,570, filed Oct. 21, 2011, entitled "FLOW CONTROL DEVICE" by Hugo Marquis-Martin; and U.S. design application Ser. No. 29/404,572, filed Oct. 21, 2011, entitled "VORTEX FLOW CONTROL ASSEMBLY" by Hugo Marquis-Martin, which are incorporated herein by reference in their respective entireties. The flow managing device can also separate materials with different specific gravities, such as oil and debris.

While an example fluid flow restricting assembly has been described above and illustrated in the accompanying figures, those of skill in the art will recognize that other suitable fluid flow restricting assemblies are within the scope of the present disclosure. Furthermore, it should be recognized that a bore in an engaging member can be sized and shaped to itself provide an adequate flow restriction to fluid flow therethrough without the use of a vortex valve or a fluid flow restricting assembly. In such an embodiment, a bore in a receiving member can be the same size and shape as the bore in the engaging member or can be larger in size and shape than the bore in the engaging member. The term "larger", in this context, can mean having a larger area and/or diameter, for example.

While particular non-limiting embodiments of the present disclosure have been illustrated and described, those of skill in the art will recognize that various other changes and modifications can be made without departing from the spirit and scope of the present disclosure. It is therefore intended to cover in the appended claims all such changes and modifications that are within the scope of the present disclosure. Although dimensions are illustrated in some of the figures, those dimensions are meant as example embodiments and are not to be construed as limiting.

Although the various embodiments of the present disclosure have been described herein, many modifications and variations to those embodiments can be implemented. For example, different types of fluid flow restricting apparatuses can be employed. Furthermore, according to various embodiments, a single component can be replaced by multiple components, and multiple components can be replaced by a single component, to perform a given function or functions. The foregoing description and following claims are intended to cover all such modification and variations.

What is claimed is:

1. A connector in fluid communication with an outlet in a basin, the basin having a first curvature, the connector comprising:
   an adapter, comprising:
      a curvature plate secured to the basin, the curvature plate comprising a second curvature that substantially complements the first curvature of the basin;
      an adapter bore through the curvature plate that at least partially overlaps the outlet in the basin; and
      an adapter conduit that at least partially overlaps the adapter bore and extends from the curvature plate;
   a receiving member, comprising:
      a connector plate comprising a first receiving portion, a second receiving portion and a third receiving portion;
      a receiving bore through the connector plate; and
      a receiving conduit that at least partially overlaps the receiving bore and extends from the connector plate, the receiving conduit secured to the adapter conduit of the adapter to form a first fluid-tight connection; and
   an engaging member, comprising:
      an engaging bore through the engaging member; and
      an outer edge comprising a substantially triangular shape forming a first engaging portion, a second engaging portion, and a third engaging portion, each engaging portion is disposed in and received by its repective receiving portion such that the engaging bore at least partially overlaps the receiving bore.

2. The connector of claim 1, wherein the adapter conduit comprises a first diameter and the receiving conduit comprises a second diameter that is greater than the first diameter such that the adapter conduit fits within the receiving conduit.

3. The connector of claim 1, further comprising a second fluid-tight connection between the adapter and the basin and a third fluid-tight connection between the engaging member and the receiving member.

4. The connector of claim 1, further comprising a sealing member that is positioned intermediate the adapter and the basin.

5. The connector of claim 1, wherein the first, second, and third engaging portions each comprises a tapered portion.

6. The connector of claim 1, wherein the receiving conduit is heat-sealed to the adapter conduit.

7. A connector assembly comprising:
an adapter, comprising:
  a curvature plate comprising a curvature;
  an adapter bore through the curvature plate; and
  an adapter conduit that at least partially overlaps the adapter bore and extends from the curvature plate; and
a receiving member, comprising:
  a connector plate comprising a first engaging portion, a second engaging portion, and a third engaging portion for attaching receiving an engaging member of a flow managing device comprising a first receiving portion, a second receiving portion and a third receiving portion such that each receiving portion is configured to receive its respective engaging portion to thereby attach the flow managing device to the connector plate;
  a receiving bore through the connector plate; and
  a receiving conduit that at least partially overlaps the receiving bore and extends from the connector plate; the receiving conduit is secured to the adapter conduit of the adapter to form a first fluid-tight connection.

8. The connector assembly of claim 7, wherein the flow managing device separates materials with different specific gravities.

9. The connector of claim 7, further comprising a second fluid-tight connection between the receiving member and the flow managing device.

10. The connector of claim 7, wherein:
the adapter is secured to a basin having a first curvature;
the curvature plate of the adapter comprises a second curvature that substantially complements the first curvature; and
the curvature plate is secured to the basin to form a second fluid-tight connection.

11. The connector of claim 7, wherein the first, second, and third engaging portions each comprises a tapered portion.

12. A method comprising the steps of:
securing a receiving conduit of a receiving member to an adapter conduit of an adapter to form a first fluid-tight connection, the receiving member comprising a first receiving portion on a first projecton, a second receiving portion on a second projection and a third receiving portion on a third projection;
securing the adapter to a basin, the basin having a first curvature, the adapter comprising a curvature plate having a second curvature that substantially complements the first curvature, the adapter secured to the basin such that the adapter conduit at least partially overlaps an outlet of the basin;
securing a flow managing device to an engaging member such that a passage in the flow managing device at least partially overlaps an engaging bore in the engaging member, the engaging member comprising an outer edge having a substantially triangular shape that forms a first engaging portion, a second engaging portion, and a third engaging portion; and
securing the engaging member to the receiving member such that the first engaging portion engaging the first receiving portion; the second engaging portion engaging the second receiving portion; and the third engaging portion engaging the third receiving portion.

13. The method of claim 12, wherein the adapter conduit comprises a first diameter and the receiving conduit comprises a second diameter that is greater than the first diameter such that the receiving conduit fits around the adapter conduit.

14. The method of claim 12, wherein securing the adapter to the basin forms a second fluid-tight connection and securing the engaging member to the receiving member forms a third fluid-tight connection.

15. The method of claim 12, wherein the connector further comprises a sealing member that is positioned intermediate the adapter and the basin.

16. The method of claim 12, wherein the step of securing the receiving conduit of the receiving member to the adapter conduit of the adapter occurs before the step of securing the adapter to the basin.

17. The method of claim 12, wherein the step of securing the adapter to the basin occurs before the step of securing the receiving conduit of the receiving member to the adapter conduit of the adapter.

* * * * *